(12) United States Patent
Arimilli et al.

(10) Patent No.: US 9,996,298 B2
(45) Date of Patent: Jun. 12, 2018

(54) MEMORY MOVE INSTRUCTION SEQUENCE ENABLING SOFTWARE CONTROL

(71) Applicant: INTERNATIONAL BUSINESS MACHINES CORPORATION, Armonk, NY (US)

(72) Inventors: Lakshminarayana B. Arimilli, Austin, TX (US); Guy L. Guthrie, Austin, TX (US); William J. Starke, Round Rock, TX (US); Jeffrey A. Stuecheli, Austin, TX (US); Derek E. Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 101 days.

(21) Appl. No.: 15/243,581

(22) Filed: Aug. 22, 2016

(65) Prior Publication Data
US 2018/0052608 A1 Feb. 22, 2018

Related U.S. Application Data

(60) Provisional application No. 62/251,556, filed on Nov. 5, 2015.

(51) Int. Cl.
*G06F 3/06* (2006.01)
*G06F 9/30* (2018.01)
(Continued)

(52) U.S. Cl.
CPC .............. *G06F 3/065* (2013.01); *G06F 3/061* (2013.01); *G06F 3/0656* (2013.01);
(Continued)

(58) Field of Classification Search
None
See application file for complete search history.

(56) References Cited

U.S. PATENT DOCUMENTS

| 5,146,460 A | 9/1992 | Ackerman et al. |
| 5,555,400 A | 9/1996 | Groves et al. |

(Continued)

OTHER PUBLICATIONS

Zhao et al. Hardware support for bulk data movement in server platforms (IEEE 0-7695-2451-6/05) pp. 8.*

(Continued)

*Primary Examiner* — Kaushikkumar Patel
(74) *Attorney, Agent, or Firm* — Brian F. Russell; Steven L. Bennett

(57) ABSTRACT

A processor core of a data processing system, in response to a first instruction, generates a copy-type request specifying a source real address and transmits it to a lower level cache. In response to a second instruction, the processor core generates a paste-type request specifying a destination real address associated with a memory-mapped device and transmits it to the lower level cache. In response to receipt of the copy-type request, the lower level cache copies a data granule from a storage location specified by the source real address into a non-architected buffer. In response to receipt of the paste-type request, the lower level cache issues a command to write the data granule from the non-architected buffer to the memory-mapped device. In response to receipt from the memory-mapped device of a busy response, the processor core abandons the memory move instruction sequence and performs alternative processing.

17 Claims, 29 Drawing Sheets

(51) Int. Cl.
*G06F 12/0897* (2016.01)
*G06F 12/10* (2016.01)

(52) U.S. Cl.
CPC .......... *G06F 3/0659* (2013.01); *G06F 3/0673* (2013.01); *G06F 9/3004* (2013.01); *G06F 9/30032* (2013.01); *G06F 12/0897* (2013.01); *G06F 12/10* (2013.01); *G06F 2212/60* (2013.01)

(56) References Cited

U.S. PATENT DOCUMENTS

| | | | |
|---|---|---|---|
| 5,764,959 | A | 6/1998 | Sharangpani et al. |
| 6,065,086 | A | 5/2000 | Arimilli et al. |
| 6,088,740 | A | 7/2000 | Ghaffari et al. |
| 6,175,930 | B1 | 1/2001 | Arimilli et al. |
| 6,606,702 | B1 | 8/2003 | Guthrie et al. |
| 6,609,192 | B1 | 8/2003 | Guthrie et al. |
| 6,625,660 | B1 | 9/2003 | Guthrie et al. |
| 6,636,950 | B1 | 10/2003 | Mithal et al. |
| 6,691,220 | B1 | 2/2004 | Guthrie et al. |
| 6,708,256 | B2 | 3/2004 | Zahir |
| 6,725,340 | B1 | 4/2004 | Guthrie et al. |
| 6,728,873 | B1 | 4/2004 | Guthrie et al. |
| 6,748,518 | B1 | 6/2004 | Guthrie et al. |
| 6,880,073 | B2 | 4/2005 | Arimilli et al. |
| 6,944,683 | B2 | 9/2005 | Barry et al. |
| 6,963,967 | B1 | 11/2005 | Guthrie et al. |
| 7,051,126 | B1 | 5/2006 | Franklin |
| 7,930,504 | B2 | 5/2006 | Franklin |
| 7,191,318 | B2 | 3/2007 | Tripathy et al. |
| 7,669,041 | B2 | 2/2010 | Khailany et al. |
| 7,827,383 | B2 | 11/2010 | Spracklen et al. |
| 7,941,627 | B2 | 5/2011 | Arimilli et al. |
| 7,958,327 | B2 | 6/2011 | Arimilli et al. |
| 7,971,029 | B2 | 6/2011 | Unno et al. |
| 8,095,758 | B2 | 1/2012 | Arimilli et al. |
| 8,127,113 | B1 | 2/2012 | Sinha et al. |
| 8,245,004 | B2 | 8/2012 | Arimilli et al. |
| 8,275,963 | B2 | 9/2012 | Arimilli et al. |
| 8,327,101 | B2 | 12/2012 | Arimilli et al. |
| 8,412,888 | B2 | 4/2013 | Guthrie et al. |
| 8,572,299 | B2 | 10/2013 | Pross et al. |
| 8,683,140 | B2 | 3/2014 | Guthrie et al. |
| 9,342,387 | B1 | 5/2016 | Arimilli et al. |
| 2003/0005227 | A1* | 1/2003 | Yamazaki ............ G06F 9/3824 711/119 |
| 2003/0229763 | A1 | 12/2003 | Hooker |
| 2004/0148491 | A1 | 7/2004 | Damron |
| 2005/0149702 | A1 | 7/2005 | Hily et al. |
| 2005/0251621 | A1 | 11/2005 | Theis |
| 2007/0143755 | A1 | 6/2007 | Sahu et al. |
| 2008/0235477 | A1 | 9/2008 | Rawson |
| 2009/0198936 | A1 | 8/2009 | Arimilli et al. |
| 2009/0254735 | A1* | 10/2009 | Col .................... G06F 9/30014 712/208 |
| 2010/0262735 | A1 | 10/2010 | Arimilli et al. |
| 2010/0306503 | A1* | 12/2010 | Henry ................ G06F 9/30032 712/207 |
| 2011/0066830 | A1 | 3/2011 | Wolfe et al. |
| 2011/0119448 | A1 | 5/2011 | Riocreux et al. |
| 2011/0145551 | A1 | 6/2011 | Wang et al. |
| 2011/0161590 | A1 | 6/2011 | Guthrie et al. |
| 2012/0179876 | A1 | 7/2012 | Guthrie et al. |
| 2012/0192176 | A1 | 7/2012 | Shah |
| 2012/0210072 | A1 | 8/2012 | Guthrie et al. |
| 2013/0013864 | A1 | 1/2013 | Chung et al. |
| 2013/0219399 | A1 | 8/2013 | Wang et al. |
| 2014/0082630 | A1 | 3/2014 | Ginzburg et al. |
| 2014/0149718 | A1 | 5/2014 | Hughes et al. |
| 2014/0207991 | A1 | 7/2014 | Kaushik et al. |
| 2014/0281243 | A1 | 9/2014 | Shalf et al. |
| 2015/0212939 | A1* | 7/2015 | Tani ...................... G06F 12/084 711/130 |
| 2016/0071558 | A1 | 3/2016 | Wolrich et al. |

OTHER PUBLICATIONS

Yu et al. Buffer on Last level cache for CPU and GPGPU data sharing (IEEE 978-1-4799-8/14, 2014), pp. 417-420.*

Weaver et al., The SPARC Architecture Manual, Version 9, SPARC International, Inc. San Jose, California. (c)1994.

Tullsen et al. "The shared-thread multiprocessor" ResearchGate Conference Paper Jan. 2008, Retrieved Apr. 14, 2016.

Murphy, "Traveling Threads: A New Multithreaded Execution Model", A Dissertation Submitted to the Graduate School of the University of Notre Dame, Graduate Program in Computer Science and Engineering Notre Dame, Indiana, Jun. 2006.

Edenfield, et al. "The 68040 Processor: Part 2, Memory Design and Chip Verification" IEEE 1990. (Year: 1990).

Chaturvedi et al. "An adaptive migration-replication scheme (AMR) for shared cache in chip multiprocessors" The Journal of Supercoming Oct. 2015, vol. 71, Issue 10, pp. 3904-3933. (Year: 2015).

Tarjan et al. "The Sharing Tracker: Using Ideas from Cache Coherence Hardware to Reduce Off-Chip Memory Traffic with Non-Coherent Caches" SC '10: Proceedings of the 2010 ACM/IEEE International Conference for High Performance Computing, Networking, Storage and Analysis. (Year: 2010).

Tremblay et al., "The MAJC Architecture: A Synthesis of Parallelism and Scalability", Sun Microsystems IEEE 2000.

Williams et al., U.S. Appl. No. 15/243,385, filed Aug. 22, 2016, Non-Final Office Action dated Nov. 9, 2017.

Williams et al., U.S. Appl. No. 15/243,385, filed Aug. 22, 2016, Final Office Action dated Apr. 20, 2018.

Frey et al., U.S. Appl. No. 15/243,413, filed Aug. 22, 2016, Non-Final Office Action dated Mar. 8, 2018.

Frey et al., U.S. Appl. No. 15/243,446, filed Aug. 22, 2016, Non-Final Office Action dated Nov. 2, 2017.

Frey et al., U.S. Appl. No. 15/243,446, filed Aug. 22, 2016, Notice of Allowance dated Apr. 27, 2017.

Guthrie et al., U.S. Appl. No. 15/243,489, filed Aug. 22, 2016, Notice of Allowance dated Apr. 27, 2017.

Guthrie et al., U.S. Appl. No. 15/243,628, filed Aug. 22, 2016, Notice of Allowance dated Jan. 17, 2018.

Guthrie et al., U.S. Appl. No. 15/243,628, filed Aug. 22, 2016, Corrected Notive of Allowance dated Apr. 2, 2018.

* cited by examiner

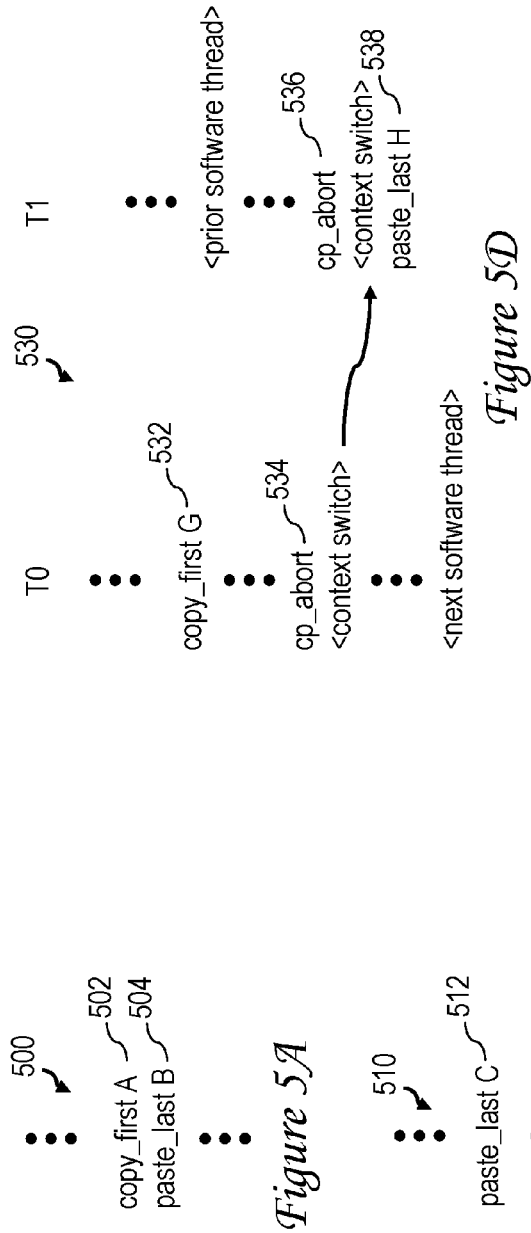
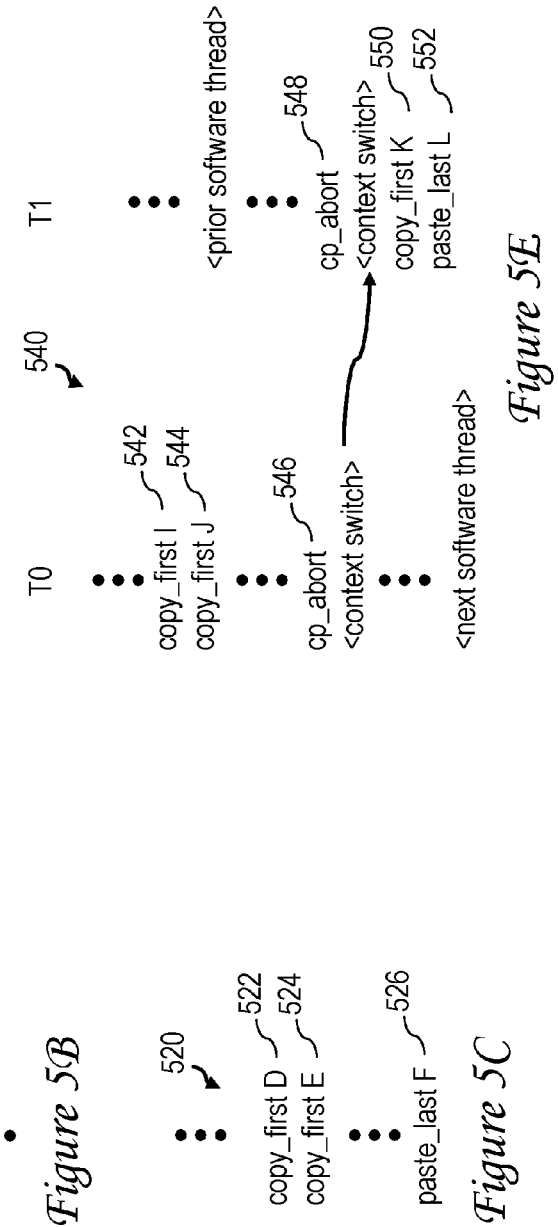

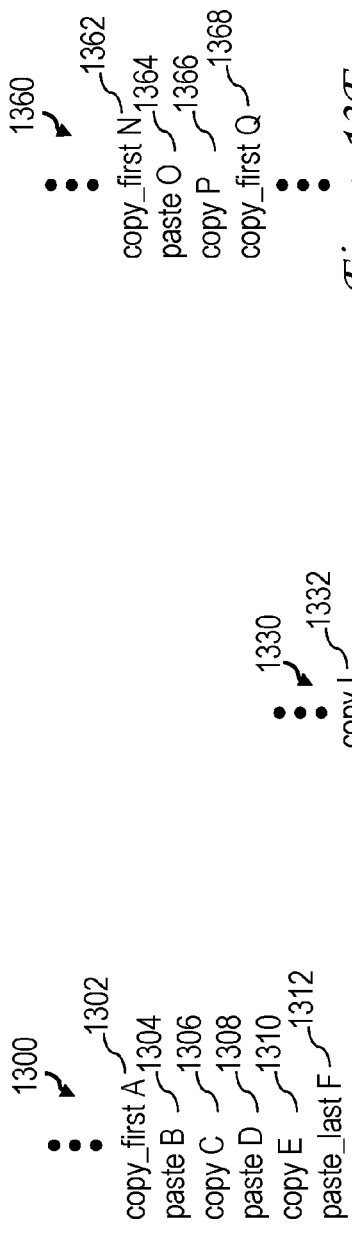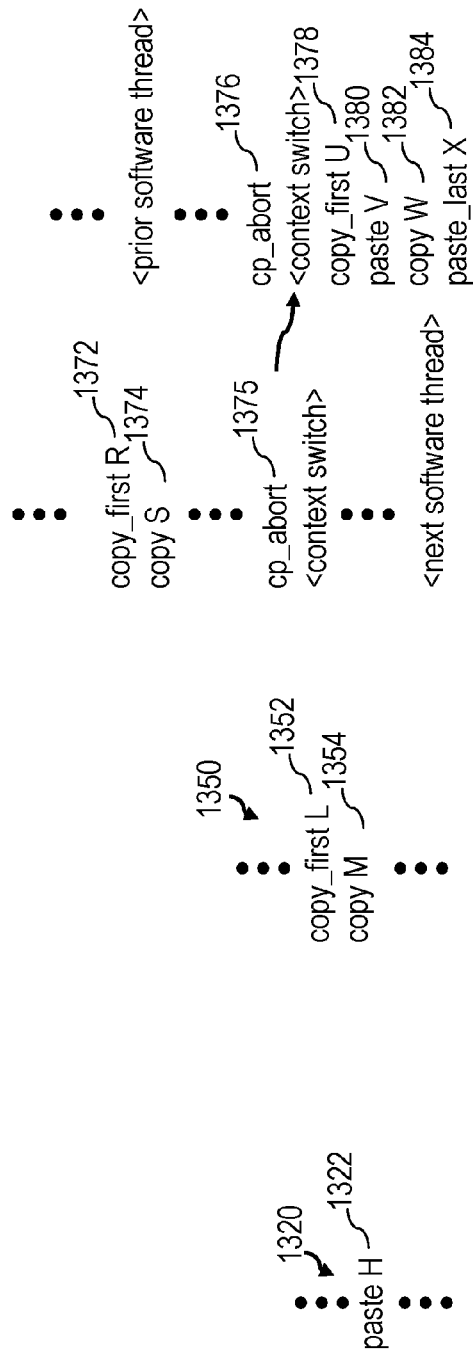

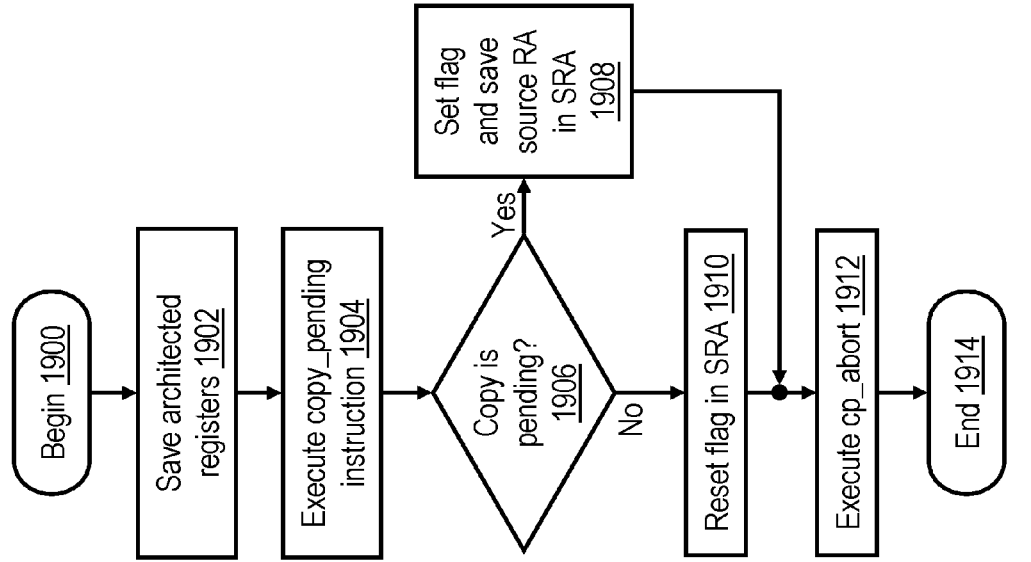
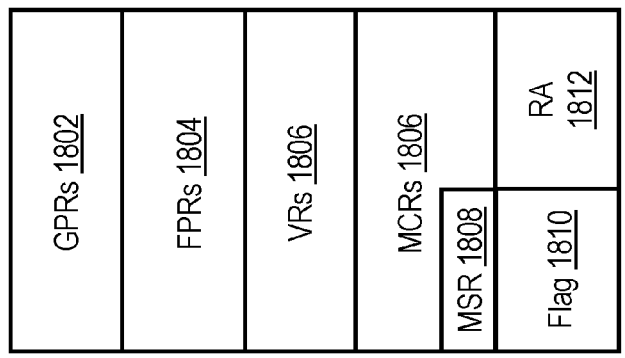

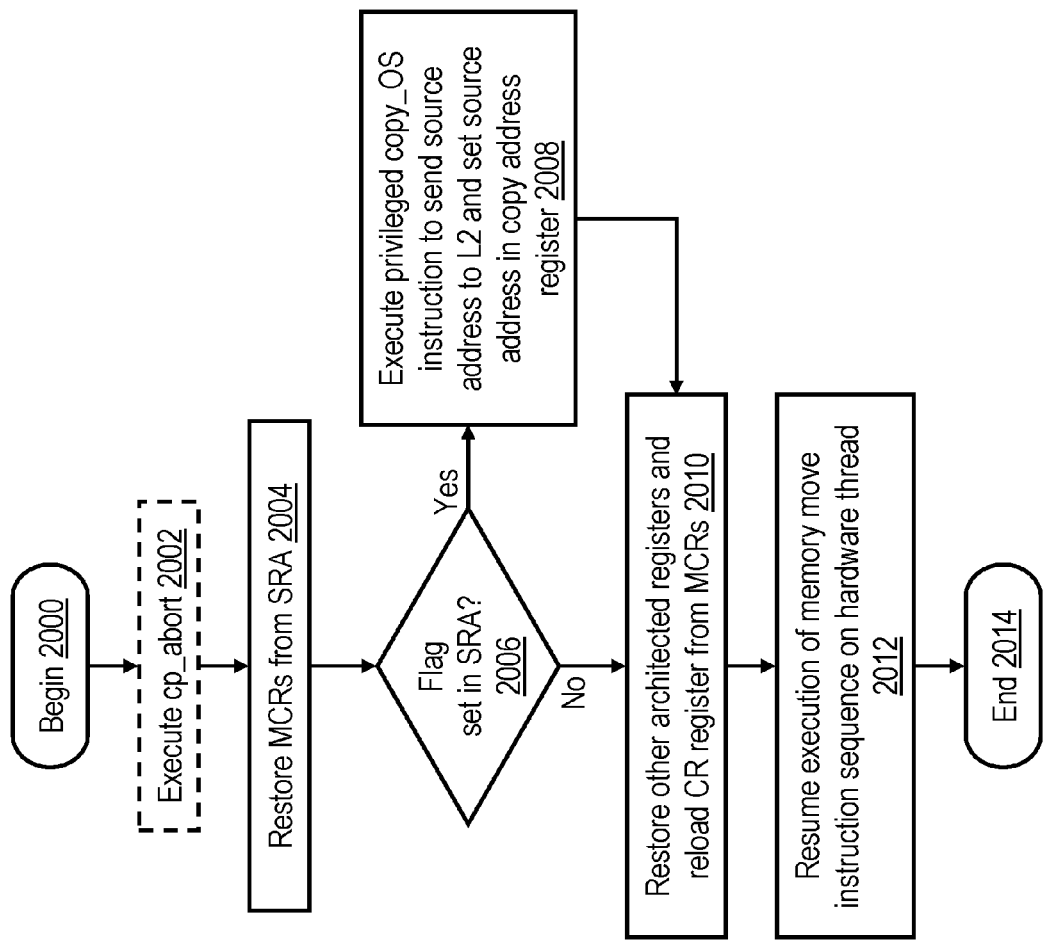

MEMORY MOVE INSTRUCTION SEQUENCE ENABLING SOFTWARE CONTROL

BACKGROUND OF THE INVENTION

The present invention relates generally to data processing and, in particular, to accessing memory of a data processing system utilizing copy and paste instructions.

A conventional multiprocessor (MP) computer system comprises multiple processing units (which can each include one or more processor cores and their various register sets and cache memories), input/output (I/O) devices, and data storage, which can include both system memory (volatile and/or nonvolatile) and nonvolatile mass storage. In order to provide enough addresses for memory-mapped I/O operations and the data and instructions utilized by operating system and application software, MP computer systems typically reference an effective address space that includes a much larger number of effective addresses than the number of physical storage locations in the memory-mapped I/O devices and system memory. Therefore, to perform memory-mapped I/O or to access system memory, a processor core within a computer system that utilizes effective addressing is required to translate an effective address into a real address assigned to a particular I/O device or a physical storage location within system memory.

In general, an MP computer system can be classified as implementing either a Complex Instruction Set Computer (CISC) or Reduced Instruction Set Computer (RISC) architecture. CISC architectures are characterized by the execution of so-called "complex instructions" that directly reference the computer system's system memory and do not require explicit enumeration of any loads of operands from, or stores of execution results to, system memory. In contrast, RISC architectures are characterized by relatively simple instruction sets including load-type and store-type memory access instructions that, when executed, explicitly direct the movement of data between system memory and the architected register set(s) of the processor (i.e., those registers that can be directly identified in an instruction as the source or destination of data referenced by execution of the instruction).

BRIEF SUMMARY

The present disclosure appreciates that any commercially realizable RISC processor core will include one or more register files (sets) of finite depth and thus include a limited number of architected registers. These architected registers represent a scarce resource, which if managed efficiently support greater throughput and thus improved processor performance, and which if managed inefficiently can lead to lower throughput and thus decreased processor performance.

Memory moves (i.e., operations that move a data set from one region of memory to another) are one type of operation that place particular pressure on the availability of architected registers. In a conventional memory move in a data processing system implementing a RISC architecture, a load-type of instruction is first executed to allocate an architected register and then place contents of a first system memory location in the allocated register. A store-type instruction is subsequently executed to store the contents of the architected register previously allocated by the load-type instruction to a second system memory location. As such load-store instruction pairs are repeated to move the data set, each of the architected registers allocated to the memory move is allocated for an interval lasting at least for the duration of the two memory accesses and thus made unavailable for use by other instructions during this interval. The present disclosure appreciates that the pressure placed on the scarce architected register resources of the processor core by a memory move can be alleviated through implementation of copy and paste functionality as described further herein.

In at least one embodiment, a processor core of a data processing system, in response to a first instruction, generates a copy-type request specifying a source real address and transmits it to a lower level cache. In response to a second instruction, the processor core generates a paste-type request specifying a destination real address associated with a memory-mapped device and transmits it to the lower level cache. In response to receipt of the copy-type request, the lower level cache copies a data granule from a storage location specified by the source real address into a non-architected buffer. In response to receipt of the paste-type request, the lower level cache issues a command to write the data granule from the non-architected buffer to the memory-mapped device. In response to receipt from the memory-mapped device of a busy response, the processor core abandons the memory move instruction sequence and performs alternative processing.

BRIEF DESCRIPTION OF THE SEVERAL VIEWS OF THE DRAWINGS

FIG. 5A is an exemplary memory move instruction sequence including copy_first and paste_last instructions in accordance with one embodiment;

FIG. 5B is an exemplary illegal instruction sequence including a paste_last instruction not preceded by a copy_first instruction;

FIG. 5C is an exemplary illegal instruction sequence including multiple copy_first instructions followed by a paste_last instruction;

FIG. 5D is an exemplary instruction sequence including a context switch between execution of a copy_first instruction and a paste_last instruction;

FIG. 5E is an exemplary instruction sequence including a context switch during execution of a memory move;

FIG. 13A is an exemplary memory move instruction sequence including a stream of multiple copy and paste instructions in accordance with one embodiment;

FIG. 13B is an exemplary illegal instruction sequence including a paste instruction not preceded by a copy_first or copy instruction;

FIG. 13C is an exemplary illegal instruction sequence including a copy instruction not followed by a paste instruction;

FIG. 13D is an exemplary illegal instruction sequence including a copy_first instruction followed by a copy instruction;

FIG. 13E is an exemplary illegal instruction sequence omitting a paste_last instruction;

FIG. 13F is an exemplary instruction sequence including a context switch during execution of a memory move;

FIG. 17 illustrates a copy_pending instruction in accordance with one embodiment;

FIG. 18 depicts a saved register area (SRA) in memory in accordance with one embodiment;

FIG. 19 is a high level logical flowchart of an exemplary method by which a memory move is suspended in accordance with one embodiment;

FIG. 20 is a high level logical flowchart of an exemplary method by which a memory move is resumed in accordance with one embodiment;

DETAILED DESCRIPTION

Figure 1:
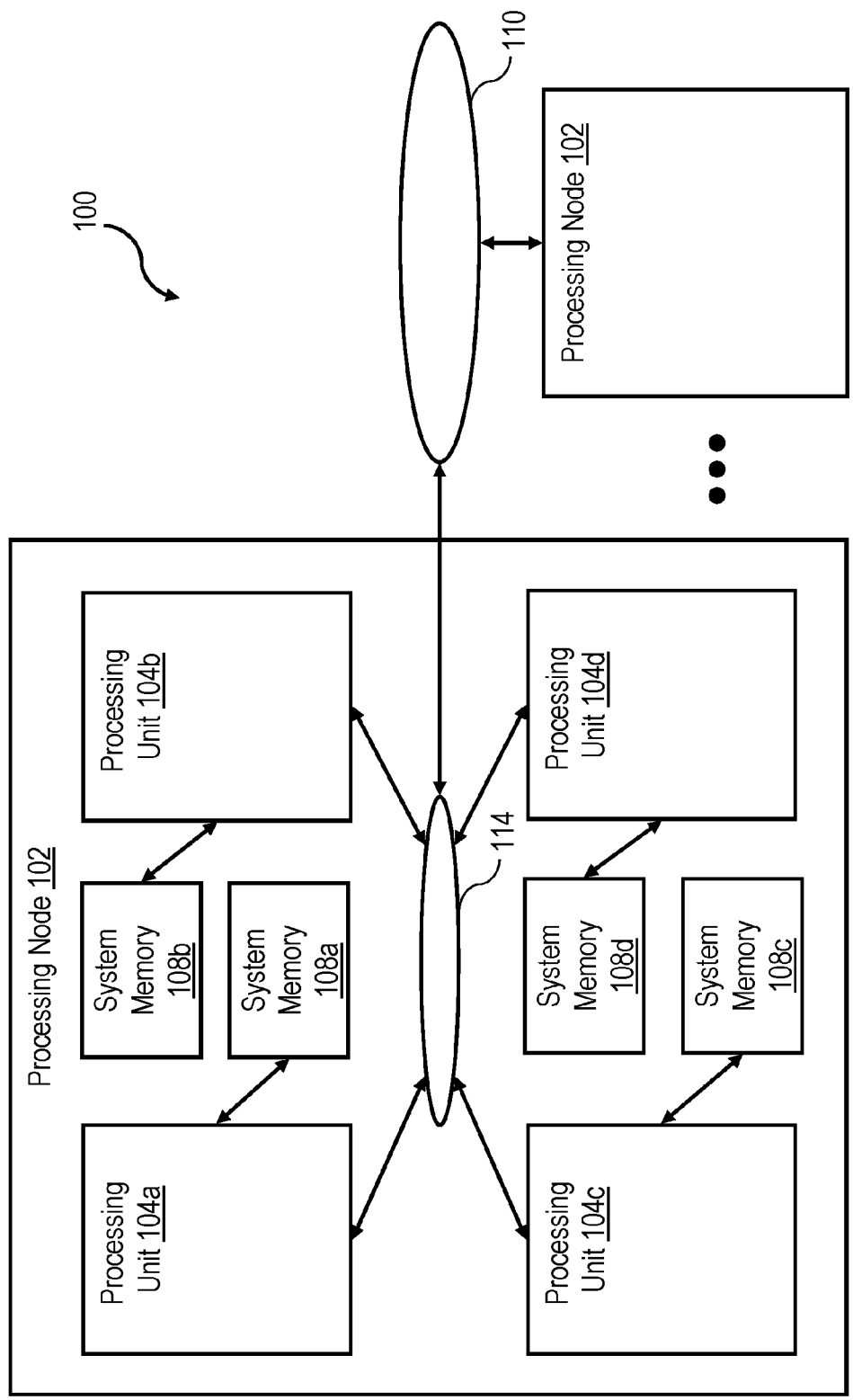
FIG. 1 is a high-level block diagram of an exemplary data processing system in accordance with one embodiment.

With reference now to the figures, wherein like reference numerals refer to like and corresponding parts throughout, and in particular with reference to FIG. 1, there is illustrated a high level block diagram depicting an exemplary data processing system 100 in accordance with one embodiment. In the depicted embodiment, data processing system 100 is a cache coherent symmetric multiprocessor (SMP) data processing system including multiple processing nodes 102 for processing data and instructions. Processing nodes 102 are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a respective integrated circuit. The processing units 104 within each processing node 102 are coupled for communication to each other and system interconnect 110 by a local interconnect 114, which, like system interconnect 110, may be implemented, for example, with one or more buses and/or switches. System interconnect 110 and local interconnects 114 together form an interconnect fabric.

As described below in greater detail with reference to FIG. 2, processing units 104 each include a memory controller 106 coupled to local interconnect 114 to provide an interface to a respective system memory 108. Data and instructions residing in system memories 108 can generally be accessed, cached and modified by a processor core in any processing unit 104 of any processing node 102 within data processing system 100. System memories 108 thus form the lowest level of memory storage in the distributed shared memory system of data processing system 100. In alternative embodiments, one or more memory controllers 106 (and system memories 108) can be coupled to system interconnect 110 rather than a local interconnect 114.

Those skilled in the art will appreciate that SMP data processing system 100 of FIG. 1 can include many additional non-illustrated components, such as interconnect bridges, non-volatile storage, ports for connection to networks or attached devices, etc. Because such additional components are not necessary for an understanding of the described embodiments, they are not illustrated in FIG. 1 or discussed further herein. It should also be understood, however, that the enhancements described herein are applicable to data processing systems of diverse architectures and are in no way limited to the generalized data processing system architecture illustrated in FIG. 1.

Figure 2:
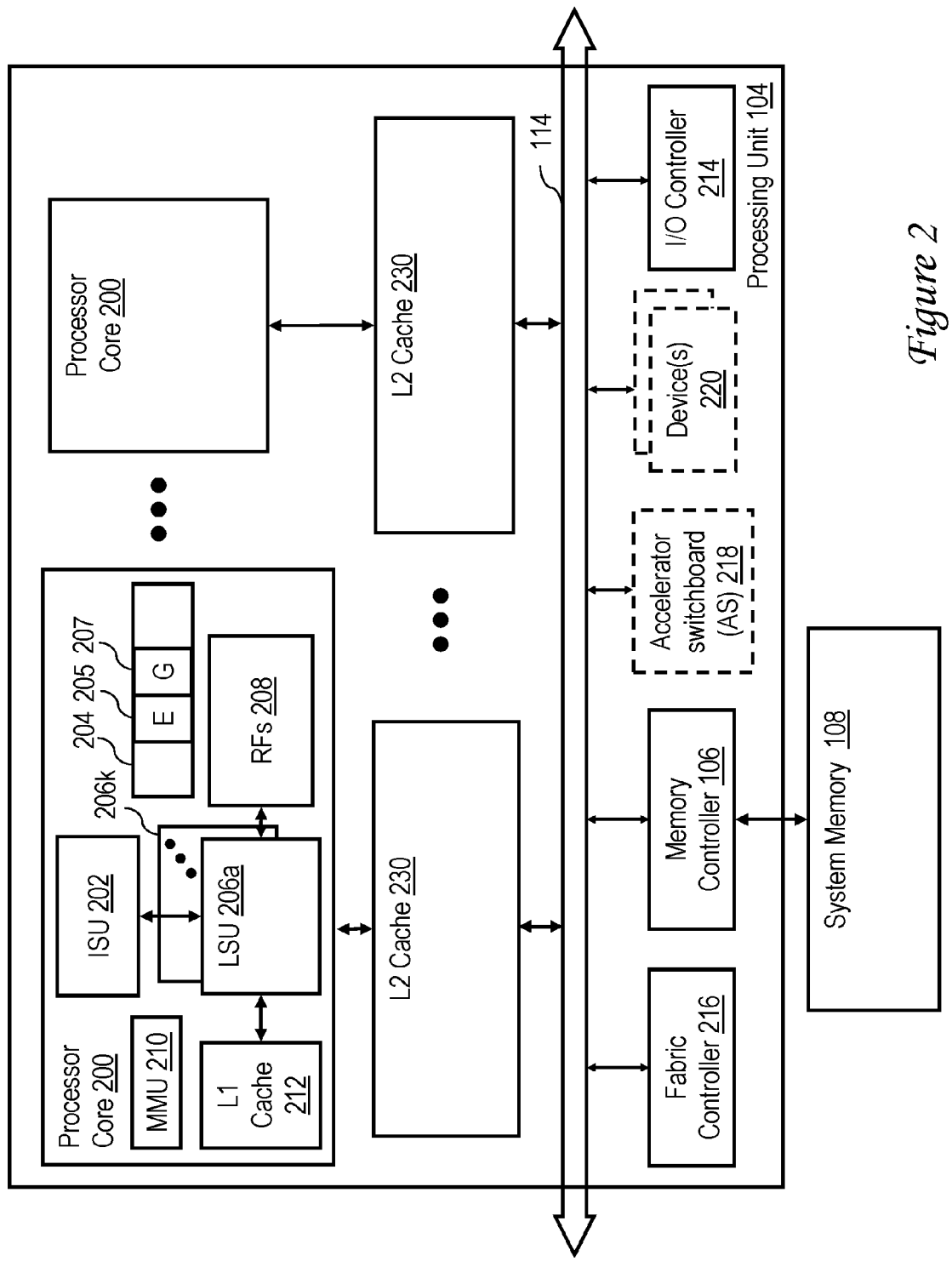
FIG. 2 is a more detailed block diagram of an exemplary processing unit in accordance with one embodiment.

Referring now to FIG. 2, there is depicted a more detailed block diagram of an exemplary processing unit 104 in accordance with one embodiment. In the illustrated embodiment, processing unit 104 is an individual integrated circuit chip including one or more processor cores 200 for processing instructions and data. Processing unit 104 further includes an integrated and distributed fabric controller 216 responsible for controlling the flow of operations on the system fabric comprising local interconnect 114 and system interconnect 110 and for implementing the coherency communication required to implement the selected cache coherency protocol. Processing unit 104 may further include an integrated I/O (input/output) controller 214 supporting the attachment of one or more I/O devices (not depicted). As discussed further below, processing unit 104 may also optionally include one or more additional memory-mapped devices, such as an accelerator switchboard (AS) 218 and/or device(s) 220 coupled to local interconnect 114.

In a preferred embodiment, each processor core 200 of processing unit 104 supports simultaneous multithreading (SMT) and thus is capable of independently executing multiple hardware threads of execution simultaneously. In the given example, each processor core 200 includes an instruction sequencing unit (ISU) 202 that fetches instructions for execution by that processor core 200 and orders the execution of the instructions. Processor core 200 further includes one or more execution units 206a-206k for executing instructions from the multiple simultaneous hardware threads of execution. The instructions can include, for example, fixed-point and floating-point arithmetic instructions, logical instructions, memory access instructions (e.g., load-type and store-type instructions), memory synchronization instructions, etc. In general, execution units 206a-206k can execute instructions of each hardware thread in any order as long as data dependencies and hazards and explicit orderings mandated by memory synchronization instructions are observed. In the depicted embodiment, execution units 206a-206k include a load-store unit (LSU) 206a, which executes memory access instructions that request access to a memory block in the distributed shared memory system or cause the generation of a request for access to a memory block in the distributed shared memory system. Data obtained from the distributed shared memory system by memory accesses or generated by instruction execution are buffered in one or more register files (RFs) 208, each of which can include both an architecturally defined number of architected registers and a pool of rename registers. Data are written, in response to execution of memory access instructions by LSU 206a, from the one or more register files 208 to the distributed shared memory system.

Processor core 200 additionally includes a memory management unit (MMU) 210 responsible for translating target effective addresses determined by the execution of memory access instructions in execution units 206a-206k into real addresses. MMU 210 performs effective-to-real address translation by reference to one or more translation structure, such as a translation lookaside buffer (TLB), block address table (BAT), segment lookaside buffers (SLBs), etc. The number and type of these translation structures varies between implementations and architectures.

Processor core 200 also includes a condition register 204 including a plurality of fields whose contents indicate various conditions. In the illustrated embodiment, two of these fields, E (equal) bit 205 and G (greater than) bit 207, are utilized, among other uses such as indicating the outcome of arithmetic computations, to indicate conditions related to memory accesses, as discussed further below. Use of these arithmetic condition register bits advantageously enables conditional branch instructions that depend on arithmetic conditions (e.g., branch-greater-than and branch-equal-to instructions) to be utilized in conjunction with memory move instruction sequences. Of course, in other embodiments, other fields of condition register 204 can alternatively be employed.

The operation of each processor core 200 is supported by a multi-level memory hierarchy having at its lowest level a shared system memory 108 accessed via an integrated memory controller 106. At its upper levels, the multi-level memory hierarchy includes one or more levels of cache memory, which in the illustrative embodiment include a store-through level one (L1) cache 212 within and private to each processor core 200 and a respective store-in level two (L2) cache 230 for each processor core 200. Although the illustrated cache hierarchies includes only two levels of cache, those skilled in the art will appreciate that alternative embodiments may include additional levels (L3, L4, etc.) of on-chip or off-chip, private or shared, in-line or lookaside cache, which may be fully inclusive, partially inclusive, or non-inclusive of the contents the upper levels of cache.

Figure 3:
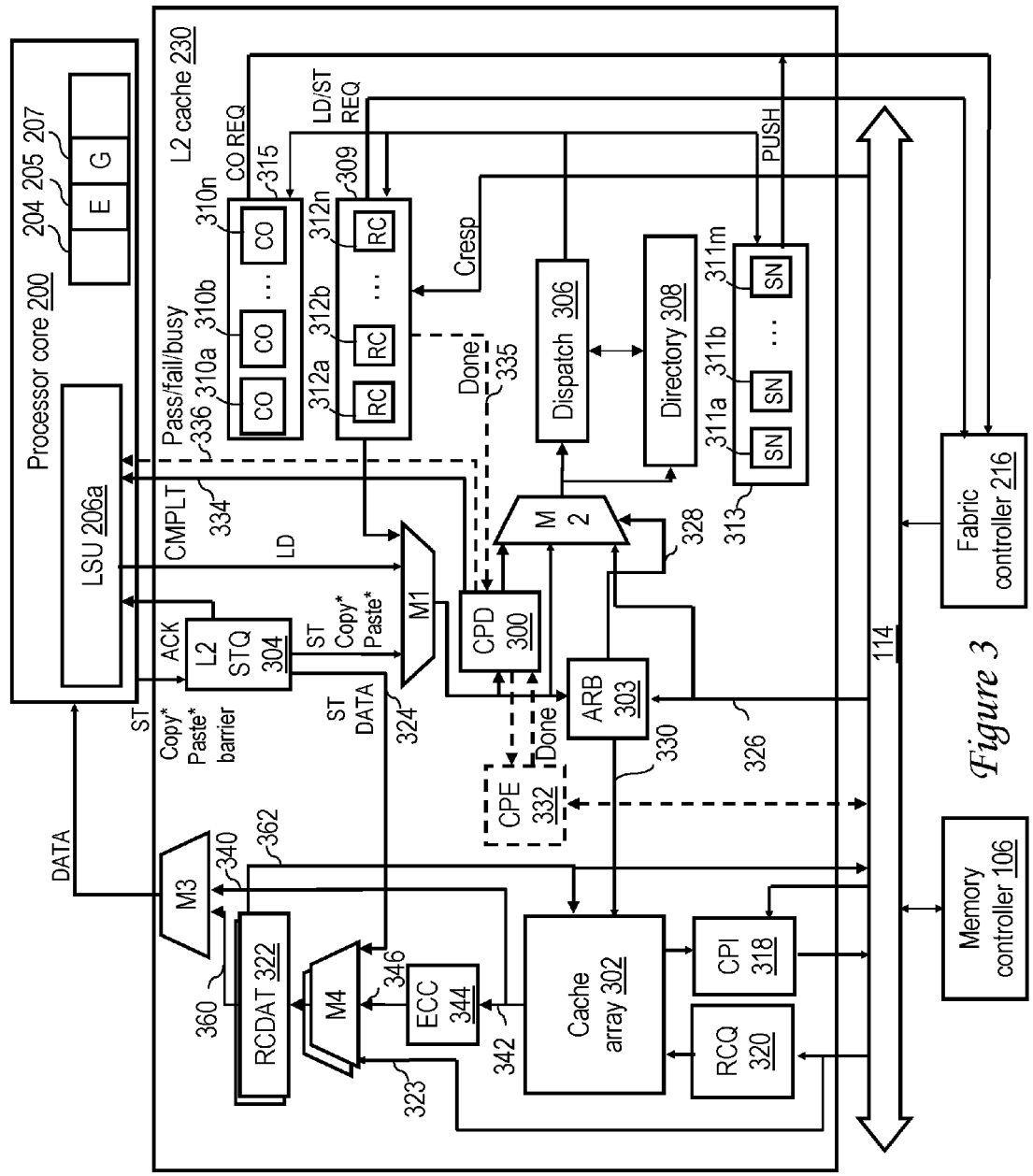
FIG. 3 is a detailed block diagram of a lower level store-in cache memory in accordance with one embodiment.

With reference now to FIG. 3, there is illustrated a more detailed block diagram of a lower level store-in cache memory (e.g., L2 cache 230) in accordance with one embodiment. In the embodiment of FIG. 3, L2 cache 230 includes a cache array 302 and a L2 directory 308 of the contents of cache array 302. Assuming cache array 302 and L2 directory 308 are set-associative as is conventional, storage locations in system memories 108 are mapped to particular congruence classes within cache array 302 utilizing predetermined index bits within the system memory (real) addresses. The particular memory blocks stored within the cache lines of cache array 302 are recorded in L2 directory 308, which contains one directory entry for each cache line. While not expressly depicted in FIG. 3, it will be understood by those skilled in the art that each directory entry in cache directory 308 includes various fields, for example, a tag field that identifies the real address of the memory block held in the corresponding cache line of cache array 302, a state field that indicates the coherency state of the cache line, an LRU (Least Recently Used) field indicating a replacement order for the cache line with respect to other cache lines in the same congruence class, and inclusivity bits indicating whether the memory block is held in the associated L1 cache 212.

L2 cache 230 additionally includes an L2 STQ 304 that receives from LSU 206a and temporarily buffers certain memory access requests and synchronization (barrier) requests. In the described embodiments, the memory access requests that flow through L2 STQ 304 include store-type requests, as well as copy-type requests and paste-type requests as described further herein. In at least one embodiment, L2 STQ 304 is a unified store queue that buffers requests generated by all hardware threads of the affiliated processor core 200.

L2 cache 230 also includes snooper logic 313 including multiple (e.g., 16 or 32) snoop machines 311a-311m for servicing remote memory access requests originating from processor cores 102 other than the affiliated processor core 200. Each snoop machine 311 can independently and concurrently handle a remote memory access request "snooped" from local interconnect 114. As will be appreciated, the servicing of memory access requests by L2 cache 230 may require the replacement or invalidation of memory blocks within cache array 302. Accordingly, L2 cache 230 additionally includes castout logic 315 including multiple CO (castout) machines 310a-310n that manage the removal and writeback of data granules from L2 cache 230 to system memories 108. In some embodiments, CO machines 310 are utilized to service paste-type requests received from the associated processor core 200, as discussed further below. L2 cache 230 additionally includes master logic 309 including multiple (e.g., 16 or 32) read-claim (RC) machines 312a-312n for independently and concurrently servicing load (LD) and store (ST) requests received from the affiliated processor core 200. In some embodiments of the inventions described below, RC machines 312 are also utilized to service copy-type requests received from the associated processor core 200. In some embodiments, servicing of copy-type and paste-type requests is optionally (as indicated by dashed line illustration) additionally or exclusively performed by a copy-paste engine (CPE) 332, which, if present, is dedicated to servicing such requests. Thus, in some embodiments, copy-type and paste-type requests are serviced exclusively by RC machines 312 and CO machines 310; in some embodiments, copy-type and paste-type requests are serviced exclusively by CPE 332; and in some embodiments, copy-type and paste-type request are serviced by RC machines 312 and CO machines 310 as well as CPE 332.

L2 cache 230 also includes an RC queue 320 and a CPI (castout push intervention) queue 318 that respectively buffer data being inserted into and removed from the cache array 302. RC queue 320 includes a number of buffer entries that each individually correspond to a particular one of RC machines 312 such that each RC machine 312 that is dispatched retrieves data from only the designated buffer entry. Similarly, CPI queue 318 includes a number of buffer entries that each individually correspond to a particular one of the castout machines 310 and snoop machines 311, such that each CO machine 310 and each snoop machine 311 that is dispatched retrieves data from only the respective designated CPI buffer entry.

Each RC machine 312 also has assigned to it a respective one of multiple RC data (RCDAT) buffers 322 for buffering a memory block read from cache array 302 and/or received from local interconnect 114 via reload bus 323. The RCDAT buffer 322 assigned to each RC machine 312 is preferably constructed with connections and functionality corresponding to the memory access requests that may be serviced by the associated RC machine 312. At least some of RCDAT buffers 322 have an associated store data multiplexer M4 that selects data bytes from among its inputs for buffering in the RCDAT buffer 322 in response to unillustrated select signals.

The operation of L2 cache 230 is managed by a cache controller, which in the embodiment of FIG. 3 includes an arbiter 303, copy-paste dispatch unit (CPD) 300, and selection logic represented by multiplexers M1 and M2. Multiplexer M1 orders the presentation to CPD 300, arbiter 303 and multiplexer M2 of load, store, copy-type and paste-type requests received from the associated processor core 200. Multiplexer M2 additionally receives via snoop bus 326 requests of other processor cores 200 snooped from local interconnect 114. Based on selection inputs provided by arbiter 303 and/or CPD 300 determined on a desired arbitration policy, multiplexer M2 selects among the various memory access requests, including local load, local store, local copy-type and paste-type requests and remote read and write requests, presented to it, and forwards the selected requests to a dispatch pipeline 306 where each request is processed with respect to directory 308 and cache array 302 over a given number of cycles. In embodiments in which optional CPE 332 is implemented to provide dedicated handling of the copy-type and paste-type requests of the associated processor core 200, CPD 300 may direct that some or all of the copy-type and paste-type requests received from multiplexer M1 are directed to CPE 332 rather than passed via multiplexer M2 and dispatch logic 306 to RC machines 312.

In operation, L2 STQ 304 receives processor store requests, copy-type requests, paste-type requests, and barrier requests from the affiliated processor core 200. If a barrier request is received in L2 STQ 304, L2 STQ 304 may order older requests preceding the barrier request and younger requests following the barrier request, as discussed further below. From L2 STQ 304, store data of store requests are transmitted to store data multiplexer M4 via data path 324, and store requests, copy-type requests, and paste-type requests are passed to multiplexer M1. Multiplexer M1 also receives as inputs load requests from processor core 200 and directory write requests from RC machines 312. In response to unillustrated select signals generated by the cache controller, multiplexer M1 selects one of its input requests to forward to arbiter 303, CPD 300, and multiplexer M2, which additionally receives as an input remote requests received from local interconnect 114 via remote request path 326. Arbiter 303 schedules local and remote memory access requests for processing in dispatch pipeline 306 and, based upon the scheduling, generates a sequence of select signals 328. In response to select signals 328 generated by arbiter 303, multiplexer M2 selects either a local request received from multiplexer M1 or a remote request snooped from local interconnect 114 as the next memory access request to be processed in dispatch pipeline 306. If CPE 332 is implemented, CPD 300 can direct that none, all, or some of the copy-type and paste-type requests of the associated processor core 200 received by CPD 300 from multiplexer M1 are directed to CPE 332 for processing instead of dispatch pipeline 306.

Each memory access request selected for processing in dispatch pipeline 306 by arbiter 303 is placed by multiplexer M2 into dispatch pipeline 306. Dispatch pipeline 306 preferably is implemented as a fixed duration pipeline in which each of multiple possible overlapping requests is processed for a predetermined number of clock cycles. For example, dispatch pipeline 306 may process each memory access request for four cycles.

During a first cycle of processing within dispatch pipeline 306, a 1-cycle directory read is performed utilizing the request address to determine if the request address hits or misses in directory 308, and if the memory address hits, the coherence state of the memory block within directory 308. The directory information, which includes a hit/miss indication and the coherence state of the memory block, is returned by directory 308 to dispatch pipeline 306 in a subsequent cycle, such as the fourth cycle. As will be appreciated, no action is generally taken within an L2 cache 230 in response to miss on a remote memory access request; such remote memory requests are accordingly discarded from dispatch pipeline 306. However, in the event of a hit or miss on a local memory access request or a hit on a remote memory access request, L2 cache 230 will service the memory access request, which for requests that cannot be serviced entirely within processing unit 104, may entail communication on local interconnect 114 via fabric controller 216.

At a predetermined time during processing of the memory access request within dispatch pipeline 306, arbiter 303 transmits the request address to cache array 302 via address and control path 330 to initiate a cache read of the memory block specified by the request address. A cache read takes 2 cycles in the exemplary embodiment. The memory block read from cache array 302 is transmitted via data path 342 to error correcting code (ECC) logic 344, which checks the memory block for errors and, if possible, corrects any detected errors. For processor load requests, the memory block is also transmitted to load data multiplexer M3 via data path 340 for forwarding to the affiliated processor core 200.

At the last cycle of the processing of a memory access request within dispatch pipeline 306, dispatch pipeline 306 make a dispatch determination. For example, dispatch pipeline 306 may make the dispatch determination based upon a number of criteria, including (1) the presence of an address collision between the request address and a previous request address currently being processed by a castout machine 310, snoop machine 311 or RC machine 312, (2) the directory information, and (3) availability of an appropriate RC machine 312, snoop machine 311 and/or CO machine 310 to process the memory access request. If dispatch pipeline 306 makes a dispatch determination that the memory access request is to be dispatched, the memory access request is dispatched from dispatch pipeline 306 to an RC machine 312, a pair of RC/CO machines 310 and 312, or a snoop machine 311, as appropriate. If the memory access request fails dispatch, the failure is signaled to the requestor (e.g., local or remote processor core 200) by a retry response. The requestor may subsequently retry the failed memory access request, if necessary.

While an RC machine 312 is processing a local memory access request, the RC machine 312 has a busy status and is not available to service another request. While an RC machine 312 has a busy status, the RC machine 312 may perform a directory write to update the relevant entry of directory 308, if necessary. In addition, the RC machine 312 may perform a cache write to update the relevant cache line of cache array 302. A directory write and a cache write may be scheduled by arbiter 303 during any interval in which dispatch pipeline 306 is not already processing other requests according to the fixed scheduling of directory reads and cache reads. When all operations for the given request have been completed, the RC machine 312 returns to an unbusy state.

As discussed above, moving a data set in a conventional data processing system implementing a RISC architecture undesirably consumes architected registers within the processor core to buffer data loaded from system memory until the data is stored from the architected registers back to system memory. In addition to consuming these vital resources, conventional techniques for moving a data set within system memory must also address the disparity in size that commonly exists between the sizes of memory granules (e.g., cache lines or other fixed size regions of memory) and architected processor registers. For example, in a typical case cache lines may be 128 bytes in length, while architected processor registers may be only 8 or 16 bytes. Consequently, moving an entire cache line of data in a RISC processor typically requires execution of an instruction loop including multiple instructions, each of which moves a register's worth of data. In at least one embodiment, these issues with conventional RISC processors are addressed by implementing instruction set architecture (ISA) support for copying a cache line (or other fixed sized memory granule) into a buffer that is not visible to user-level code, for "pasting" (i.e., storing) the memory granule to system memory or other memory-mapped resource, and for aborting a memory move instruction sequence.

Figure 4A:
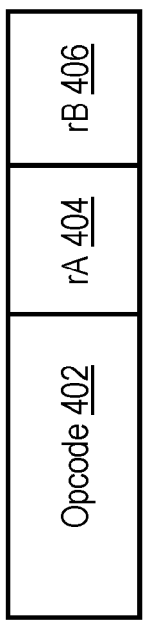
FIG. 4A illustrates a copy_first instruction in accordance with one embodiment.

Referring now to FIG. 4A, there is depicted a copy_first instruction 400 in accordance with one embodiment. As shown, in this embodiment, copy_first instruction 400, which is executable by an execution unit such as LSU 206a to initiate a copy-paste memory move instruction sequence, includes an opcode field 402 containing a predetermined operation code assigned to copy_first instructions. Copy_first instruction 400 further includes operand fields 404 and 406, which refer to registers (respectively referred to as register rA and register rB) used to form the target effective address (i.e., source effective address) from which a memory granule is to be copied. For example, in an embodiment in which indexed addressing is employed, the effective address is formed by adding the contents of registers rA and rB, unless one of the registers is register r0, in which case a zero is used in the computation rather than the register contents. Those skilled in the art will appreciate, however, that indexed addressing is but one of many possible techniques of determining a target effective address and that other embodiments may therefore determine the effective address employing a different address computation technique and/or using a greater or fewer number of operands.

When copy_first instruction 400 is executed by an execution unit 206 of a processor core 200 (e.g., by LSU 206a), the execution unit 206 computes the target effective address (i.e., source effective address) from the operands of copy_first instruction 400. The target effective address is translated by MMU 210 to determine the corresponding source real address. The execution unit 206 then transmits a copy_first request including a transaction type indicating the type of the request and the source real address to the associated L2 cache 230 for servicing.

Figure 4B:
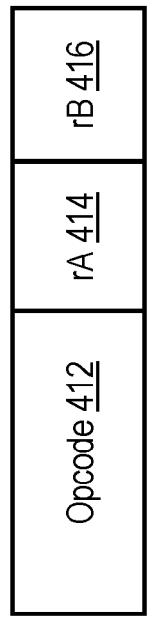
FIG. 4B depicts a paste_last instruction in accordance with one embodiment.

With reference now to FIG. 4B, there is illustrated a paste_last instruction 410 in accordance with one embodiment. As can be seen by comparison to FIG. 4B, paste_last instruction 410, which is executable by an execution unit such as LSU 206a to end a memory move instruction sequence, is formed similarly to copy_first instruction 400. In particular, paste_last instruction 410 includes an opcode field 412 containing a predetermined operation code assigned to paste_last instructions. Paste_last instruction 410 further includes operand fields 414 and 416, which refer to registers (respectively referred to as register rA and register rB) used to form the target effective address to which a memory granule is to be pasted (i.e., stored). For example, in an embodiment in which indexed addressing is employed, the effective address is formed by adding the contents of registers rA and rB, unless one of the registers is register r0, in which case a zero is used in the computation rather than the register contents. Again, those skilled in the art will appreciate that indexed addressing is but one of many possible techniques of determining a target effective address and that other embodiments may determine the effective address employing a different address calculation technique and/or using a greater or fewer number of operands.

When paste_last instruction 410 is executed by an execution unit 206 of a processor core 200 (e.g., by LSU 206a), the execution unit 206 computes the target effective address (i.e., destination effective address) from the operands of paste_last instruction 410. The destination effective address is translated by MMU 210 to determine the corresponding destination real address. The execution unit 206 then transmits a paste_last request including a transaction type indicating the type of the request and the destination real address to the associated L2 cache 230 for servicing. As shown in FIG. 3, CPD 300 returns to processor core 200 a complete indication via bus 334 to indicate servicing of the paste_last request by L2 cache 230 is complete and optionally additionally returns a pass/fail/busy indication via bus 336 to indicate whether or not the memory move terminated by the paste_last instruction 410 was performed (i.e., was successful).

Figure 4C:
FIG. 4C illustrates a cp_abort instruction in accordance with one embodiment.

Referring now to FIG. 4C, there is depicted a cp_abort instruction 420 in accordance with one embodiment. Cp_abort instruction 420, which is executable by an execution unit such as LSU 206a to abort a memory move instruction sequence, includes an opcode field 422. In a preferred embodiment, cp_abort instruction 420 includes no operand fields. Upon execution by an execution unit 206 of a processor core 200 (e.g., by LSU 206a), the execution unit 206 generates a cp_abort request and, if necessary, forwards the request to the associated L2 cache 230.

With reference now to FIG. 5A, there is illustrated a valid memory move instruction sequence 500 including copy_first and paste_last instructions in accordance with one embodiment. In this example, instruction sequence 500 begins with a copy_first instruction 502 (which has a source effective address shown as address A) followed in program order (optionally after one or more intervening instructions that are not copy_first or paste_last instructions) by paste_last instruction 504 (which has a destination effective address shown as address B). The execution of instruction sequence 500 causes the cache line (or some other fixed sized memory granule) corresponding to source effective address A to be copied into a non-architected buffer (in response to execution of copy_first instruction 502) and then (in response to execution of paste_last instruction 504) stored to the memory-mapped resource (e.g., cache line or other fixed size memory granule) corresponding to destination effective address B. The paste_last instruction 504 also causes CPD 300 to reset its internal logic in preparation to receive a next memory move instruction sequence. In embodiments in which the non-architected memory buffer utilized to buffer the target memory granule is advantageously sized to accommodate the entire target memory granule, performance is significantly improved as compared with conventional RISC memory move sequences, which as noted above utilize a loop of instructions to copy small chunks of a first cache line into multiple processor registers and then writing small chunks of the data from the multiple processor registers to a second target cache line. It should be appreciated that in some cases, the target effective address of paste_last instruction 504 can correspond to a storage location in a system memory 108. In other cases, the target effective address of paste_last instruction 504 can correspond to a memory-mapped resource, such as AS 218 or device 220 (e.g., a hardware accelerator) in one of processing units 104.

It should also be noted that in either case memory move instruction sequence 500 advantageously employs address translation (via MMU 210) for each of instructions 502 and 504, and consequently these address translation data structures (e.g., page table entries or the like) provide not only effective-to-real address translation, but also memory protection bits that can selectively be used to restrict access to both the resource corresponding to the source address of the copy and the resource corresponding to the destination address of the paste.

Referring now to FIG. 5B, there is depicted an exemplary illegal instruction sequence 510 including a paste_last instruction 512 not preceded by a copy_first instruction. Because instruction sequence 510 attempts to paste non-existent data to destination effective address C, the requests generated through execution of instruction sequence 510 are recognized as an illegal instruction sequence, and CPD 300 consequently returns a fail indication (if implemented) to the associated processor core 200 via bus 336 in response to receipt of the paste_last request corresponding to paste_last instruction 512. In addition, CPD 300 resets its internal logic in preparation to receive a next memory move instruction sequence.

FIG. 5C illustrates another illegal instruction sequence 520. In this case, instruction sequence 520 is illegal because it includes multiple copy_first instructions 522, 524 without an intervening paste_last instruction to signify completion of the memory move initiated by copy_first instruction 522. For instruction sequences like instruction sequence 520, handling can vary between implementations. For example, in some implementations all instructions between copy_first instruction 524 and paste_last instruction 526 are ignored. In other implementations, the processor core 200 may attempt to perform operations indicated by instructions between copy_first instruction 524 and paste_last instruction 526. In either case, CPD 300 returns a fail indication (if implemented) to the associated processor core 200 via bus 336 in response to receipt of the paste_last request corresponding to paste_last instruction 526 and resets its internal logic in preparation to receive a next memory move instruction sequence.

Referring now to FIG. 5D, there is depicted an exemplary memory move instruction sequence 530. In this example, a first hardware thread T0 is executing a well-formed memory move instruction sequence initiated by copy_first instruction 532. Following execution of copy_first instruction 532 and prior to execution of the corresponding paste_last instruction, hardware thread T0 is interrupted, for example, by an operating system (OS) or hypervisor, and the memory move instruction sequence is subsequently re-dispatched on a second hardware thread T1. On hardware thread T0, the control program (e.g., OS or hypervisor) executes a cp_abort instruction 534, which frees the memory move facilities of thread T0 in L2 cache 230 to be able to process a new memory move sequence. Before the OS or hypervisor causes the memory move instruction sequence to be re-dispatched on hardware thread T1, the OS or hypervisor also executes a cp_abort instruction 536 on hardware thread T1 that frees the memory move facilities of hardware thread T1 in L2 cache 230. The well formed memory move instruction sequence then resumes on thread T1. When paste_last instruction 538 is executed on hardware thread T1, the corresponding paste_last request will appear to L2 cache 230 as lacking a preceding copy_first request (as in FIG. 5B) and will therefore cause a fail indication to be returned via bus 336. In response to the fail indication, the user level software will simply repeat the memory move instruction sequence, which will pass on a subsequent (if not the immediately next) execution.

Implementation of an explicit cp_abort instruction (and transmission of the corresponding cp_abort request to L2 cache 230) eliminates the requirement to port state and other information between threads on a context switch (although some embodiments disclosed herein support this capability). Further, the cp_abort instruction desirably enables implementation of checking for well-formed memory move instruction sequences in the storage subsystem (e.g., in L2 cache 230) rather than in processor core 200.

With reference now to FIG. 5E, there is illustrated another exemplary instruction sequence 540 including a context switch during execution of a memory move. As can be seen, the portion of instruction sequence 540 executed on hardware thread T0 is an illegal instruction sequence similar to that shown in FIG. 5C in that it includes copy_first instructions 542 and 544 without an intervening paste_last instruction. However, because the malformed portion of instruction sequence 540 is executed on hardware thread T0 prior to the context switch (and execution of the cp_abort instruction 546 that precedes it) and because the remaining portion of instruction sequence 540 executed on hardware thread T1 (i.e., the copy_first instruction 550 and paste_last instruction 552 that follow cp_abort 548) is well formed, the portion of instruction sequence 540 executed on hardware thread T1 receives a pass indication.

Those skilled in art will appreciate that in other embodiments instruction sequence 540 of FIG. 5E could alternatively be flagged as failing, for example, by migrating state information for the different hardware threads within the storage subsystem or by implementing additional state information in the processor core 200. However, in at least some embodiments, implementing the additional logic to support detection of this particular corner case entails more hardware expense than is worthwhile.

Having described an exemplary data processing environment and exemplary instructions that can be used to form memory move instruction sequences, architectural level pseudocode descriptions of the exemplary instructions are now given. These pseudocode descriptions describe, independently of actual implementation, the functions performed by the instructions and how the instructions manipulate memory move state variables.

In an exemplary embodiment, the per-hardware-thread memory move variables manipulated by the memory move instructions include at least: (1) "move in progress" (MIP) and (2) valid (V). MIP is a flag that is set to indicate that a copy_first instruction initiating a memory move instruction sequence has been detected. MIP is set in response to detection of the copy_first instruction if MIP is not set. MIP is reset in response to detection of a paste_last instruction or cp_abort instruction.

The valid (V) variable is a flag that indicates whether or not the memory move instruction sequence is still well-formed (e.g., a copy_first instruction has been detected, but not the corresponding copy_last instruction). The valid flag is set in response to detecting the first copy_first in a memory move instruction sequence and is reset in response to detecting an invalid instruction after the copy_first instruction (e.g., another copy_first instruction without an intervening paste_last instruction) or in response to detecting a paste_last instruction that terminates the memory move instruction sequence or in response to detecting a cp_abort instruction. In general, MIP is the primary variable and reflects whether or not a valid memory move instruction sequence is in progress. Consequently, if MIP is reset to indicate completion of a memory move instruction sequence, the aborting of a memory move instruction sequence, or the invalidity of memory move instruction sequence, the resetting of other variables (e.g., the V flag) is optional.

In one embodiment, the copy_first instruction can be described in pseudocode as follows:

```
copy_first
if (mip == 1) then
    v <- 0;              // copy_first detected when sequence was
                         already started.
else
    v <-1;               // copy_first properly initiates a memory
                         move
    mip <- 1             // indicate that memory move underway.
    copy data to buffer  // copy the data.
fi
```

According to this pseudocode, processing of a copy_first instruction determines if a memory move instruction sequence has already been initiated (e.g., if MIP is set). If so, the copy_first instruction resets the valid flag (e.g., to 0) to indicate that the memory move instruction sequence is invalid. It should be noted that no copy of data residing at the source address is performed in this case, and based on the valid flag being reset, any subsequent pastes in the memory move instruction sequence also will not be performed. If, however, a determination is made that the memory move instruction sequence is well formed so far (e.g., MIP is initially reset to 0), then processing of the copy_first instruction sets MIP (e.g., to 1) to indicate that a memory move instruction sequence has been initiated and additionally sets V (e.g., to 1) to indicate that the memory move instruction sequence is valid so far. In addition, the processing of the copy_first instruction logically copies the data granule identified by the source address to a buffer.

In one embodiment, the paste_last instruction can be described in pseudocode as follows:

```
paste_last
if (mip == 0 OR v == 0) then
    mip <- 0;            // reset flags for next sequence
    v <- 0;
    return fail to CR    // paste_last is alone or sequence is already
                         invalid.
else
    paste data to memory from copy buffer;   // do the write.
                         //
    mip <- 0;            // reset flags for next sequence
    v <- 0;              //
    return pass to CR;   //
fi
```

Processing of the paste_last instruction first checks if MIP is reset (e.g., the paste_last instruction was not preceded by a copy_first instruction as in FIG. 5B) or if V is reset (e.g., because multiple copy_first instructions are placed at the beginning of an instruction sequence as in FIG. 5C). If either of these conditions is detected, the MIP and V flags are reset, a fail indication is returned to the processor core, and no data is written to the memory-mapped resource. On the other hand, if neither of these conditions is detected, the contents of the buffer are written to the memory-mapped resource. In addition, after that write is complete, a pass indication is returned to the processor core, and the MIP and V flags are reset.

It should be noted that in the embodiment represented by the above pseudocode, once it is detected that a memory move instruction sequence is malformed, copies from memory and writes to memory-mapped resource cease to be performed. It should be appreciated that this is a design choice that can differ in other embodiments. For example, in at least one embodiment, a memory copy may be performed for each copy_first instruction, and/or a write may be performed for each paste_last instruction regardless of the detection of a malformed memory move instruction sequence.

In one embodiment, the cp_abort instruction can be described in pseudocode as follows:

```
cp_abort
mip <- 0;    // Memory move instruction sequence no longer in process
v <- 0;      // Reset valid.
```

As indicated above, the cp_abort instruction resets the MIP and V flags. In this embodiment, resetting both of the MIP and V flags causes the contents of the buffer, if any, to be abandoned.

Figure 6:
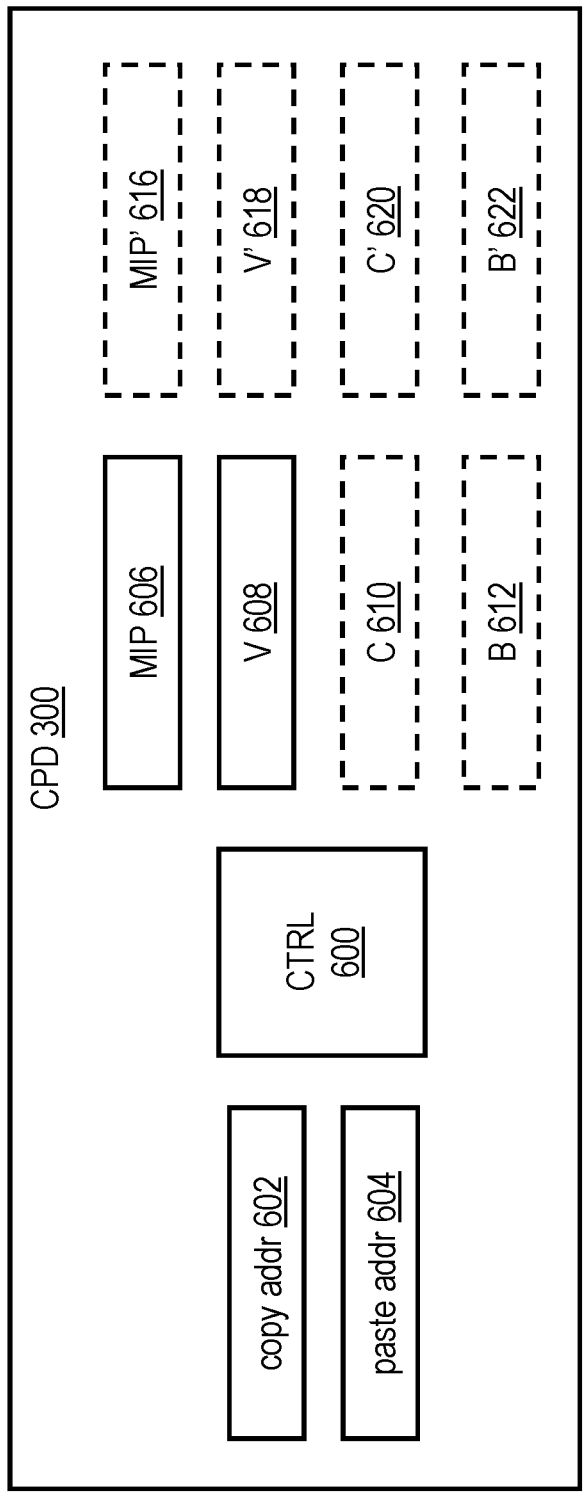
FIG. 6 is a more detailed block diagram of a copy-paste dispatch (CPD) unit in accordance with one embodiment.

Referring now to FIG. 6, there is depicted a more detailed block diagram of a copy-paste dispatch unit (CPD) 300 in accordance with one embodiment. In the depicted example, CPD 300 includes a copy address register 602 that specifies a source (real) address from which a data granule is to be copied, a paste address register 604 that specifies a destination (real) address to which a data granule is to be pasted (written). In addition, CPD 300 includes an MIP flag 606 and V flag 608 as described above. An additional copy (C) flag 610 supporting streams of copy-type and paste-type instructions and a busy (B) flag 612 supporting targeting devices 220 with memory move instructions sequences can be independently implemented in some embodiments, as described below. In embodiments including optional support for speculation of memory move instructions sequences as described further herein, CPD 300 further includes speculative flags 616-622 (denoted herein by prime (x') notation) corresponding to flags 606-612. CPD 300 also includes control logic 600 that implements the semantics for at least the copy_first, paste_last and cp_abort requests described above.

In one preferred embodiment, control logic 600 responds to a copy-type (e.g., copy_first) request by placing the source address in copy address register 602, but does not initiate the indicated copy operation until a corresponding paste-type (e.g., paste_last) request is received. By delaying initiation of the copy operation until the corresponding paste-type request is received, resources such as an RC machine 312 and RCDAT buffer 322 that are utilized to perform the copy operation can remain available for allocation to other operations until it is confirmed that the memory move instruction sequence is not malformed or has not been migrated to another hardware thread via a context switch. It is, of course, possible to instead allocate the resources in response to receipt of the copy-type request and release the resources in response to detecting the memory move instruction sequence has become malformed or has been moved to another hardware thread, but this alternative implementation generally results in lower resource availability and lower performance.

Figure 7:
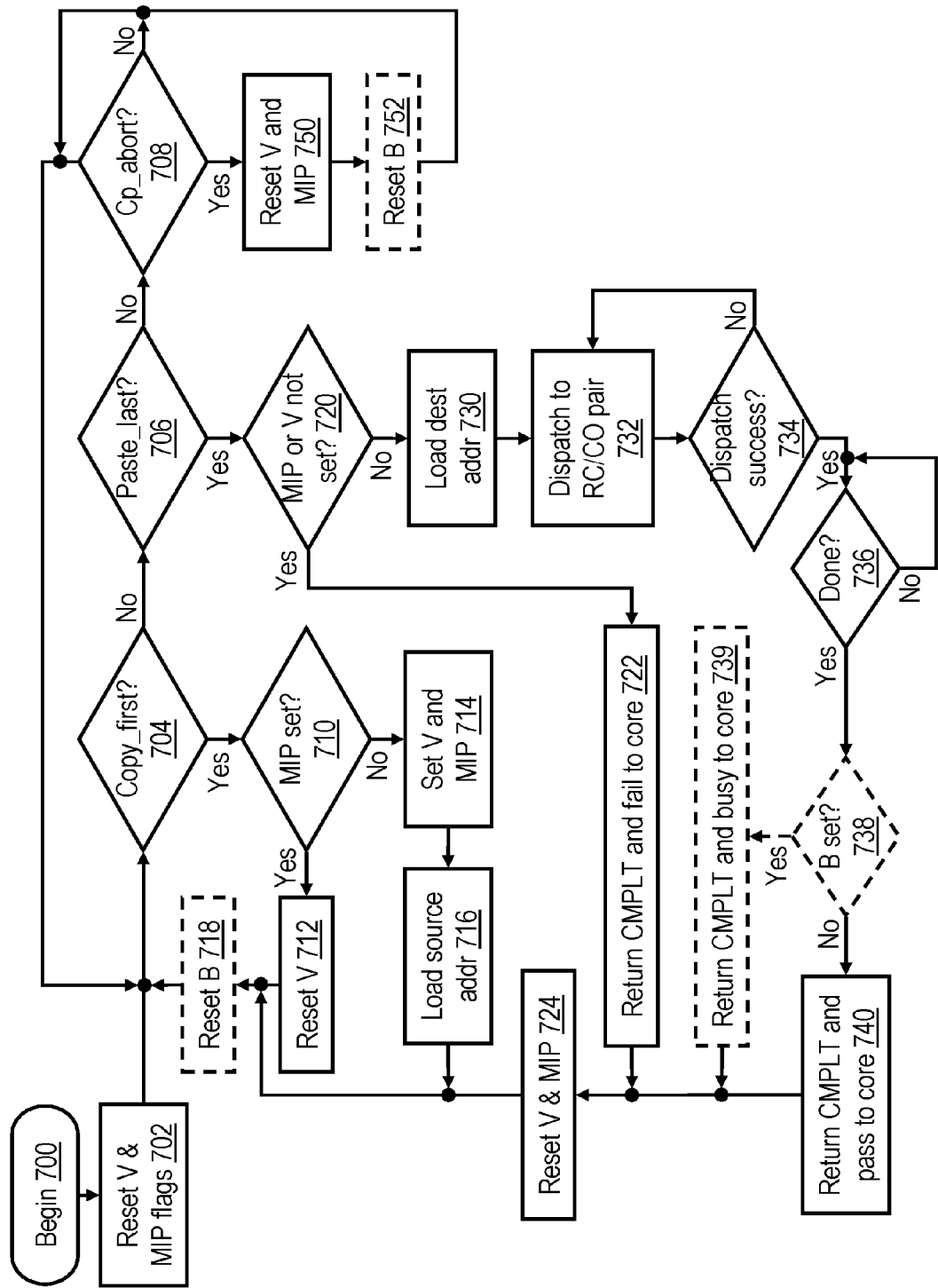
FIG. 7 is a high level logical flowchart of an exemplary method by which a processing unit handles memory access requests initiated by execution of memory move instructions in accordance with the embodiment of FIG. 6.

With reference now to FIG. 7, there is illustrated a high level logical flowchart of an exemplary method by which a processing unit 104 handles memory access requests initiated by execution of memory move instructions in accordance with the embodiment of FIG. 6. As with the other flowcharts presented herein, steps are presented in logical rather than strictly chronological order and in some embodiments one or more steps can be performed in an alternative order or concurrently. In the following description, it is assumed that the illustrated processing is performed by CPD 300 of FIG. 6. The flowchart further assumes an embodiment in which L2 STQ 304 maintains relative program sequence of copy-type and paste-type requests. It should also be noted that FIG. 7 represents optional steps utilizing blocks shown in dashed line illustration. These steps are performed only in embodiments in which memory-mapped devices, such as AS 218 and devices 220 can be targets of memory move instruction sequences in addition to system memories 108. In embodiments in which only system memories 108 can be targets of memory move instruction sequences, such steps are omitted.

The process of FIG. 7 begins at block 700 and then proceeds to block 702, which illustrates CPD 300 resetting (e.g., to 0) MIP flag 606 and V flag 608. The process then proceeds to blocks 704, 706 and 708, which illustrate CPD 300 monitoring for receipt of any of a copy_first, paste_last or cp_abort request from the associated processor core 200. In response to receipt of a copy_first request at block 704, CPD 300 determines at block 710 whether or not MIP flag 606 is set (e.g., to 1). If so, CPD 300 determines that the instruction sequence is malformed and accordingly resets V flag 608 (block 712). In embodiments in which the target of memory move instruction sequences is restricted to system memory 108, CPD 300 thereafter resumes monitoring for memory move requests, as indicated by the process returning to blocks 704-708. In other embodiments in which the target of a memory move instruction sequences can be AS 218 or a device 220, the process resets (e.g., to 0) B flag 612 prior to returning to blocks 704-708, as shown at block 718.

In response to CPD 300 determining at block 710 that MIP flag 606 is not set, CPD 300 sets MIP flag 606 and V flag 608 to indicate initiation of a well formed memory move instruction sequence (block 714) and places the source (real) address specified by the copy_first request in copy address register 602 (block 716). In embodiments in which the target of memory move instruction sequences is restricted to system memory 108, the process then returns to blocks 704-708, which have been described. In other embodiments in which the target of a memory move instruction sequences can be AS 218 or a device 220 in addition to system memories 108, the process resets B flag 612 prior to returning to blocks 704-708, as shown at block 718.

Referring now to block 706, in response to receipt of a paste_last request, CPD 300 determines whether either of MIP flag 606 or V flag 608 is reset (block 720). If so, the memory move instruction sequence is malformed. Consequently, CPD 300 returns a CMPLT indication (indicating the end of a memory move instruction sequence) and a fail indication (indicating that the memory move instruction sequence failed) to the processor core 200 via buses 334 and 336, respectively (block 722). In response to the CMPLT and fail indications, processor core 200 resets E bit 205 (e.g., to 0) to signify failure of the memory move instruction sequence and, in other embodiments in which the target of a memory move can be an AS 218 or a device 220, resets (e.g., to 0) G bit 207 to indicate that the cause of failure was not a BUSY response from the target of the memory move instruction sequence. At block 724, CPD 300 additionally resets MIP flag 606 and V flag 608. Thereafter, the process returns to block 704-708, after resetting, if necessary, B flag 612 at block 718.

If, on the other hand, a malformed instruction sequence is not detected at block 720, CPD 300 places the destination (real) address specified by the paste_last request into paste address register 604 (block 730). In addition, CPD 300 places in dispatch pipeline 306 a request to dispatch a RC machine 312 and CO machine 310, where the RC machine 312 is for performing a copy of the target data granule into the corresponding RCDAT buffer 322 and the CO machine 310 is for performing the paste of the data granule from the RCDAT buffer 322 to the destination (block 732). Thus, this arrangement advantageously allows existing circuitry (i.e., RC machine 312, RCDAT 322 and CO machine 310) to be leveraged to perform an additional function. As indicated at block 734, if the dispatch of the matched pair of RC machine 312 and CO machine 310 fails, the process returns to block 732. If the dispatch from dispatch pipeline 306 is successful, CPD 300 awaits completion of the indicated copy and paste operations (block 736). As will be appreciated, in which an AS 218 or device 220 is assigned a destination real address and/or contains the storage location associated with the destination real address of the paste_last request, the paste operation can entail the CO machine 310 issuing a command on the interconnect fabric to write the data granule into the memory-mapped storage location. The AS 218 or device(s) 220 can be configured to perform any of a number of operations in response to such a command. As one example, a device 220 can be configured to initiate a direct memory access (DMA) utilizing the destination real address or another address, to perform a predetermined computation on a data set, or to initiate a communication. Other examples of the operation an AS 218 are described further below with respect to FIGS. 23-27.

As indicated by block 738, in embodiments in which AS 218 and device(s) 220 can serve as targets of memory move instruction sequences, CPD 300 determines in response to an affirmative determination at block 736 whether or not B flag 612 has been set (e.g., to 1) to indicate that a memory-mapped device, such as an AS 218 or device 220, could not accept the memory move data. If not, or in cases in which the memory move instruction sequence targets a real address in system memory 108 rather than a memory-mapped device (in which case B flag 612 is never set), the process proceeds to block 740. However, in response to a determination that B flag 612 was set during the memory move instruction sequence, the process instead proceeds to block 739, which illustrates CPD 300 returning a CMPLT indication and busy indication to processor core 200 via buses 334 and 336, respectively. In response to the CMPLT and busy indications, processor core 200 resets E bit 205 (e.g., to 0) to indicate failure of the memory move instruction sequence and sets G bit 207 (e.g., to 1) to indicate the cause of failure was a BUSY response from the target of the memory move instruction sequence. Thereafter, the process passes to block 724 and following blocks, which have been described.

Block 740 depicts CPD returning a CMPLT indication (indicating the end of a memory move instruction sequence) and a pass indication (indicating that the memory move instruction sequence passed) to the processor core 200 via buses 334 and 336, respectively. In response to the CMPLT and pass indications, processor core 200 sets E bit 205 to indicate success of the memory move instruction sequence and resets G bit 207. Thereafter, the process passes to block 724 and following blocks, which have been described.

Referring now to block 708, in response to receipt by CPD 300 of a cp_abort request, CPD 300 resets MIP flag 606 and V flag 608 (block 750). In embodiments in which the targets of memory move instruction sequences are restricted to real addresses in system memories 108, the process returns to blocks 704-708 following block 750. In other embodiments in which the target of the memory move instruction sequence is permitted to be a memory-mapped device (e.g., an AS 218 or a device 220), the process instead proceeds to blocks 752, which illustrates CPD 300 resetting B flag 612 (e.g., to 0). The process then returns to blocks 704-708, which have been described.

In the embodiment of FIG. 7, the state variables represented by MIP flag 606 and V flag 608 are maintained with the storage subsystem and specifically within CPD 300. In an alternative embodiment such as that shown in FIG. 8, these state variables are not tracked in the storage subsystem, but are instead tracked in processor core 200, for example, in a machine state register (MSR) 820, which includes an MIP flag 822 and V flag 824. An additional copy (C) flag 826 supporting streams of copy-type and paste-type instructions and a busy (B) flag 828 supporting targeting devices 220 with memory move instructions sequences can be independently implemented in some embodiments, as described below. Processor core 200 may also optionally include a real address (RA) register 830 utilized in some embodiments to support migration of memory move instruction sequences between threads, as discussed below with reference to FIGS. 19-20. As noted above, in embodiments further including optional support for speculative execution of memory move instruction sequences, processor core 200 may further include speculative flags 840 including MIP' flag 842, V' flag 844, C' flag 846 and B' flag 848 corresponding to flags 822-828. While in this embodiment CPD 800 retains control logic 810 to manage servicing of memory move requests received from processor core 200, additional control logic 812 is implemented in processor core 200 (e.g., in LSU 206a) to, among other things, manage updates to MIP flag 822 and V flag 824.

While control logic 812 is implemented in the more expensive transistors found in processor core 200 in this case, this arrangement facilitates the transfer of state variables between hardware threads when a memory move instruction sequence is migrated by a context switch. Consequently, illegal instruction sequences that are interrupted by a context switch (such as that given in FIG. 5D) can be detected. To enable this functionality, the architectural semantics of the cp_abort instruction are modified such that it only resets the V flag, but does not reset the MIP flag. Thus, in this embodiment, the MIP flag is only reset by the paste_last instruction.

Figure 8:
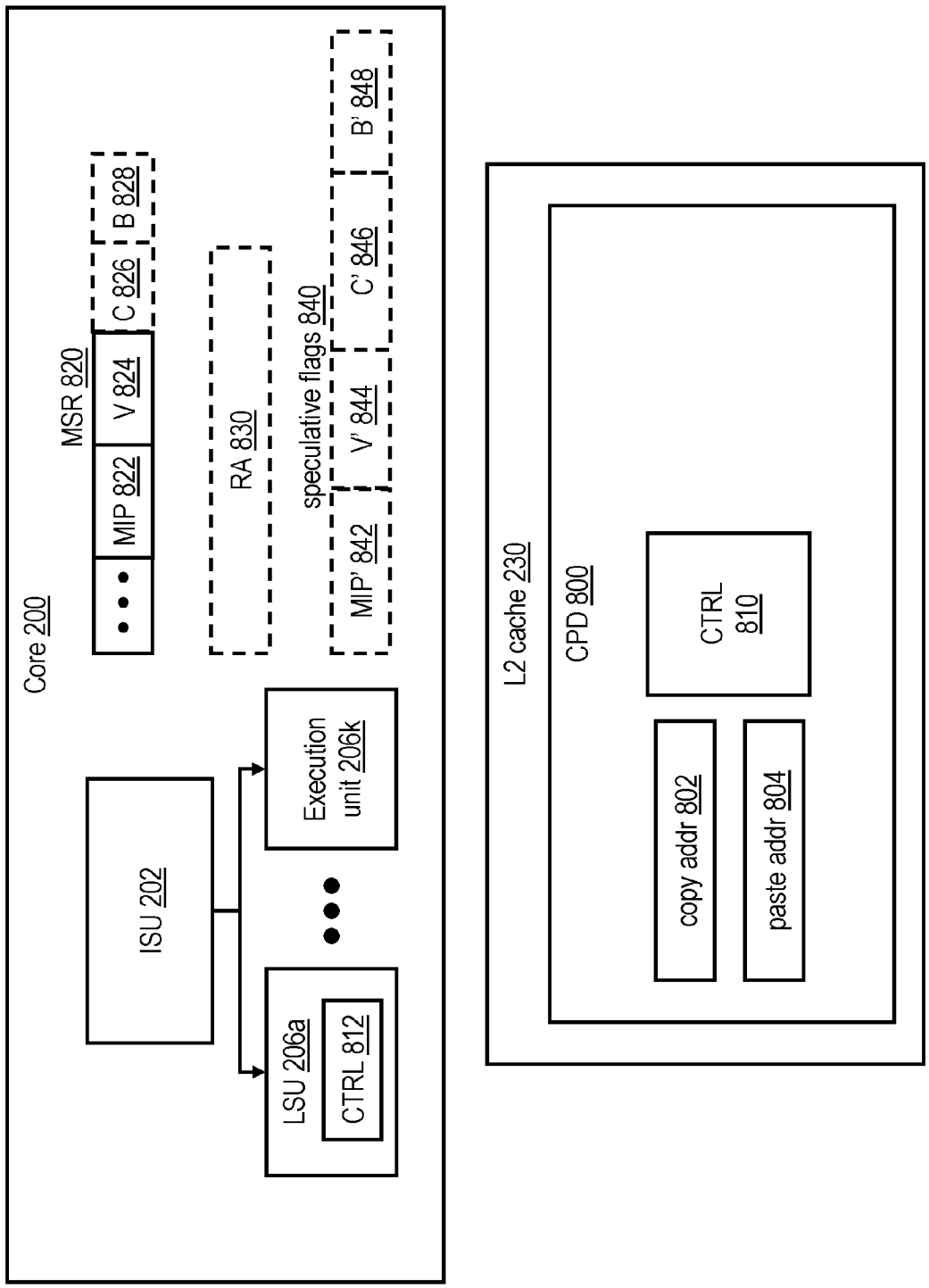
FIG. 8 is a more detailed block diagram of a copy-paste dispatch unit and processor core in accordance with another embodiment.
Figure 9:
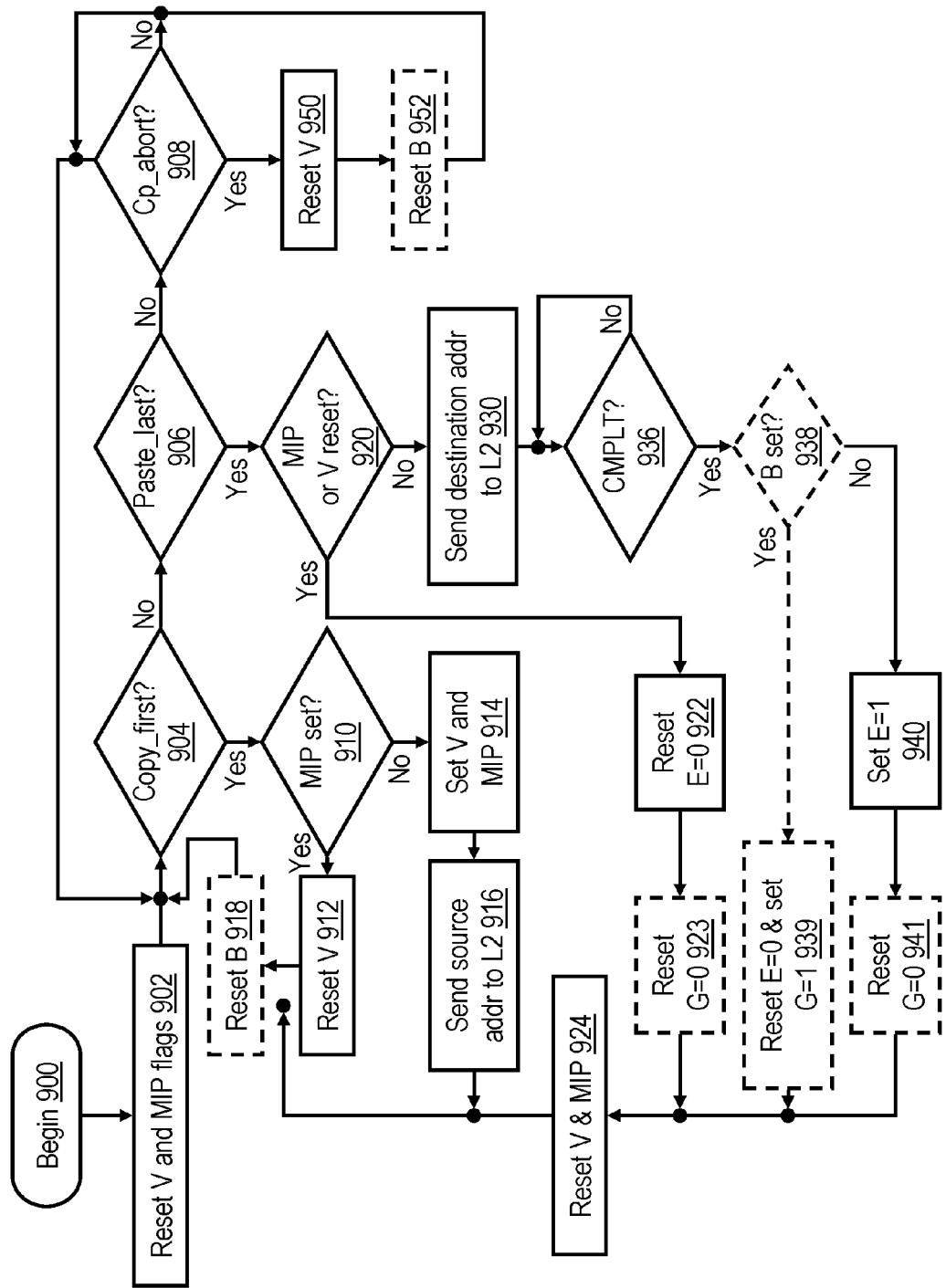
FIG. 9 is a high level logical flowchart of an exemplary method by which a processor core handles memory access requests initiated by execution of memory move instructions in accordance with the embodiment of FIG. 8.

With reference now to FIG. 9, there is illustrated a high level logical flowchart of an exemplary method by which a processor core handles memory access requests initiated by execution of memory move instructions in accordance with the embodiment of FIG. 8. In the following description, it is assumed that the illustrated processing is performed by control logic 812 of FIG. 8. It should also be noted that FIG. 9 represents optional steps utilizing blocks shown in dashed line illustration. These steps are performed only in embodiments in which memory-mapped devices, such as AS 218 and devices 220 can be targets of memory move instruction sequences in addition to system memories 108. In embodiments in which only system memories 108 can be targets of memory move instruction sequences, such steps are omitted.

The process of FIG. 9 begins at block 900 and then proceeds to block 902, which illustrates control logic 812 resetting (e.g., to 0) MIP flag 822 and V flag 824. The process then proceeds to blocks 904, 906 and 908, which illustrate control logic 812 monitoring for receipt from ISU 202 of any of copy_first, paste_last or cp_abort instructions.

In response to receipt of a copy_first instruction at block 904, control logic 812 determines at block 910 whether or not MIP flag 822 is set (e.g., to 1). If so, control logic 812 determines that the instruction sequence is malformed and accordingly resets V flag 824 (block 912). In embodiments in which the target of memory move instruction sequences is restricted to system memory 108, control logic 812 thereafter resumes monitoring for memory move requests, as indicated by the process returning to blocks 904-908. In other embodiments in which the target of a memory move instruction sequences can be AS 218 or a device 220 in addition to system memories 108, the process resets (e.g., to 0) B flag 828 prior to returning to blocks 904-908, as shown at block 918.

In response to control logic 812 determining at block 910 that MIP flag 822 is not set, control logic 812 sets MIP flag 822 and V flag 824 to indicate initiation of a well formed memory move instruction sequence (block 914) and transmits a copy_first request specifying the source (real) address to the associated L2 cache 230 (block 916). The process then returns to blocks 904-908, which have been described. In embodiments in which the target of memory move instruction sequences is restricted to system memory 108, control logic 812 thereafter resumes monitoring for memory move requests, as indicated by the process returning to blocks 904-908. In other embodiments in which the target of a memory move instruction sequences can be AS 218 or a device 220 in addition to one of system memories 108, the process resets (e.g., to 0) B flag 828 prior to returning to blocks 904-908, as shown at block 918.

Referring now to block 906, in response to receipt of a paste_last instruction from ISU 202, control logic 812 determines whether either of MIP flag 822 or V flag 824 is reset (block 920). If so, the memory move instruction sequence is malformed. Consequently, control logic 812 resets E bit 205 of CR 204 (e.g., to 0) to indicate failure of the memory move instruction sequence (block 922) and, in embodiments in which a memory-mapped device can be the target of a memory move instruction sequence, also resets G bit 207 of CR 204 (e.g., to 0) to indicate that the cause of failure was not a BUSY response from the target of the memory move instruction sequence (block 923). As shown at block 924, control logic 812 also resets MIP flag 822 and V flag 824 (block 924). Thereafter, the process returns to block 904-908, after resetting, if necessary, B flag 828 at block 918.

Returning to block 920, if a malformed instruction sequence is not detected at block 920, control logic 812 transmits a paste_last request specifying the destination (real) address to L2 cache 230 (block 930). Control logic 812 then awaits receipt of a CMPLT indication from the associated L2 cache 230 indicating that the requested paste operation is complete (block 936). In embodiments in which the target of the memory move instruction sequence can be a memory-mapped device, control logic 812 then determines at block 938 whether or not B flag 828 is set to indicate that the target device provided a BUSY response to the memory move and thus was not able to accept the incoming data. If not (or in embodiments in which block 938 is omitted), the process proceeds to block 940, which illustrates control logic 812 setting E bit 205 (e.g., to 1) to indicate success of the memory move instruction sequence. In embodiments in which the target of the memory move instruction sequence is permitted to be a memory-mapped device (e.g., AS 218 or device 220), control logic 812 also resets G bit 207 (e.g., to 0) to indicate that no BUSY response was received (block 941). If, however, control logic 812 determines at block 938 that B flag 828 is set, control logic 812 resets E bit 205 (e.g., to 0) to indicate failure of the memory move instruction sequence and sets G bit 207 (e.g., to 1) to indicate a BUSY response from the target of the memory move instruction sequence was the cause of failure (block 939). Following block 939 or block 941, the process returns to blocks 924 and following blocks, which have been described.

Referring now to block 908, in response to receipt by control logic 812 of a cp_abort request, control logic 812 resets V flag 826 (block 950). In embodiments in which the target of the memory move instruction sequence can be only a system memory 108, the process returns to blocks 904-908 following block 950. In other embodiments in which the target of the memory move instruction sequence is permitted to be a memory-mapped device (e.g., an AS 218 or a device 220), the process instead proceeds to block 952, which illustrates control logic 812 resetting B flag 828 in MSR 820. Thereafter, the process returns to blocks 904-908, which have been described.

Figure 10:
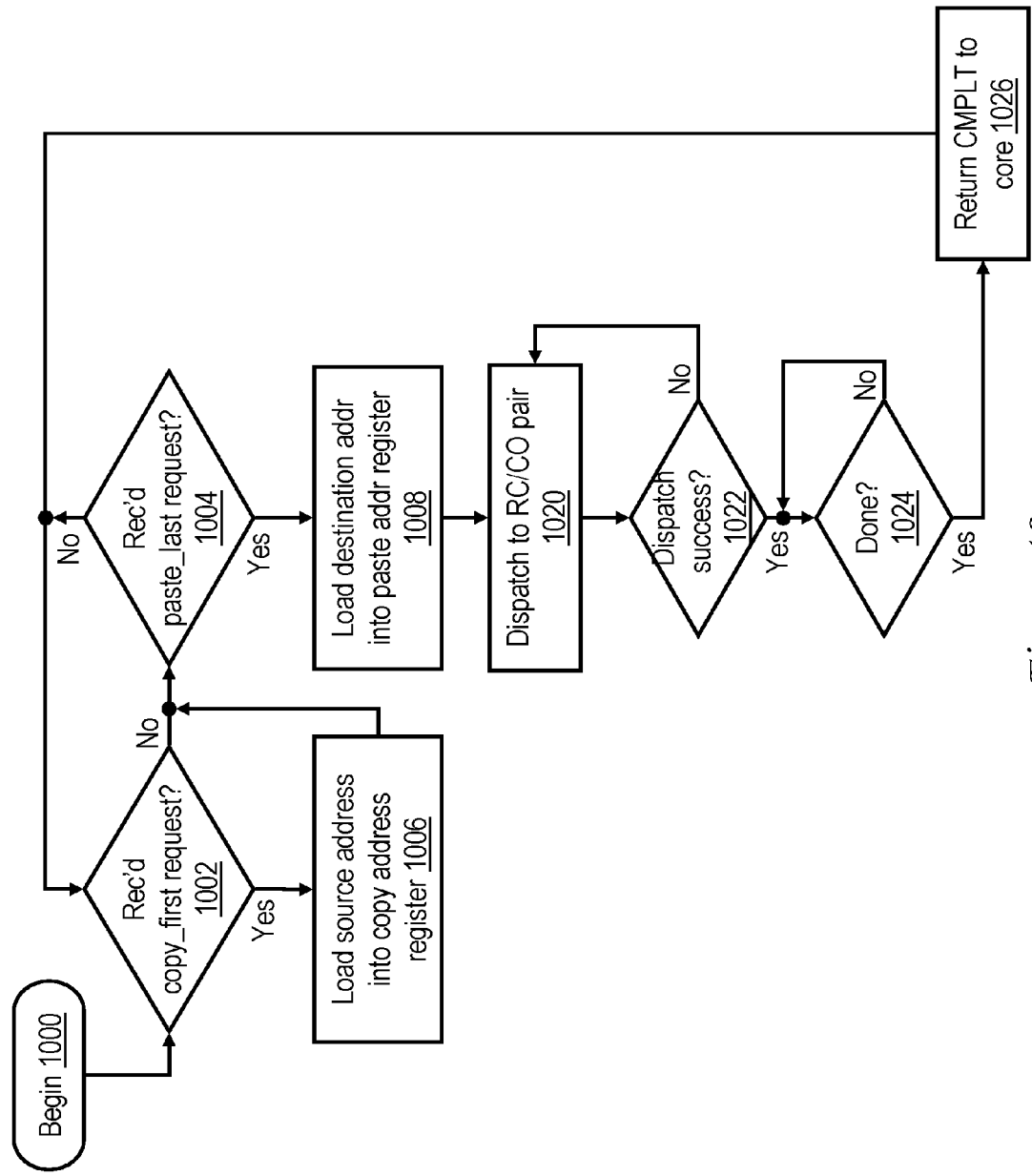
FIG. 10 is a high level logical flowchart of an exemplary method by which a store-in lower level cache memory handles memory access requests initiated by execution of memory move instructions in accordance with the embodiment of FIG. 8.

Referring now to FIG. 10, there is depicted a high level logical flowchart of an exemplary method by which a store-in lower level cache memory handles memory access requests initiated by execution of memory move instructions in accordance with the embodiment of FIG. 8. In the following, the operations shown in FIG. 10 are described as being performed by control logic 810 of CPD 800, which receives copy_first and paste_last requests from L2 STQ 304 in program sequence.

The process begins at block 1000 and then proceeds to blocks 1002 and 1004, which illustrate control logic 810 monitoring for receipt of either a copy_first request or paste_last request from the associated processor core 200, as discussed above with reference to blocks 916 and 930 of FIG. 9. In response to receipt of a copy_first request, control logic 810 places the source (real) address specified by the copy_first request into copy address register 802 (block 1006). The process then passes from block 1006 to block 1004.

In response to receipt of a paste_last request at block 1004, control logic 810 places the destination (real) address specified by the paste_last request into paste address register 804 (block 1008). In addition, control logic 810 places in dispatch pipeline 306 of L2 cache 230 a request to dispatch a RC machine 312 and CO machine 310, where the RC machine 312 is for performing a copy of the target data granule identified by the source address in the copy address register 602 into the corresponding RCDAT buffer 322 and the CO machine 310 is for performing the paste of the data granule from the RCDAT buffer 322 to the destination address in memory specified by paste address register 604 (block 1020). As indicated at block 1022, if the dispatch of the matched pair of RC machine 312 and CO machine 310 fails, the process returns to block 1020. If the dispatch from dispatch pipeline 306 is successful, control logic 810 awaits completion of the indicated copy and paste operations (block 1024). Once the copy and paste operations are complete, as indicated, for example, by done signal 335, control logic 810 returns a CMPLT indication (indicating the end of a memory move instruction sequence) and a pass indication (indicating that the memory move instruction sequence passed) to the processor core 200 via buses 334 and 336, respectively (block 1026). Thereafter, the process returns to blocks 1002-1004, which have been described.

Another design variation shown in FIG. 3 in dashed line illustration employs a special purpose copy-paste engine (CPE) 332 to service copy and paste requests rather than, or in addition to, RC machines 312 and CO machines 310. FIG.

11 illustrates a high level block diagram of an exemplary embodiment of CPE 332. In the illustrated embodiment, CPE 1100 includes one or more cp_RC machines 1100, each of which is dedicated to performing copy operations indicated by copy-type requests, and one or more cp_CO machines 1102, each of which is dedicated to performing paste operations indicated by paste-type requests. In addition, CPE 332 includes a set of cp_RCDAT buffers 1104 into which data granules are copied from memory by cp_RC machine(s) 1100 and from which data granules are written to memory by cp_CO machine(s) 1102. One advantage of implementing cp_RC machines 1100 and cp_CO machines 1102 as dedicated machines is that these state machines can be considerably simpler in design than the RC machines 312 and CO machines 310, which are designed to service a variety of requests.

It should be noted that the heretofore described embodiments have been described as handling only one copy_first/paste_last instruction pair in a memory move instruction sequence. Those skilled in the art will recognize that by concurrently using multiple RC/CO machines and/or by implementing multiple cp_RC and cp_CO machines, multiple copy_first/paste_last instruction pairs can be serviced at the same time. Nothing requires that the copy_first/paste_last instructions and the associated requests to the storage subsystem be performed in program order. Further, even if adherence to program order were architecturally required or selected, each copy operation could still be performed in any chronological order with respect to other copy operations and with respect to the paste operations (other than its corresponding paste operation), and each paste operation can be performed in program order with respect to its corresponding copy operation and the other paste operations.

Figures 11, 12A, 12B:
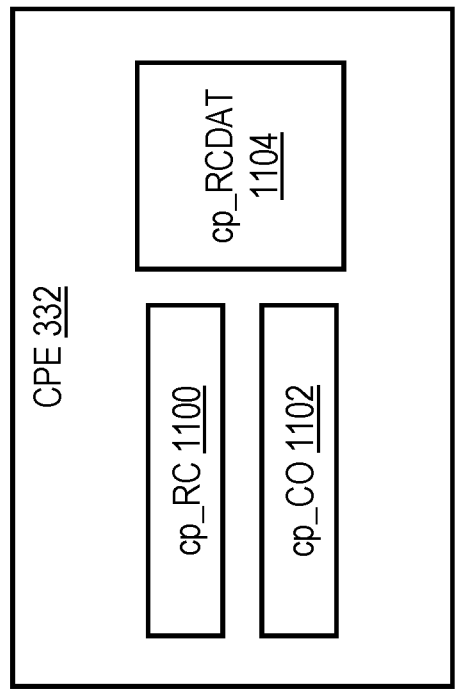
FIG. 11 is a high level block diagram of a copy-paste engine (CPE) in accordance with one embodiment.
FIG. 12A illustrates a copy instruction in accordance with one embodiment.
FIG. 12B depicts a paste instruction in accordance with one embodiment.

In accordance with another aspect of the inventions disclosed herein, a memory move instruction sequence can be extended to include a stream of multiple copy-and-paste instruction pairs. Referring now to FIG. 12A, there is illustrated a copy instruction suitable for use in a stream of multiple copy and paste instructions in accordance with one embodiment. As shown, in this embodiment, copy instruction 1200, which is executable by an execution unit such as LSU 206a to initiate a copy operation in a memory move instruction sequence, includes an opcode field 1202 containing a predetermined operation code assigned to copy instructions. Copy instruction 1200 further includes operand fields 1204 and 1206, which refer to registers (respectively referred to as register rA and register rB) used to form the target effective address (i.e., source address) from which a memory granule is to be copied. As with the copy_first instruction described above, the target effective address of copy instruction 1200 can be formed from the contents of registers rA and rB utilizing indexed addressing. Those skilled in the art will appreciate, however, that indexed addressing is but one of many possible techniques of determining a target effective address and that other embodiments may therefore determine the effective address employing a different technique and/or using a greater or fewer number of operands.

In the embodiment of FIG. 3, when copy instruction 1200 is executed by an execution unit 206 of a processor core 200 (e.g., by LSU 206a), the execution unit 206 computes the source effective address from the operands of copy instruction 1200. The source effective address is translated by MMU 210 to determine the corresponding source real address. The execution unit 206 then transmits a copy request including a transaction type indicating the type of the request and the source real address to the associated L2 cache 230 for servicing.

With reference now to FIG. 12B, there is illustrated a paste instruction suitable for use in a stream of multiple copy and paste instructions in accordance with one embodiment. Paste instruction 1210 includes an opcode field 1212 containing a predetermined operation code assigned to paste instructions. Paste instruction 1210 further includes operand fields 1214 and 1216, which refer to registers (respectively referred to as register rA and register rB) used to form the target (i.e., destination) effective address to which a memory granule is to be pasted (i.e., stored). Again, those skilled in the art will appreciate that in various embodiments indexed addressing or some alternative technique of determining a target effective address can be employed and that in other embodiments a greater or fewer number of operands can be used.

In the embodiment of FIG. 3, when paste instruction 1210 is executed by an execution unit 206 of a processor core 200 (e.g., by LSU 206a), the execution unit 206 computes the target (i.e., destination) effective address from the operands of paste instruction 1210. The destination effective address is translated by MMU 210 to determine the corresponding destination real address. The execution unit 206 then transmits a paste request including a transaction type indicating the type of the request and the destination real address to the associated L2 cache 230 for servicing.

Given these additional copy and paste instructions, a legal memory move instruction stream begins with a copy_first instruction, includes zero or more instruction pairs including a paste instruction followed by a copy instruction, and ends with a paste_last instruction, as shown, for example, in FIG. 13A. In this example, memory move instruction sequence 1300 begins with copy_first instruction 1302, is followed by two paste-then-copy instruction pairs including paste instructions 1304 and 1308 and copy instructions 1306 and 1310, and ends with paste_last instruction 1312. As discussed above with reference to FIG. 5B and FIG. 5C, in a preferred embodiment, instruction sequences including an orphan paste_last instruction and multiple copy_first instructions without an intervening paste_last instruction remain illegal. Similarly, in a preferred embodiment, instruction sequences, such as instruction sequence 1320 of FIG. 13B and instruction sequence 1330 of FIG. 13C which contain an orphan paste instruction 1322 or orphan copy instruction 1332, are similarly illegal. Further, as shown in FIG. 13D, in a preferred embodiment, an instruction sequence 1350 in which a copy_first instruction 1352 is followed by a copy instruction 1354 without an intervening paste instruction is also illegal. FIG. 13E illustrates an additional illegal instruction sequence 1360 that properly begins with a copy_first instruction 1362 properly followed by a paste instruction 1364 and copy instruction 1366, but which improperly omits a paste_last instruction before a next copy_first instruction 1368.

FIG. 13F illustrates a final example of an instruction sequence including a context switch during execution of a memory move. As shown, the portion of instruction sequence 1370 executed on hardware thread T0 is an illegal instruction sequence similar to that shown in FIG. 5E in that it includes copy_first instruction 1372 followed by a copy instruction 1374 without an intervening paste instruction. However, because the malformed portion of instruction sequence 1370 is executed on hardware thread T0 prior to the context switch (and execution of the cp_abort instruction 1375 that precedes it) and because the remaining portion of instruction sequence 1370 executed on hardware thread T1 (i.e., copy_first instruction 1378, paste instruction 1380, copy instruction 1382, and paste_last instruction 1384 that follow cp_abort 1376) is well formed, the portion of instruction sequence 1370 executed on hardware thread T1 receives a pass indication. Again, those skilled in art will appreciate that in other embodiments instruction sequence 1370 of FIG. 13F could alternatively be flagged as failing, for example, by migrating state information for the different hardware threads within the storage subsystem or by implementing additional state information in the processor core 200.

In at least one embodiment in which copy-paste streams including multiple copy-paste pairs are supported, the number of state variables utilized to track the progress of the memory move is expanded from two to three. In addition to the MIP and V flags previously described, an additional copy (C) flag that tracks whether or not the last operation in a memory move instruction sequence was a copy-type instruction of some form (e.g., copy or copy_first). In the embodiment of FIG. 6, the C flag can be implemented in the storage subsystem, for example, in CPD 300 as C flag 610. In the alternative embodiment of FIG. 8, the C flag 826 can alternatively be implemented in processor core 200, for example, within MSR 820. In general, MIP and V are the primary variable and reflect whether or not a valid memory move instruction sequence is in progress. Consequently, if MIP or V is reset to indicate completion of a memory move instruction sequence, the aborting of a memory move instruction sequence, or the invalidity of memory move instruction sequence, the resetting of other variables (e.g., the C flag) is optional.

The architectural semantics of a copy_first instruction in an embodiment supporting copy-paste streams including multiple copy-paste pairs can be described in pseudocode as follows:

```
copy_first
if (mip == 1) then
    v <- 0;              // copy_first received when sequence was
                         // already started.
else
    v <-1;               // sequence properly begun by copy_first
    mip <- 1             // record that are in the sequence now.
    c <- 1;              // last operation was a copy of some form.
    copy data to buffer  // copy the data.
fi
``` set the C flag (e.g., to 1) to indicate that the last operation was a copy of some form if the copy_first instruction forms part of a legal instruction sequence.

The architectural semantics of a copy instruction in an embodiment supporting copy-paste streams including multiple copy-paste pairs can be described in pseudocode as follows:

```
copy
if (mip == 1) AND (V=1)   // All conditions must be met for a "copy" to
AND (C=0) then            //be legal.
    c <- 1;               // Last operation was some form of copy.
    copy data to buffer;  // Copy data to buffer.
else
    v <-0;                // Sequence is not valid now.
    mip <- 1              // Set MIP in case move wasn't in progress and that
                          was the
                          // problem.
    c <- 0;               //
fi
```

According to this pseudocode, processing of a copy instruction determines if the copy is legal at this point in the instruction sequence by reference to the MIP, V and C flags. If so, the copy instruction sets the C flag (e.g., to 1) to indicate that the most recently performed operation is a copy and logically copies the data granule identified by the source address to a buffer. If the copy instruction is found to be illegal, the V flag is reset to indicate that the memory move instruction sequence is invalid. It should be noted that no copy of data residing at the source address is performed in this case, and based on the valid flag being reset, any subsequent pastes in the memory move instruction sequence also will not be performed. In addition, the MIP flag is set (e.g., to 1) to indicate that a memory move instruction sequence is in process (in case the MIP flag not being set was the reason the copy instruction was found to be illegal) and the C flag can optionally be reset.

The architectural semantics of a paste_last instruction in an embodiment supporting copy-paste streams including multiple copy-paste pairs can be described in pseudocode as follows:

```
paste_last
if ((mip == 1) AND (V=1) AND (C=1)) then    // Conditions must all be met for
                                            // "paste_last" to be legal.
    paste data to memory from copy buffer;  // Perform paste.
    ensure all copy/paste pairs done;       // Be sure sequence is finished.
    v <- 0;                                 // Reset flags for next sequence.
    mip <- 0;                               // Must be in if/then else to be before
    c <-0;                                  // return status.
    return pass to CR;                      //.
else
    v <- 0;                                 // Reset state variables for next sequence.
    mip <- 0;                               //
    c <- 0;                                 //
    return fail to CR;
fi
```

As can be seen by comparison to the prior pseudocode for a copy_first instruction, the only change to the semantics of a copy_first instruction to support copy-paste streams is to Processing of the paste_last instruction first checks if the MIP, V and C flags are all set and that the paste_last instruction is therefore legal. If so, the contents of the buffer are written to memory. In addition, after ensuring all copy/paste pairs in the sequence have completed, all of the MIP, V and C flags are reset (reset of the C flag is optional), and a pass indication is then returned to the processor core. If, on the other hand, it is determined that the paste_last instruction is not legal because one of the MIP, V and C flags is reset, no data is written to memory. Instead, all of the MIP, V and C flags are reset (reset of the C flag is optional), and a fail indication is then returned to the processor core.

The architectural semantics of a paste instruction in an embodiment supporting copy-paste streams including multiple copy-paste pairs can be described in pseudocode as follows:

```
paste
if ((mip == 1) AND (V=1) AND (C =1)) then    // All conditions must be
                                              met for
                                              // "paste" to be legal
         paste data to memory from copy buffer;  // Perform paste.
         c <-0;                                   // Reset of C is optional.
else
         v <- 0;                                  // Sequence failed.
fi
```

Processing of the paste instruction first checks if the MIP, V and C flags are all set and that the paste instruction is therefore legal. If so, the contents of the buffer are written to memory. In addition, the C flag may optionally be reset. If, on the other hand, it is determined that the paste instruction is not legal because one of the MIP, V and C flags is reset, no data is written to memory. Instead, the V flag is reset to indicate that the memory move instruction sequence has failed (reporting of the failure is deferred until the paste_last instruction).

The architectural semantics of a cp_abort instruction in an embodiment supporting copy-paste streams including multiple copy-paste pairs can be described in pseudocode as follows:

```
         cp_abort
         mip <- 0;    //Turn off sequence.
         v <- 0;      //
         c <- 0;      //
```

As indicated above, the cp_abort instruction resets the MIP, V, and C flags, where the reset of the V and C flags is optional. In this embodiment, resetting both of the MIP and V flags causes the contents of any buffer employed by the copy-paste stream to be abandoned.

It should again be noted that in the embodiment represented by the above pseudocode, once it is detected that a memory move instruction sequence is malformed, copy operations and paste operations cease to be performed. It should be appreciated that this is a design choice that can differ in other embodiments. For example, in at least one embodiment, a copy may be performed for each copy_first or copy instruction, and/or a paste may be performed for each paste_last or paste instruction regardless of the detection of a malformed memory move instruction sequence.

It should also be appreciated that the memory accesses indicated by the copy-paste pairs (whether formed of copy_first and paste instructions, copy and paste instructions, or copy and paste_last instructions) in an instruction stream can be performed concurrently and independently. Consequently, while the memory accesses for any given copy-paste pair occur in the order of the copy and then the paste, the memory accesses for different copy-paste pairs can be performed in any order. Caution should therefore be taken in constructing copy-paste streams if the set of addresses being copied overlaps with the set of addresses being pasted, as the result can be non-determinative if not constructed properly. For example, accesses to overlapping regions of memory can be handled by decomposing a larger memory move into multiple smaller memory moves in which those contained in each memory move instruction sequence do not overlap. However, by allowing the copy-paste pairs to proceed in any order, significant tracking and ordering hardware that would otherwise be required can be eliminated.

Figure 14A:
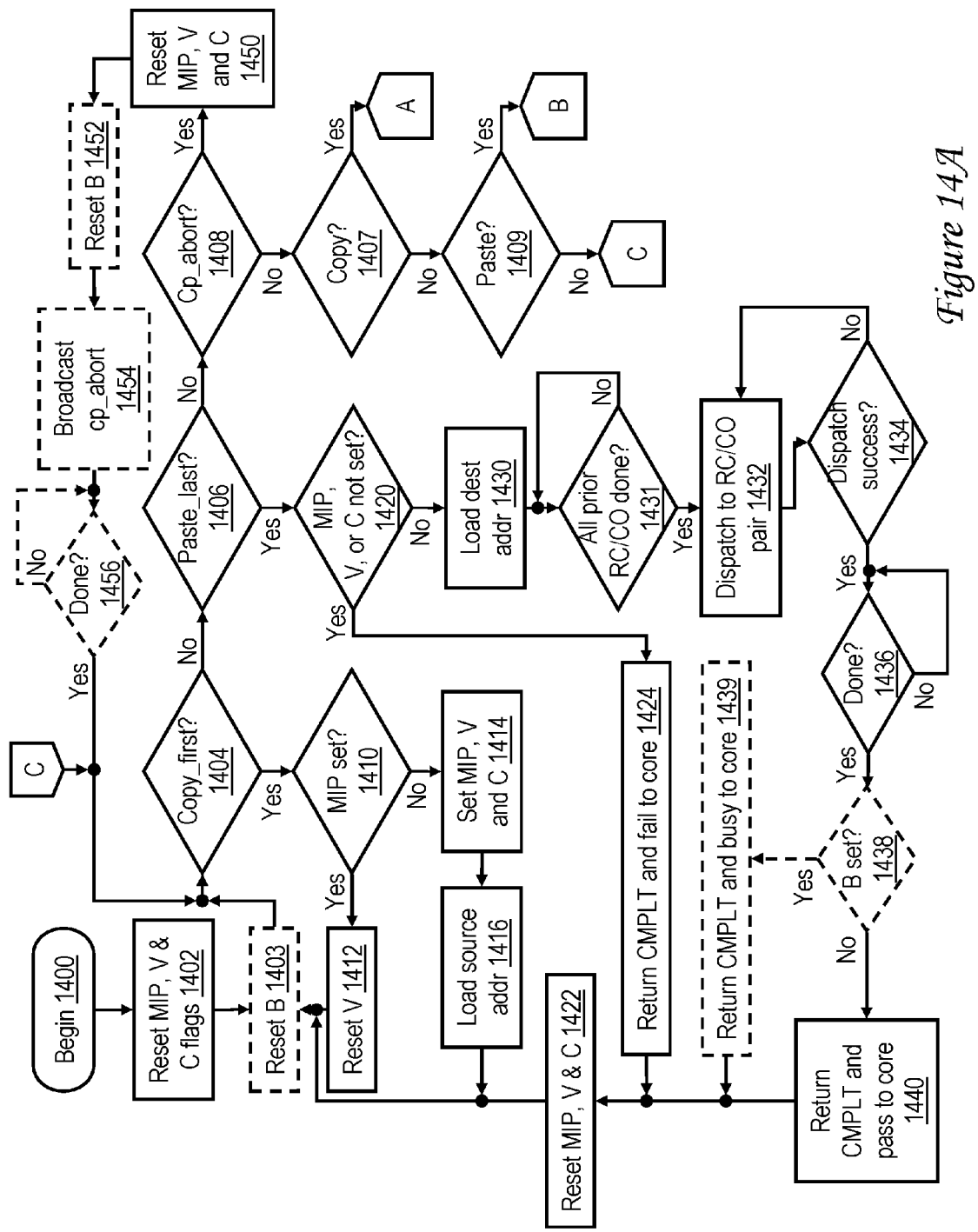
FIGS. 14A-14B together form a high level logical flowchart of an exemplary method by which memory access requests initiated by execution of memory move instructions are serviced in accordance with an embodiment supporting copy-paste instruction streams.
Figure 14B:
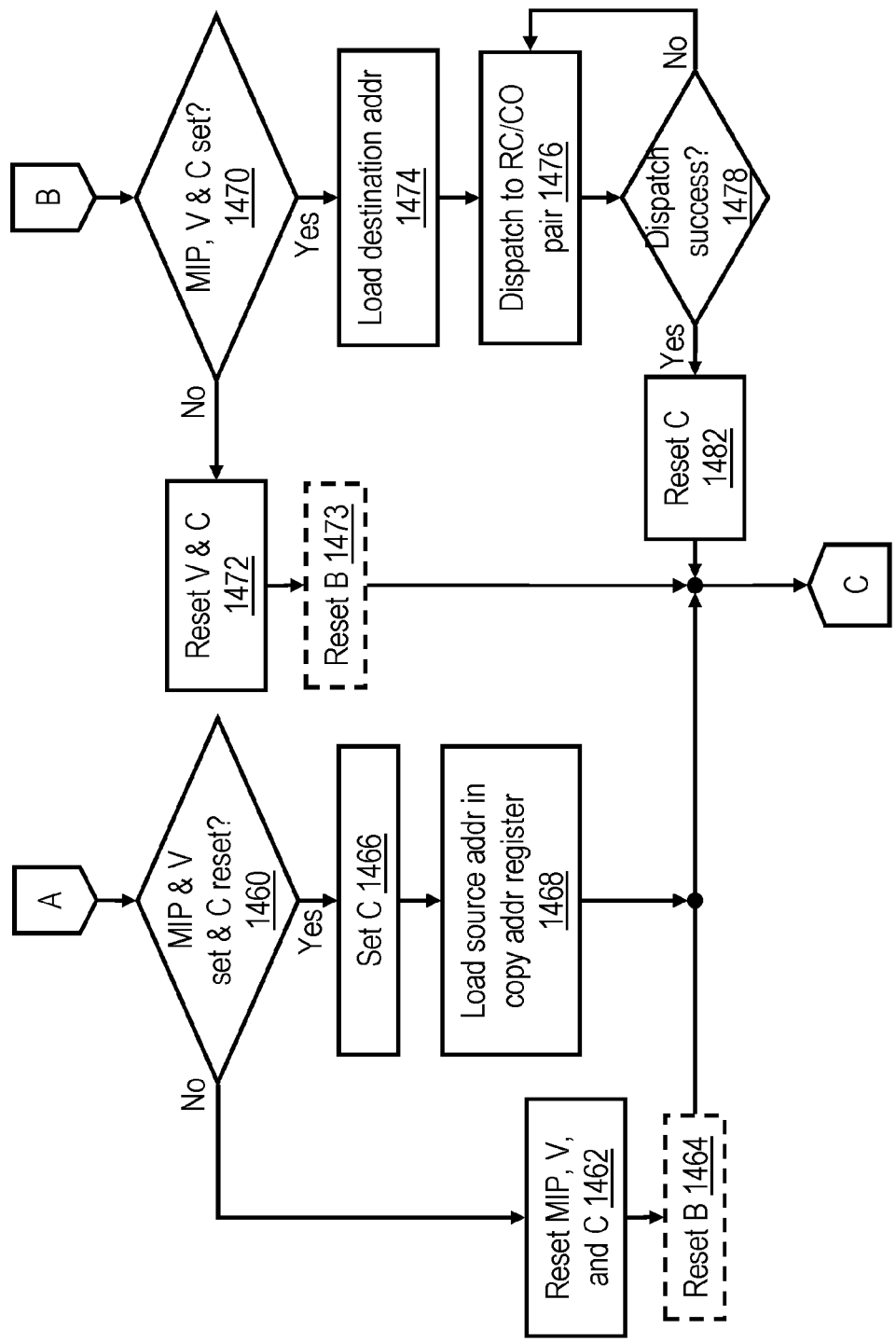

With reference now to FIGS. 14A-14B, there is illustrated a high level logical flowchart of an exemplary method by which memory access requests initiated by execution of memory move instructions are serviced by a storage subsystem in accordance with an embodiment supporting copy-paste instruction streams. In the following description, it is assumed that the illustrated processing is performed by CPD 300 of FIG. 6, which receives copy-type and paste-type requests in program sequence from L2 STQ 304. It should also be noted that FIGS. 14A-14B represents optional steps utilizing blocks shown in dashed line illustration. These steps are performed only in embodiments in which memory-mapped devices, such as AS 218 and devices 220 can be targets of memory move instruction sequences in addition to system memories 108. In embodiments in which only system memories 108 can be targets of memory move instruction sequences, such steps are omitted.

The process of FIG. 14 begins at block 1400 and then proceeds to block 1402, which illustrates CPD 300 resetting (e.g., to 0) MIP flag 606, V flag 608 and C flag 610. In embodiments in which the target of a memory move instruction sequence can also be a memory-mapped device (e.g., an AS 218 or a device 220), CPD 300 also resets B flag 612 (block 1403). The process then proceeds to blocks 1404-1409, which illustrate CPD 300 monitoring for receipt of any of a copy_first, paste_last, cp_abort, copy or paste request from the associated processor core 200. In response to receipt of a copy_first request at block 1404, CPD 300 determines at block 1410 whether or not MIP flag 606 is set (e.g., to 1). If so, CPD 300 determines that the instruction sequence is malformed and accordingly resets V flag 608 (block 1412). In embodiments in which the target of a memory move instruction sequence can be a memory-mapped device, CPD 300 also resets B flag 612 at block 1403. Thereafter, CPD 300 resumes monitoring for memory move requests, as indicated by the process returning to blocks 1404-1409. In response to CPD 300 determining at block 1410 that MIP flag 606 is not set, CPD 300 sets MIP flag 606, V flag 608 and C flag 610 to indicate initiation of a well formed memory move instruction sequence (block 1414) and places the source (real) address specified by the copy_first request in copy address register 602 (block 1416). In embodiments in which the target of a memory move instruction sequence can be a memory-mapped device, CPD 300 also resets B flag 612 at block 1403. The process then returns to blocks 1404-1409, which have been described.

Referring now to block 1406, in response to receipt of a paste_last request, CPD 300 determines whether any of MIP flag 606, V flag 608 or C flag is reset (block 1420). If so, the memory move instruction sequence is malformed. Consequently, CPD 300 returns a CMPLT indication (indicating the end of a memory move instruction sequence) and a fail indication (indicating that the memory move instruction sequence failed) to the processor core 200 via buses 334 and 336, respectively (block 1424). In response to the CMPLT and fail indications, processor core 200 resets E bit 205 (e.g., to 0) to indicate failure of the memory move instruction sequence and resets G bit 207 (e.g., to 0) to indicate that a BUSY response from the target of the memory move instruction sequence was not the cause of failure. In addition, CPD 300 resets MIP flag 606, V flag 608 and C flag 610 (block 1422). In embodiments in which the target of a memory move instruction sequence can be a memory-mapped device, CPD 300 also resets B flag 612 at block 1403. Thereafter, the process returns to block 1404-1409, which have been described.

Returning to block 1420, if a malformed instruction sequence is not detected, CPD 300 places the destination (real) address specified by the paste_last request into paste address register 604 (block 1430). CPD 300 then waits at block 1431 until all RC/CO machine pairs previously dispatched to service copy and paste operations of the memory move instruction sequence have completed their processing, as indicated, for example, by done indications 335. Following block 1431, CPD 300 places in dispatch pipeline 306 a request to dispatch a RC machine 312 and CO machine 310, where the RC machine 312 is for performing a copy of the target data granule identified by the source address in the copy address register 602 into the corresponding RCDAT buffer 322 and the CO machine 310 is for performing the paste of the data granule from the RCDAT buffer 322 to the destination address in memory specified by paste address register 604 (block 1432). As indicated at block 1434, if the dispatch of the matched pair of RC machine 312 and CO machine 310 fails, the process returns to block 1432. If the dispatch from dispatch pipeline 306 is successful, CPD 300 awaits completion of the indicated copy and paste operations (block 1436).

As indicated by block 1438, in embodiments in which AS 218 and device(s) 220 can serve as targets of memory move instruction sequences, CPD 300 determines in response to an affirmative determination at block 1436 whether or not B flag 612 has been set (e.g., to 1) to indicate that a memory-mapped device, such as an AS 218 or device 220, could not process the memory move data. If not, or in cases in which the memory move instruction sequence targets a real address in system memory 108 rather than a memory-mapped device (in which case B flag is never set), the process proceeds to block 1440. However, in response to a determination that B flag was set during the memory move instruction sequence, the process instead proceeds to block 1439, which illustrates CPD 300 returning a CMPLT indication and busy indication to processor core 200 via buses 334 and 336, respectively. In response to the CMPLT and busy indications, processor core 200 resets E bit 205 (e.g., to 0) to indicate failure of the memory move instruction sequence and sets G bit 207 (e.g., to 1) to indicate the cause of failure was a BUSY response from the target of the memory move instruction sequence. Thereafter, the process passes to block 1422 and following blocks, which have been described.

Block 1440 depicts CPD 300 returning a CMPLT indication (indicating the end of a memory move instruction sequence) and a pass indication (indicating that the memory move instruction sequence passed) to the processor core 200 via buses 334 and 336, respectively. Thereafter, the process returns to block 1422 and following blocks, which have been described.

Referring now to block 1408, in response to receipt by CPD 300 of a cp_abort request, CPD 300 resets MIP flag 606, V flag 608 and C flag 610 (block 1450). In embodiments in which a real address in a system memory 108 is the target of the memory move instruction sequence, the process then returns to blocks 1404-1409, which have been described. In embodiments in which the target of the memory move instruction sequence can be a memory-mapped device, such as an AS 218 or a device 220, CPD 300 performs the additional steps illustrated at blocks 1452-1456. At block 1452, CPD 300 resets B flag 612 (e.g., to 0). At block 1454, CPD 300 additionally broadcasts a cp_abort request on the interconnect fabric to inform the target memory-mapped device that the memory move has been aborted. CPD 300 then monitors at block 1456 for a "done" response (e.g., on the interconnect fabric) from the target memory-mapped device indicating that the target memory-mapped device has completed its processing of paste requests within the memory move. In response to receipt of such a "done" response, the process returns to blocks 1404-1409.

With reference now to block 1407, in response to receipt by CPD 300 of a copy request, the process passes through page connector A to block 1460 of FIG. 14B, which illustrates CPD 300 determining whether the copy instruction is legal, that is, whether MIP flag 606 and V flag 608 are set and C flag 610 is reset. If not, CPD 300 resets MIP flag 606, V flag 608 and C flag 610 (block 1462). In embodiments in which a memory-mapped device can be the target of the memory move, CPD also resets B flag 612 (block 1464). Following block 1462 or, if performed, block 1464, the process returns through page connector C to blocks 1404-1409 of FIG. 14A. Referring again to block 1460, if the copy instruction is legal, CPD 300 sets C flag 610 (block 1466) and places the source real address specified by the copy request into copy address register 602 (block 1468). Thereafter, the process returns via page connector C to blocks 1404-1409, which have been described.

Referring now to block 1409, in response to receipt by CPD 300 of a paste request, the process passes through page connector B to block 1470 of FIG. 14B, which illustrates CPD 300 determining whether the paste instruction is legal, that is, whether MIP flag 606, V flag 608 and C flag 610 are all set. If not, CPD 300 resets V flag 608 and C flag 610 (block 1472). In embodiments in which a memory-mapped device can be the target of the memory move, CPD also resets B flag 612 (block 1473). Following block 1472 or, if performed, block 1473, the process returns through page connector C to blocks 1404-1409, which have been described.

Returning to block 1470, in response to CPD 300 determining that the paste instruction is legal, CPD 300 loads the destination real address specified by the paste request into paste address register 604 (block 1474). In addition, CPD 300 places in dispatch pipeline 306 a request to dispatch a RC machine 312 and CO machine 310, where the RC machine 312 is for performing a copy of the target data granule identified by the source address in the copy address register 602 into the corresponding RCDAT buffer 322 and the CO machine 310 is for performing the paste of the data granule from the RCDAT buffer 322 to the destination address in memory specified by paste address register 604 (block 1476). As indicated at block 1478, if the dispatch of the matched pair of RC machine 312 and CO machine 310 fails, the process returns to block 1476. If the dispatch from dispatch pipeline 306 is successful, CPD 300 resets C flag 310 (block 1482). Thereafter, the process returns through page connector C to blocks 1404-1409, which have been described.

Figure 15A:
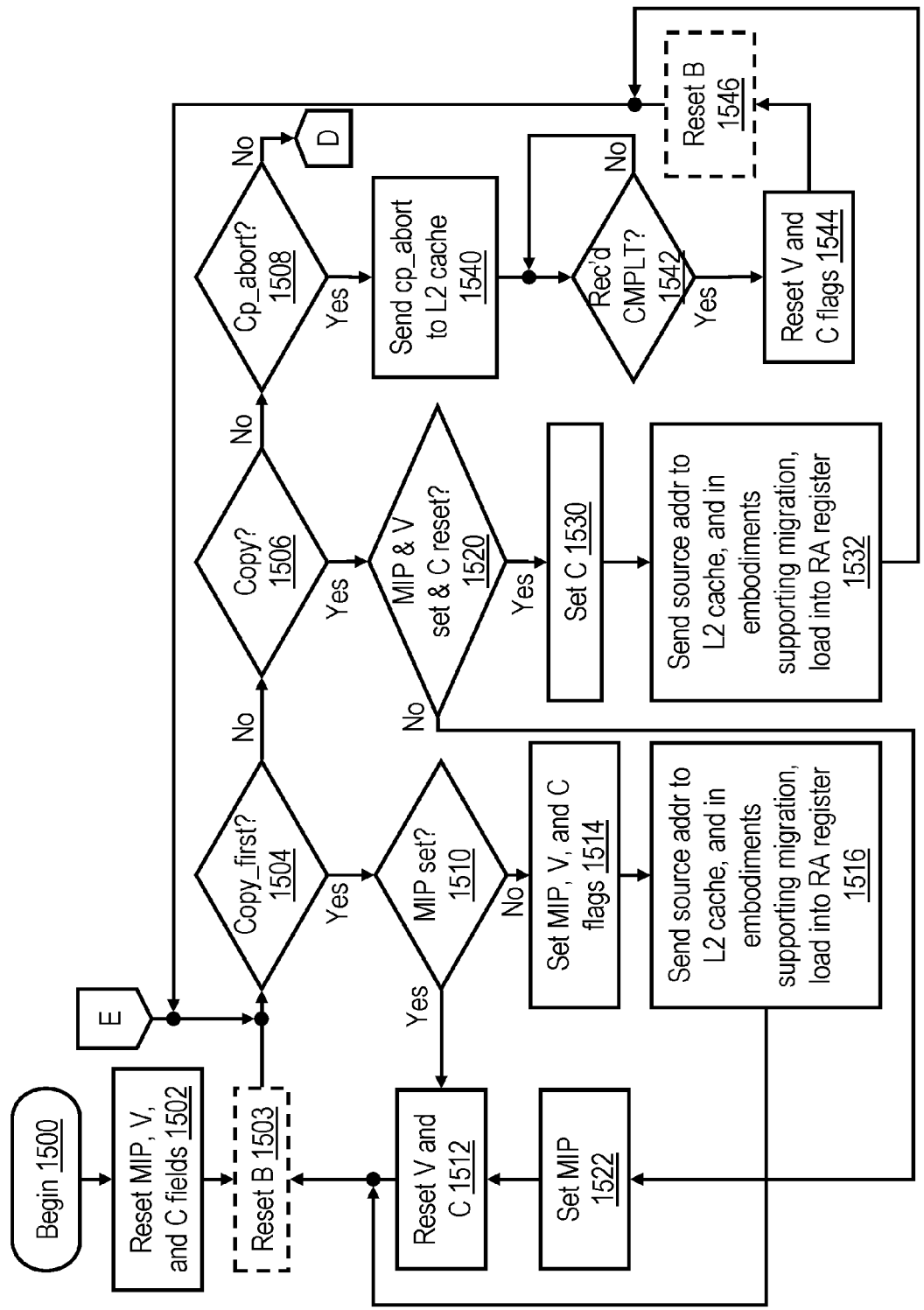
FIGS. 15A-15B together form a high level logical flowchart of an exemplary method by which a processor core handles memory access requests initiated by execution of memory move instructions in accordance with another embodiment supporting copy-paste instruction streams.
Figure 15B:
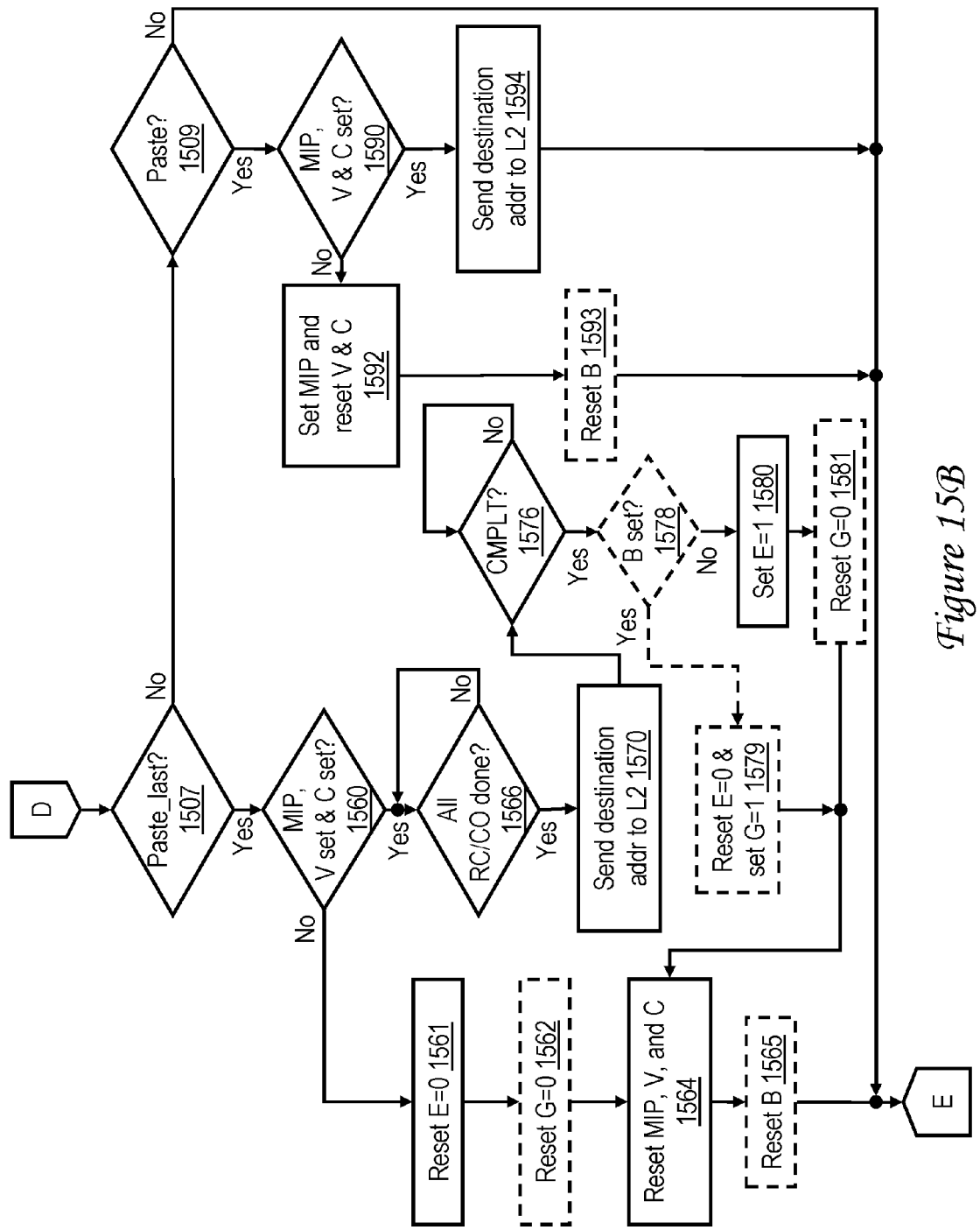

With reference now to FIGS. 15A-15B, there is illustrated a high level logical flowchart of an exemplary method by which a processor core handles memory access requests initiated by execution of memory move instructions in accordance with another embodiment supporting copy-paste instruction streams. In the following description, it is assumed that the illustrated processing is performed in processor core 200 by control logic 812 of FIG. 8. It should also be noted that FIGS. 15A-15B represents optional steps utilizing blocks shown in dashed line illustration. These steps are performed only in embodiments in which memory-mapped devices, such as AS 218 and devices 220 can be targets of memory move instruction sequences in addition to system memories 108. In embodiments in which only system memories 108 can be targets of memory move instruction sequences, such steps are omitted.

The process of FIG. 15A begins at block 1500 and then proceeds to block 1502, which illustrates control logic 812 resetting (e.g., to 0) MIP flag 822, V flag 824 and C flag 826. In embodiments in which the target of a memory move instruction sequence can also be a memory-mapped device (e.g., an AS 218 or a device 220), control logic 812 also resets B flag 828 (block 1503). The process then proceeds to blocks 1504-1509 (of which block 1507 and 1509 are illustrated in FIG. 15B), which illustrate control logic 812 monitoring for receipt from ISU 202 of any of copy_first, paste_last, cp_abort, copy and paste instructions. In response to receipt of a copy_first instruction at block 1504, control logic 812 determines at block 1510 whether or not MIP flag 822 is set (e.g., to 1). If so, control logic 812 determines that the instruction sequence is malformed (illegal) and accordingly resets V flag 824 and C flag 826 (block 1512). In embodiments in which the target of a memory move instruction sequence can be a memory-mapped device, CPD 300 also resets B flag 828 at block 1503. Thereafter, control logic 812 resumes monitoring for memory move instructions, as indicated by the process returning to blocks 1504-1509. In response to control logic 812 determining at block 1510 that MIP flag 822 is not set, control logic 812 sets MIP flag 822, V flag 824 and C flag 826 to indicate initiation of a well formed memory move instruction sequence (block 1514) and transmits a copy_first request containing the source (real) address to the associated L2 cache 230 (block 1516). In embodiments supporting the migration of memory move instruction sequences between hardware threads, control logic 812 also load the source address into RA register 830 (see, FIG. 8) at block 1516. The process then returns, if necessary, to block 1503 and then to blocks 1504-1509, which have been described.

Referring now to block 1506, in response to receipt by control logic 812 of a copy request, control logic 812 determines whether the copy instruction is legal, that is, whether MIP flag 822 and V flag 824 are set and C flag 826 is reset (block 1520). If not, control logic 812 sets MIP flag 822 (block 1522) and resets V flag 824 and C flag 826 (block 1512). MIP flag 822 is set at this point in case the copy instruction was illegal because the copy instruction was the first instruction in the memory move instruction sequence executed in the current context of the current hardware thread (e.g., as would be the case following a context switch). In embodiments in which the target of a memory move instruction sequence can also be a memory-mapped device (e.g., AS 218 or device 220), control logic 812 also resets B flag 828 (block 1503). The process then returns to blocks 1504-1509. Referring again to block 1520, in response to a determination that the copy instruction is legal, control logic 812 sets C flag 826 (block 1530) and transmits the source (real) address determined for the copy instruction to the associated L2 cache 230 in a copy request (block 1532). In embodiments supporting the migration of memory move instruction sequences between hardware threads, control logic 812 also load the source address into RA register 830 (see, FIG. 8) at block 1532. Thereafter, the process returns to blocks 1504-1509, which have been described.

Referring now to block 1508, in response to receipt by control logic 812 of a cp_abort instruction, control logic 812 transmits a cp_abort request to the associated L2 cache 230 to request a CMPLT indication when all previously dispatched memory move requests in the current copy-paste stream have been completed (block 1540). Control logic 812 then awaits receipt from the L2 cache 230 via bus 334 of a CMPLT indication indicating that all previously dispatched memory move requests in the current copy-paste stream have been completed (block 1542). In response to receipt of the CMPLT indication, control logic 812 resets V flag 824 and C flag 826 (block 1544). In embodiments in which the target of a memory move instruction sequence can also be a memory-mapped device (e.g., AS 218 or device 220), control logic 812 also resets B flag 828 (block 1546). Following block 1544 or, if performed, block 1546, the process returns to blocks 1504-1509, which have been described.

With reference to block 1507 of FIG. 15B, in response to detection of a paste_last instruction, the process proceeds to block 1560, which illustrates control logic 812 determining whether the paste_last instruction is legal, for example, by determining if MIP flag 822, V flag 824, and C flag 826 are all set. If not, the memory move instruction sequence is malformed. Consequently, control logic 812 resets E bit 205 to indicate failure of the memory move instruction sequence (block 1561) and, in embodiments in which a memory-mapped device can be the target of a memory move instruction sequence, also resets G bit 207 to indicate that the cause of failure was not a BUSY response from the target (block 1562). Control logic 812 also resets MIP flag 822, V flag 824 and C flag 826 (block 1564) and, if necessary, also resets B flag 828 (block 1565). Following block 1564 or, if implemented, block 1565, the process returns through page connector E to blocks 1504-1509, which have been described.

Referring again to block 1560, in response to control logic 812 determining that the paste_last instruction is legal, control logic 812 determines at block 1566 whether or not all RC/CO pairs allocated to service prior memory accesses in the memory move instruction sequence have completed their operations, for example, based on done indications 335. In response to a determination at block 1566 that all pending memory accesses in the memory move instruction sequence have completed, control logic 812 transmits a paste_last request specifying the destination real address of the paste_last instruction to L2 cache 230 (block 1570). Control logic 812 then awaits receipt of a CMPLT indication from the associated L2 cache 230 indicating that the indicated paste operation is complete (block 1576). In embodiments in which the target of a memory move instruction sequence can be a memory-mapped device, control logic 812 determines at block 1578 whether or not B flag 828 is set to indicate receipt of a BUSY response from a memory-mapped device that is the target of the present memory move instruction sequence. If so, control logic 812 resets E bit 205 (e.g., to 0) to indicate failure of the memory move instruction sequence and sets G bit 207 (e.g., to 1) to indicate the cause of failure as a BUSY response from the target memory-mapped device (block 1579). Thereafter, the process passes to block 1564, which has been described. However, in response to a determination at block 1578 that B flag 828 is reset or if block 1578 is omitted, control logic 812 sets E flag 205 (e.g., to 1) to indicate success of the memory move instruction sequence (block 1580). In embodiments in which the target of the memory move instruction sequence is permitted to be a memory-mapped device (e.g., AS 218 or device 220), control logic 812 also resets G bit 207 (e.g., to 0) to indicate that no BUSY response was received (block 1581). Thereafter, the process passes to block 1564 and following blocks, which have been described.

Referring now to block 1509, in response to receipt by control logic 812 of a paste instruction, control logic 812 determines at block 1590 whether the paste instruction is legal, that is, whether MIP flag 822, V flag 824 and C flag 826 are all set. If not, control logic 812 set MIP flag 822 and resets V flag 824 and C flag 826 (block 1592). MIP flag 822 is set at this point in case the paste instruction was illegal because the paste instruction was the first instruction in the memory move instruction sequence executed in the current context of the current hardware thread (e.g., as would be the case following a context switch). In addition, in embodiments in which the target of the memory move instruction sequence can be a memory-mapped device, control logic 812 resets B flag 828 (block 1593). Following block 1592 or, if performed, block 1593, the process returns through page connector E to blocks 1504-1509, which have been described. If, however, control logic 812 determines at block 1590 that the paste instruction is legal, control logic 812 transmits the destination (real) address determined for the paste request to the associated L2 cache 230 in a paste request (block 1594). Thereafter, the process returns through page connector E to blocks 1504-1509, which have been described.

Figure 16:
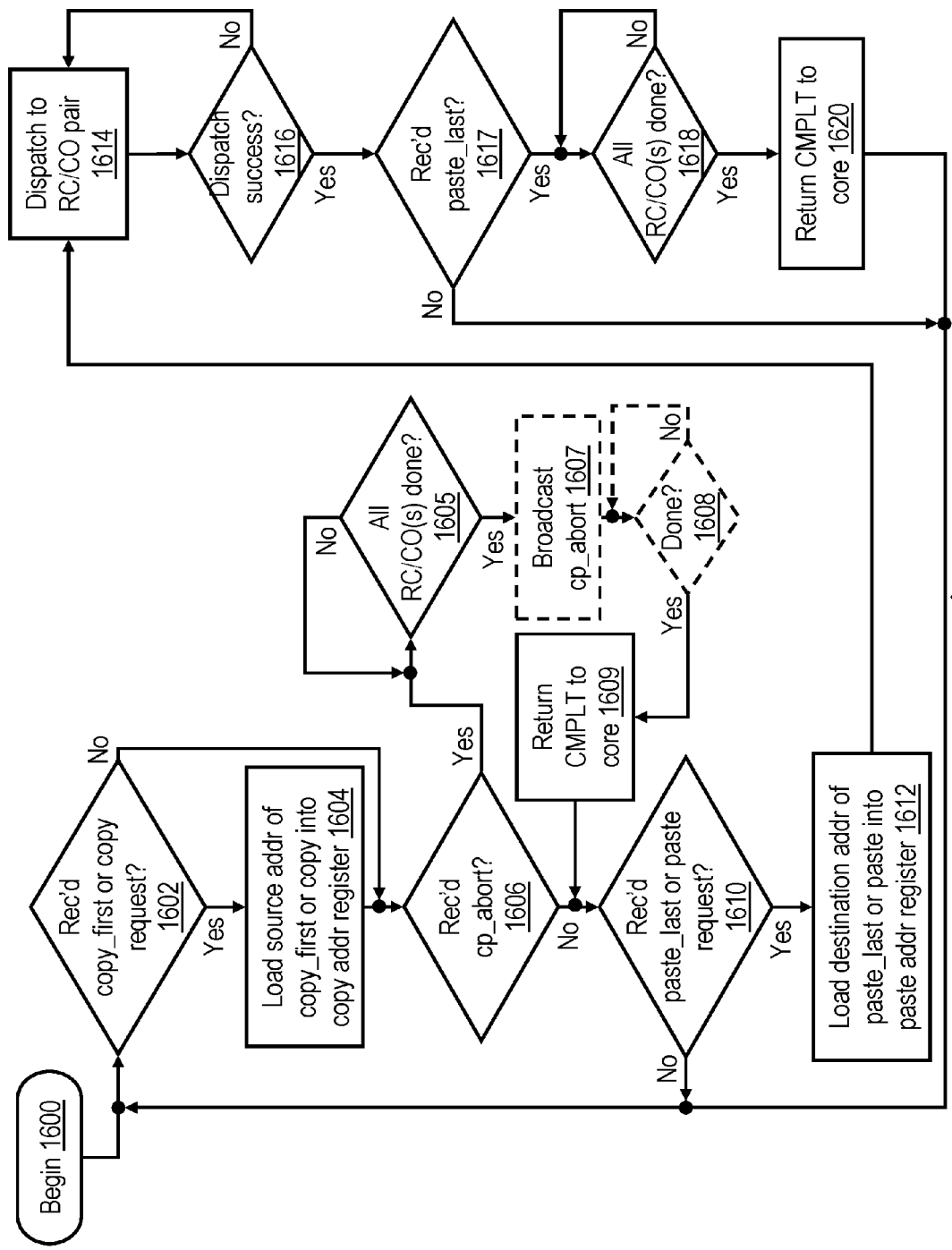
FIG. 16 is a high level logical flowchart of an exemplary method by which a store-in lower level cache memory handles memory access requests initiated by execution of memory move instructions in accordance with an embodiment supporting copy-paste instruction streams.

Referring now to FIG. 16 is a high level logical flowchart of an exemplary method by which a store-in lower level cache memory handles memory access requests initiated by execution of memory move instructions in accordance with an embodiment supporting copy-paste instruction streams. In the following, the operations shown in FIG. 16 are described as being performed by control logic 810 of CPD 800, which receives copy-type and paste-type requests from L2 STQ 304 in program sequence. As with the preceding flowcharts, FIG. 16 represents optional steps utilizing blocks shown in dashed line illustration. These steps are performed only in embodiments in which memory-mapped devices, such as AS 218 and devices 220 can be targets of memory move instruction sequences in addition to system memories 108. In embodiments in which only system memories 108 can be targets of memory move instruction sequences, such steps are omitted.

The process begins at block 1600 and then proceeds to blocks 1602, which illustrates control logic 810 monitoring for receipt of either a copy_first or copy request from the associated processor core 200, as discussed above with reference to blocks 1516 and 1532 of FIG. 15A. In response to receipt of a copy_first or copy request, control logic 810 places the source (real) address specified by the copy_first or copy request into copy address register 802 (block 1604). The process then passes from block 1604 to block 1606.

Block 1606 illustrates control logic 810 monitoring for receipt of a cp_abort request from the associated processor core 200, as discussed above with respect to block 1540 of FIG. 15A. If no cp_abort request is detected, the process proceeds to block 1610, which is described below. However, in response to receipt of a cp_abort request, control logic 810 determines at block 1605 whether or not all RC machines 312 and all CO machines 310 dispatched to service memory move requests in the present copy-paste stream have been retired (e.g., a done signal 335 has been received for each such RC-CO machine pair). If not, the process iterates at block 1605. Once all RC-CO machine pair(s) allocated to service memory move requests in the copy-paste stream have been retired, the process proceeds directly to block 1609 in embodiments in which the target of a memory move instruction sequence is restricted to a real address in system memory 108. In other embodiments in which the target of a memory move instruction sequence can be and is a memory-mapped device, the process first passes to block 1607-1608. At block 1607, control logic 810 broadcasts a cp_abort request on the interconnect fabric to inform the target memory-mapped device that that memory move has been aborted. Control logic 810 then awaits receipt of a "done" response confirming completion of processing of all paste requests by the target memory-mapped device (block 1608). In response to receipt of the "done" response, the process then proceeds from block 1608 to block 1609. Block 1609 depicts control logic 810 returning a CMPLT indication to the processor core 200 via bus 334. The process then proceeds to block 1610.

Block 1610 illustrates control logic 810 determining whether or not a paste_last or paste request has been received, as discussed above with respect to blocks 1570 and 1594 of FIG. 15B. If not, the process of FIG. 16 returns to block 1602. In response to a determination at block 1610 that a paste_last or paste request has been received, control logic 810 places the destination real address specified by the paste_last or paste request into paste address register 804 (block 1612). In addition, control logic 810 places into dispatch pipeline 306 of L2 cache 230 a request to dispatch a RC machine 312 and CO machine 310, where the RC machine 312 is for performing a copy of the target data granule identified by the source real address in the copy address register 802 into the corresponding RCDAT buffer 322 and the CO machine 310 is for performing the paste of the data granule from the RCDAT buffer 322 to the memory location identified by the destination real address in paste address register 804 (block 1614). As indicated at block 1616, if the dispatch of the matched pair of RC machine 312 and CO machine 310 fails, the process returns to block 1614. If the dispatch from dispatch pipeline 306 is successful, the process then returns to block 1602 if the request received at block 1610 was a paste request (block 1617). If, however, the request was a paste_last request, the process proceeds from block 1617 to block 1618, which illustrates control logic 810 waiting until the memory access operations initiated by the current paste_last request and its associated copy or copy_first request have completed, as indicated, for example, by done signals 335. Once all such memory access operations are complete, control logic 810 returns a CMPLT indication (indicating the end of a memory move instruction sequence) to the processor core 200 via bus 334 as discussed above with reference to block 1576 of FIG. 15B (block 1620). Thereafter, the process returns to block 1602, which has been described.

The present disclosure also appreciates that in at least some embodiments it is desirable to be able to suspend and resume a memory move instruction sequence, for example, when a memory move instruction sequence is transferred between threads on a context switch. In at least one embodiments, this additional capability is facilitated through implementation of an additional copy_pending instruction as illustrated in FIG. 17.

In the embodiment of FIG. 17, copy_pending instruction 1700, which is executable by an execution unit of processor core 200, such as LSU 206*a*, includes an opcode field 1702 specifying an operation code signifying a copy_pending instruction. In addition, copy_pending instruction 1700 includes an operand field 1704 that specifies an architected register (e.g., rB) for storing the source real address of a copy operation. A copy_pending instruction determines if a valid memory move instruction sequence is in process and if the immediately previous operation of such a memory move instruction sequence was a copy-type operation and, if so, places the source real address of the copy-type operation in a specified register of the processor core.

The architectural semantics of the copy_pending instruction can be described with the following pseudocode:

```
copy_pending
E<- 0;              // Reset E bit in condition register.
if (mip ==1 AND V==1  // Valid move in process and immediately
AND C ==1) then
                    //previous operation was a copy.
    rB <- RA;       // Place RA of copy operation in register rB
    E <-1;          // Set condition register bit.
fi
```

In this embodiment, processing of the copy_pending instruction 1700 begins by resetting (e.g., to 0) a selected bit of a condition register (CR) 204 in processor core 200, such as equal (E) bit 205 (see, e.g., FIG. 2). The state of the E bit 205 indicates whether a copy operation initiated by a copy_first or copy instruction was the most recent operation performed in a currently valid memory move instruction sequence. Next, processing of the copy_pending instruction 1700 determines whether a valid memory move instruction sequence is in process and if the most recently performed operation in such a memory move instruction sequence is a copy operation initiated, for example, by a copy_first or copy instruction. If not, processing of the copy_pending instruction ends. However, if a valid memory move instruction sequence is in process and the most recently performed operation in such a memory move instruction sequence is a copy operation, the real address (RA) of the most recently performed copy operation, which is buffered, for example, in RA register 830 of processor core 200, is transferred to a architected register rB specified in operand field 1704 of the copy_pending instruction 1700. In addition, E bit 205 is set to indicate that the copy_pending instruction set an source real address in register rB. Thereafter, processing of the copy_pending instruction 1700 ends.

With reference now to FIG. 18, there is depicted a saved register area (SRA) 1800 in memory in accordance with one embodiment. SRA 1800, which can be utilized to buffer the state of a hardware thread during a context switch, includes storage for the various architected register sets of the processor core 200. For example, in this example in which processor core 200 includes general purpose registers (GPRs), floating-point registers (FPRs), vector registers (VRs) and machine condition registers (MCRs), SRA 1800 includes a GPR storage area 1802, a FPR storage area 1804, a VR storage area 1806, and a MCR storage area 1806. As indicated, MCR storage area 1806 includes storage for machine state registers (MSRs) in a MSR storage area 1808. SRA 1800 additionally includes a flag 1810 indicating whether or not SRA 1800 currently holds the state of a suspended memory move instruction sequence and a EA storage area 1812 storing a copy of the source effective address in RA register 830. As will be appreciated, for data processing systems including processor cores 200 capable of SMT, a separate SRA 1800 may be allocated in memory for each of the hardware threads of each of processor cores 200.

Referring now to FIG. 19, there is depicted a high level logical flowchart of an exemplary method by which a memory move instruction sequence is suspended in accordance with one embodiment. The process of FIG. 19 begins at block 1900 and then proceeds to block 1902, which illustrates a processor core 200 saving the contents of the architected registers for the hardware thread executing the memory move instruction sequence in the appropriate SRA 1800 in memory. Thus, the processor core 200 saves the contents of its architected registers in storage area 1802-1808. At block 1904, a processing unit 206 (e.g., LSU 206a) additionally executes a copy_pending instruction. As indicated at block 1906, processor core 200 then tests E bit 205 to determine if the copy_pending operation set a source real address of a copy-type request in a register rB. If not, the process proceeds to block 1910, which illustrates processor core 200 resetting (e.g., to 0) flag 1810 in SRA 1800, signifying that no copy operation was pending. Thereafter, processor core 200 executes a cp_abort instruction to conclude all pending memory move operations, if any, in the storage subsystem (block 1912). Thereafter, the process of FIG. 19 ends at block 1914.

Returning to block 1906, in response to the processor core 200 determining that the copy_pending instruction set a source real address of a copy-type request in register rB, processor core 200 sets flag 1810 in SRA 1800 to indicate that a copy is pending in the memory move instruction sequence and stores the source real address contained in register rB into RA storage area 1812 (block 1908). Thereafter, the process of FIG. 19 passes to block 1912 and 1914, which have been described.

With reference now to FIG. 20, there is illustrated a high level logical flowchart of an exemplary method by which a memory move instruction sequence is resumed in accordance with one embodiment. The process of FIG. 20 begins at block 2000 and then proceeds to optional block 2002, which illustrates a hardware thread resuming execution of a memory move instruction sequence, for example, following a context switch, by executing of a cp_abort instruction that resets the memory move state variables (i.e., MIP flag 822, V flag 824 and C flag 826) of the hardware thread. Next, at block 2004, the processor core 200 restores the MCRs 1806, including the MSR 1808, of the hardware thread from SRA 1800. At block 2006, the processor core 200 tests whether flag 1810 is set in SRA 1800 to indicate that a memory move instruction sequence was in process and was suspended immediately after an unmatched copy operation. (In general, this test modifies the value of CR 204 loaded at block 2004.) If not, the process passes to block 2010 and following blocks, which are described below. If, however, processor core 200 determines at block 2006 that flag 1810 is set, the processor core 200 executes a privileged copy_OS instruction to send the source address buffered in RA storage area 1812 to the associated L2 cache 230 in a copy request so that CPD 300 loads the source real address into copy address register 602. The process then proceeds to block 2010.

Block 2010 depicts processor core 200 restoring the contents of the other architected registers (e.g., GPRs, FPRs, VRs) from SRA 1800 to the architected registers in processor core 200. In addition, processor core 200 again restores the value of CR 204 from MCRs 1806 to restore the value of the bit corrupted by the test performed at block 2006. Processor core 200 then resumes execution of the memory move instruction sequence on the hardware thread (block 2012). The process of FIG. 20 thereafter ends at block 2014.

Figure 21:
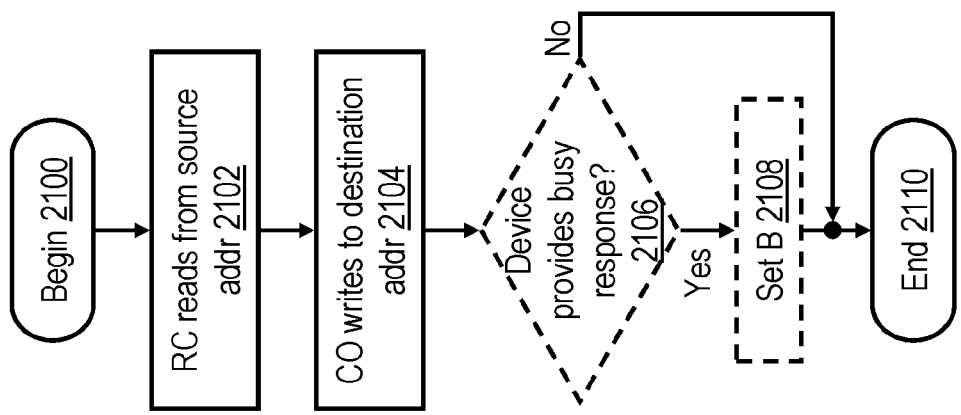
FIG. 21 is a high level logical flowchart of an exemplary method by which a lower level cache memory services memory access requests in accordance with one embodiment.

With reference to FIG. 21, there is illustrated a high level logical flowchart of an exemplary method by which a lower level cache memory services memory access requests in accordance with one embodiment. Although the operations are described below with respect to an RC machine 312 and a CO machine 310 as depicted in FIG. 3, it should be recalled that in some embodiments, the operations may instead be performed within CPE 332 of FIG. 11 by a cp_RC machine 1100 and cp_CO machine 1102 utilizing cp_RCDAT buffer 1104.

The process of FIG. 21 begins at block 2100, for example, in response to dispatch of a RC machine 312 and a CO machine 310 to perform a copy-type operation and a paste-type operation, respectively. The process of FIG. 21 proceeds from block 2100 to block 2102, which illustrates the RC machine 312 dispatched to service the copy-type operation by reading a source data granule from the source real address specified in copy address register 602 or 802. If the source data granule resides in the local cache array 302 (e.g., as indicated by the coherence state returned by the access to directory 308), the RC machine 312 simply causes the target data granule to be transferred from cache array 302 to the RCDAT buffer 322 of the RC machine 312. If the target data granule does not reside in local cache array 302, RC machine 312 issues a request for the target data granule on the interconnect fabric. When returned via the interconnect fabric, the data granule is transmitted to the relevant RCDAT buffer 322 via reload bus 323.

Next, at block 2104, the allocated CO machine 310 writes the data granule to the destination real address specified in paste address register 604 or 804. In particular, the CO machine 310 issues on the interconnect fabric an appropriate paste-type (e.g., paste or paste_last) request that specifies the destination real address specified in paste address register 604 or 804 and that has an associated data tenure in which CO machine 310 transmits the data granule contained in the relevant RCDAT buffer 322. If the target of the paste-type request is a real address in a system memory 108, the request on the interconnect fabric will be snooped and serviced by the memory controller 106 of the system memory 108 containing the storage location identified by the destination real address. In this case, or in cases in which the target memory-mapped device provides a RETRY response rather than a BUSY response when the memory-mapped device is unable to handle requests, the process then passes directly from block 2104 to block 2110, at which the process ends and the RC machine 312 and CO machine 310 are deallocated. In cases in which the target of the memory move is a memory-mapped device, such as an AS 218 or device 220, the process instead proceeds from block 2104 to block 2106, which illustrates CPD 300 or control logic 812 (depending on whether the embodiment of FIG. 6 or FIG. 8 is employed) determining whether or not the target memory-mapped device provided a BUSY response to paste-type request via the interconnect fabric. If not, the process passes to block 2110, which has been described. If, however, the device provided a BUSY response, CPD 300 or control logic 812 sets B flag 612 or 828 to record the BUSY response (block 2108). Thereafter, the process of FIG. 21 ends at block 2110.

Figure 22:
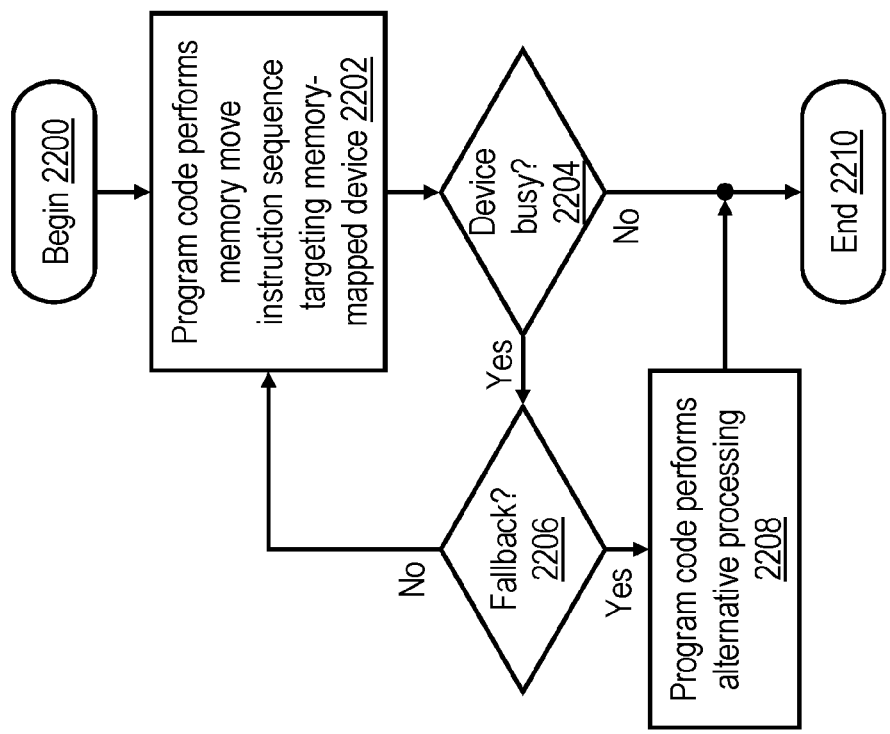
FIG. 22 is a high level logical flowchart of an exemplary method by which software handles a device busy condition in accordance with one embodiment.

Referring now to FIG. 22, there is depicted a high level logical flowchart of an exemplary method by which program code (e.g., application, operating system, driver, firmware, hypervisor or a combination of one or more of these or other types of software) handles a device busy condition in accordance with one embodiment. The process of FIG. 22 begins at block 2200 and then proceeds to block 2202, which illustrates program code executing a memory move instruction sequence in one or more hardware threads as discussed in detail with reference to the above-described embodiments. In this case, the memory move instruction sequence targets a memory-mapped device, such as an AS 218 or device 200.

In some implementations, one or more of the memory-mapped devices that may be targeted by memory moves are configured to provide a RETRY response to any paste-type request targeting the memory-mapped device that it snoops on the interconnect fabric and is unable to immediately service. In some implementations, one or more memory-mapped devices may additionally be configured to provide a BUSY response to those requests targeting the memory-mapped device that it snoops on the interconnect fabric and will be unable to service, for example, for at least a predetermined period of time. The BUSY response can thus be utilized to provide additional depth of information, which can be utilized by program code to intelligently control program flow.

The process then proceeds to block 2204, which illustrates the software determining whether or not the target memory-mapped device is busy, for example, by executing one or more instructions that read CR 204 and tests whether G bit 207 is set. In response to a determination at block 2204 that the target memory-mapped device is not busy, the software continues its current flow of execution, and process of FIG. 22 ends at block 2210. If, however, a determination is made at block 2204 that the target memory-mapped device is busy, the process passes to block 2206.

Block 2206 illustrates the program code determining whether or not alternative fallback processing in lieu of the requested memory move is available and determining whether or not to perform the alternative processing. For example, the program code may make the determination at block 2206 based on how many times and/or for how long the target memory-mapped device has been busy and/or the duration of the alternative processing. In response to a determination at block 2206 not to perform fallback processing, the program code repeats the memory move instruction sequence, as represented by the process returning to block 2202. If, on the other hand, the program code determines at block 2206 to perform the fallback processing, the program code abandons the memory move instruction sequence and performs alternative processing, as shown at block 2208. As but one example, if the memory-mapped device is a hardware encryption accelerator that encrypts data granules delivered by memory move instruction sequences, the alternative processing performed at block 2208 can be performing software encryption of the data granules. Thus, in some cases, the alternative processing performed at block 2208 can implement in program code the same or similar operation that was intended to be performed in hardware on or utilizing the data delivered by the memory move. In other cases, the alternative processing may be a different operation than that which was intended to be performed in hardware. Following block 2208, the process of FIG. 22 ends at block 2210.

Figure 23:
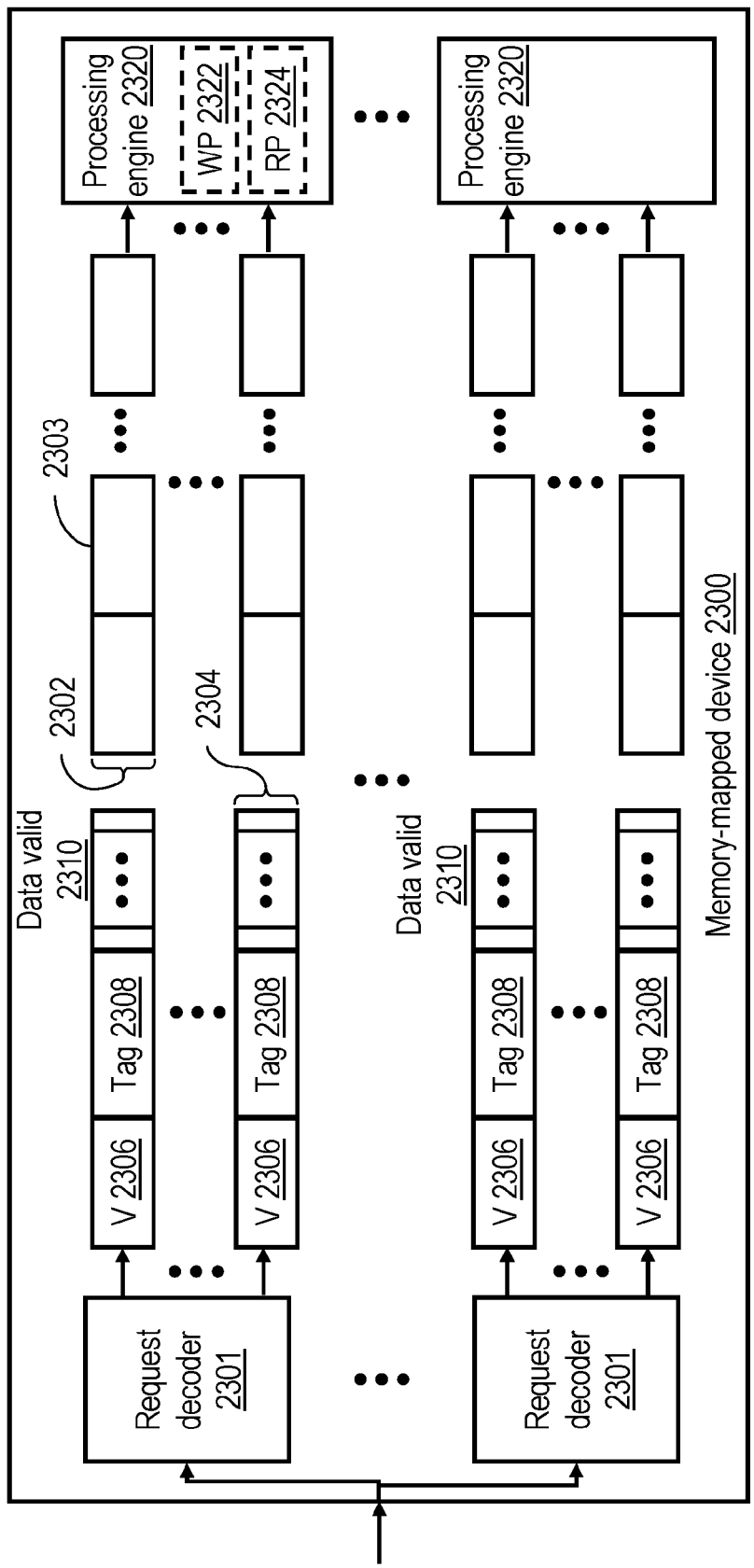
FIG. 23 illustrates an exemplary embodiment of a memory-mapped device in accordance with one embodiment.

With reference now to FIG. 23, there is illustrated an exemplary embodiment of a memory-mapped device 2300 in accordance with one embodiment. In various embodiments, memory-mapped device 2300 may be utilized to implement an AS 218 or device 220 of FIG. 2.

In the illustrated embodiment, memory-mapped device 2300 includes one or more request decoders 2301 that receive and decode requests received on the interconnect fabric. In this example, each request decoder 2301 is assigned (e.g., by firmware or by operating system or hypervisor software) a range of one or more real addresses for which that request decoder 2301 is responsible and at which that request decoder 2301 receives memory move data transmitted in conjunction with paste-type (e.g., paste and paste_last) requests. Each request decoder 2301 has an associated set of one or more buffers 2302, each of which has the capacity to buffer one or more data granules in one or more buffer segments 2303. Each buffer 2302 in turn has associated metadata storage 2304, which in the illustrated embodiment includes a buffer valid flag 2306 indicating whether the associated buffer 2302 contains at least one valid data granule, a source tag field 2308 for storing a source tag indicating a source of the memory move data buffered in the associated buffer 2302, and a data valid field 2310 including one bit per buffer segment 2303 of the associated buffer 2302. In one embodiment, the source tag specified in source tag field 2308 can be the hardware thread identifier (TID) of the source hardware thread. In this case, memory-mapped device 2300 abandons a memory move on a context switch signaled by a cp_abort request. In other embodiments, memory-mapped device 2300 is instead configured to permit memory moves to survive context switches. In this case, the source tag specified in source tag field 2308 is of a greater length and includes additional source identifying information that will survive the context switch, such as the logical partition identifier (LPID), process identifier (PID) and software thread identifier (TID).

Buffer(s) 2302 are further coupled to one or more processing engines 2320 for digesting memory move data and performing one or more operations on and/or with the memory move data. Exemplary operation of memory-mapped device 220 is described below with reference to FIGS. 24-25. In one exemplary embodiment described with respect to FIG. 25 in which memory-mapped device 2300 implements an AS 218, processing engine 2320 may include storage for control information, such as write pointer storage 2322 and read pointer storage 2324 for storing the real addresses of a write pointer and read pointer storage 2324, respectively. The control information may also include other information, such as the base real address and size of the memory queue.

Figure 24:
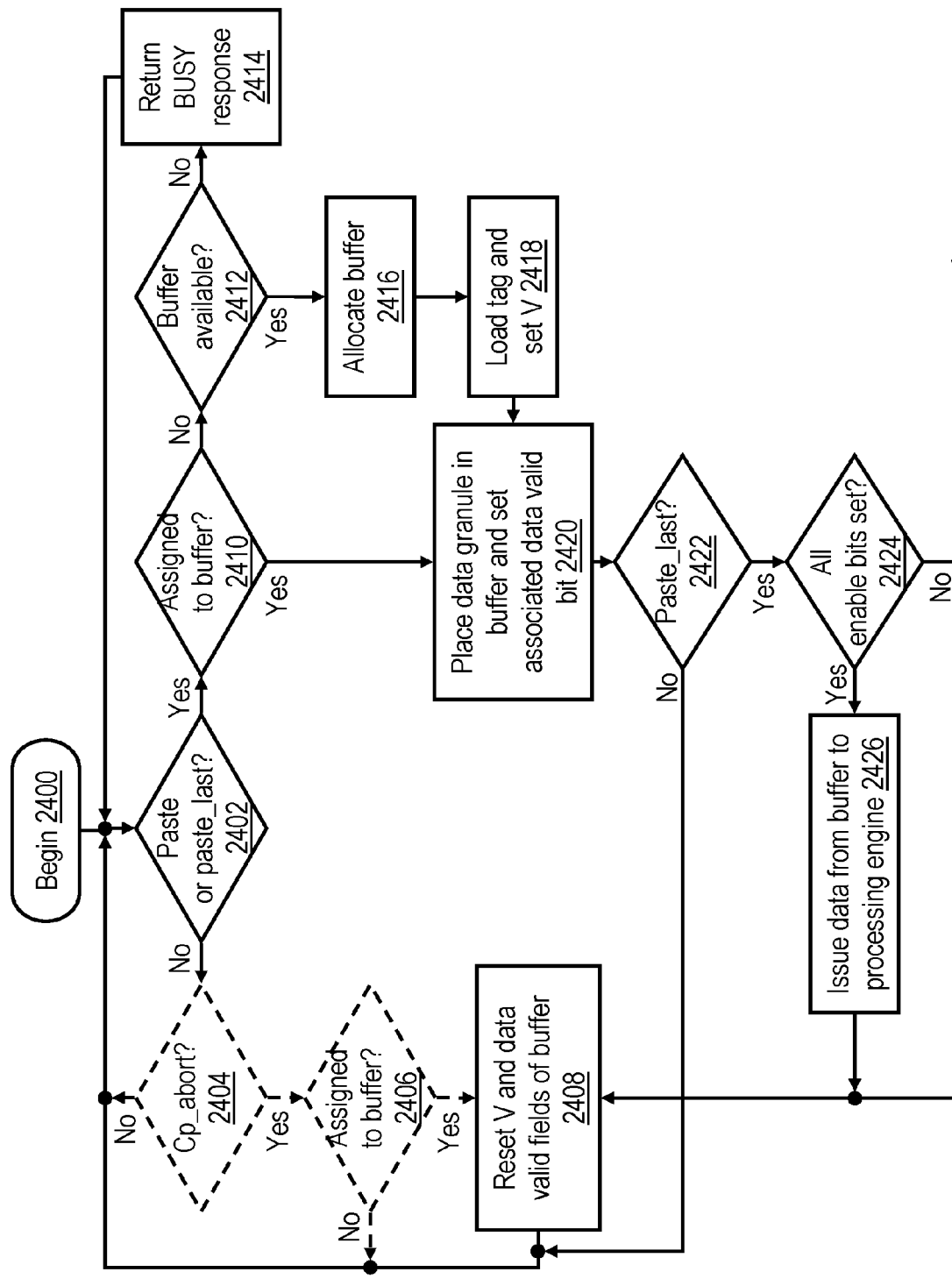
FIG. 24 is a high level logical flowchart of an exemplary method by which a memory-mapped device processes memory move requests received on the interconnect fabric of a data processing system in accordance with one embodiment.

Referring now to FIG. 24, there is depicted a high level logical flowchart of an exemplary method by which a memory-mapped device 2300 processes memory move requests received on the interconnect fabric of a data processing system 100 in accordance with one embodiment. The process begins at block 2400, for example, in response to a request decoder 2301 of a memory-mapped device 2300 receiving on the interconnect fabric of data processing system 100 a request that specifies a target real address for which the request decoder 2300 is assigned responsibility. As indicated at blocks 2402-2404, in response to receipt of such a request, the request decoder 2301 determines the type of the request, that is, whether the request is a paste-type (e.g., paste or paste_last) request (block 2402) or a cp_abort request (block 2404). If the received request is neither a paste-type request nor a cp_abort request, the request decoder 2301 discards the request, and the process returns to blocks 2402-2404. In embodiments of memory-mapped device 2300 configured to permit memory moves to survive a context switch, request decoder 2301 also discards cp_abort requests at block 2404. In other embodiments in which memory-mapped device 2300 is not configured to permit memory moves to survive a context switch, request decoder 2301, in response to receipt of a cp_abort request at block 2404, further determines at block 2406 whether or not the memory move to which the cp_abort request belongs has been allocated one of its associated buffers 2302. The request decoder 2301 can make the determination shown at block 2406, for example, by determining whether or not the source tag specified in the cp_abort request matches the contents of any of its associated source tag fields 2308 for which valid flag 2306 is set (e.g., to 1) to indicate a valid entry. If not, the process returns to blocks 2402-2404. If, however, request decoder 2301 determines at block 2406 that the memory move identified by the cp_abort request is currently allocated a buffer 2302, request decoder 2301 resets (e.g., to 0) the associated valid flag 2306 and data valid field 2310 to discontinue handling of (i.e., abort) the memory move by the memory-mapped device 2300. Thereafter, the process returns to blocks 2402-2404, which have been described.

Referring again to block 2402, in response to request decoder 2301 determining that the received request is a paste-type request (e.g., a paste or paste_last request), request decoder 2301 determines at block 2410 whether or not the memory move to which the paste-type request belongs is currently allocated one of its associated buffers 2302. As described above with reference to block 2406, request decoder 2301 can make the determination shown at block 2410, for example, by determining whether or not the source tag specified in the paste-type request matches the contents of any of its associated tag fields 2308 for which the associated valid flag 2306 is set to indicate a valid entry. If so, the process passes directly to block 2420, which is described below. If not, request decoder 2301 determines at block 2412 if one of its associated buffers 2302 is available for allocation to a new memory move, for example, by determining if any of the associated valid flags 2306 are reset (e.g., to 0). In response to a determining at block 2412 that no buffer 2302 is currently available for allocation (i.e., that all of the associated buffers 2302 are presently allocated to other memory moves), request decoder 2301 provides a BUSY response to the paste-type request in the depicted embodiment (block 2414). As noted above, in some embodiments, request decoder 2301 may alternatively provide a RETRY response instead of a BUSY response at block 2414. Further, in some embodiments, request decoder 2301 may provide a BUSY response to a paste-type request of a memory move at block 2414 only after providing one or more RETRY responses. In the case in which memory-mapped devices only provide RETRY responses, the heretofore described logic and processing steps supporting handling of BUSY responses can be omitted. Following block 2414, the process of FIG. 24 returns to blocks 2402-2404, which have been described. However, in response to determining at block 2412 that a buffer 2302 is available for allocation to the new memory move, request decoder 2301 allocates one of its unallocated buffers 2302 to the memory move (block 2416) and loads the source tag specified in the paste-type request into the associated source tag field 2308 and sets the associated valid flag 2306 (block 2418). In addition, as shown at block 2420, request decoder 2301 places the data granule received in association with the paste-type request into a buffer segment 2303 and sets the associated data valid bit in data valid field 2310.

As indicated by block 2422, if the paste-type request received at block 2402 is a paste request rather than a paste-last request, the process then returns to blocks 2402-2404. However, if the paste-type request is a paste_last request signifying the end of a memory move, request decoder 2301 also determines at block 2424 whether or not all data valid bits have been set. If not, meaning that one or more paste requests of the memory move have not been received, request decoder 2301 recognizes that the memory move has failed and accordingly resets the associated valid field 2306 and data valid field 2310 associated with the buffer 2302 allocated to the memory move (block 2408). Following block 2408, the process returns to blocks 2402-

2404, which have been described. If, however, request decoder 2301 determines at block 2424 that all of the bits of the associated data valid field 2310 are set, meaning that all data granules of the memory move have been received and buffered by device 2300, request decoder 2301 issues to the appropriate processing engine 2320 all of the data granules held in the buffer 2302 allocated to the memory move. Thereafter, the process passes to block 2408 and following blocks, which have been described.

Figures 25, 27:
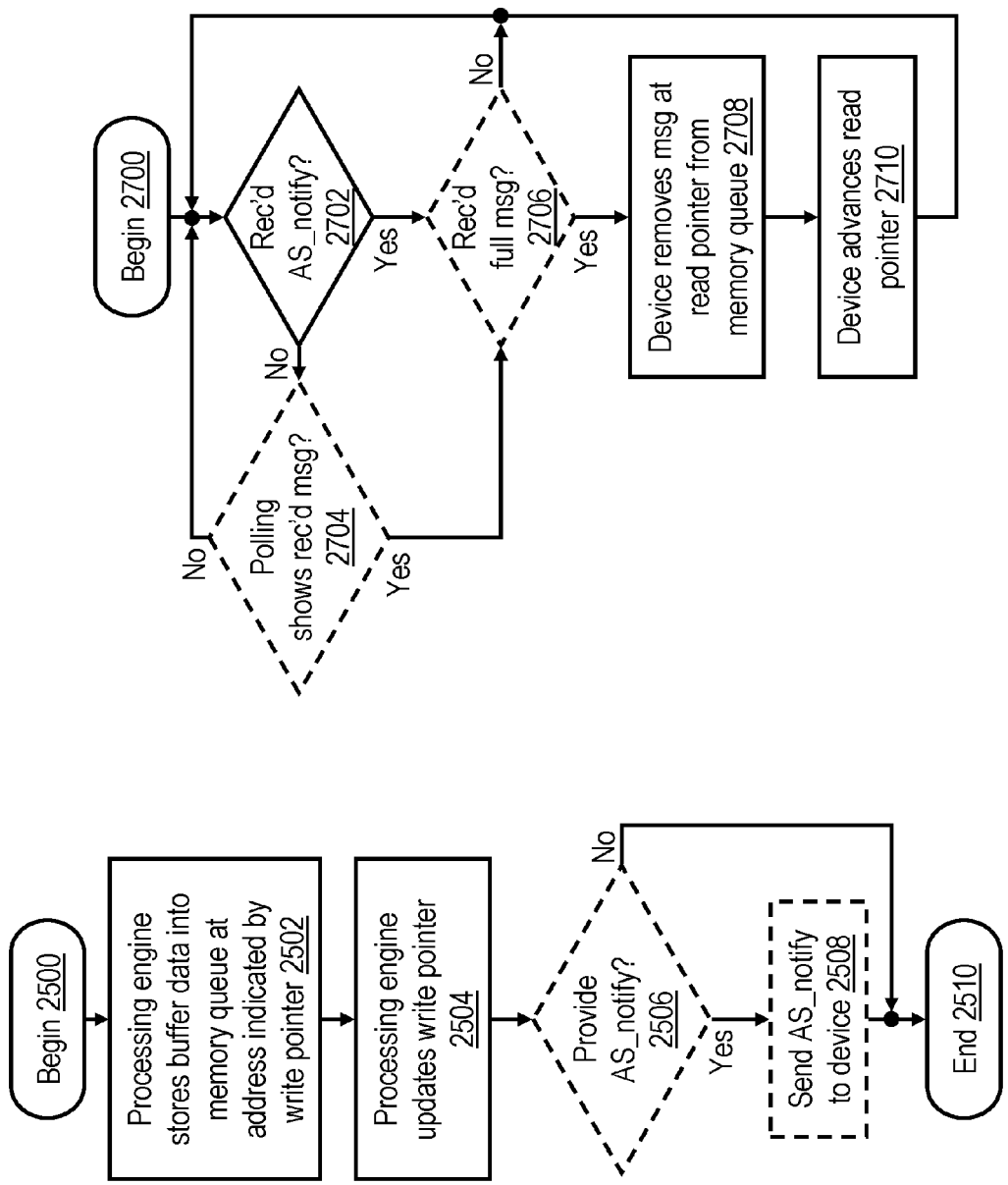
FIG. 25 is a high level logical flowchart of an exemplary method by which a memory-mapped device that is an accelerator switchboard (AS) queues data in accordance with one embodiment.
FIG. 27 is a high level logical flowchart of an exemplary method by which a device ingests data queued by an AS in accordance with one embodiment.

With reference now to FIG. 25, there is illustrated a high level logical flowchart of an exemplary method by which an AS 218 processes the message delivered by a memory move in accordance with one embodiment. The illustrated process assumes implementation of the AS 218 by a memory-mapped device 2300 as illustrated in FIG. 23.

The process of FIG. 25 begins at block 2500, for example, in response to a processing engine 2320 of the AS 218 being issued the data from a buffer 2302 at block 2426 of FIG. 24. The process of FIG. 25 proceeds from block 2500 to block 2502, which illustrates the processing engine 2320 storing the data received from the buffer 2302 into a queue in a system memory 108 using the target real address indicated by the write pointer identified by write pointer storage 2322. In general, storing the data includes issuing a write operation on the interconnect fabric directed to the memory controller 106 associated with the target system memory 108. If the queue is full when block 2502 is initiated, then processing engine 2320 simply waits for the queue to be non-full prior to performing the store operation shown at block 2502.

Figure 26:
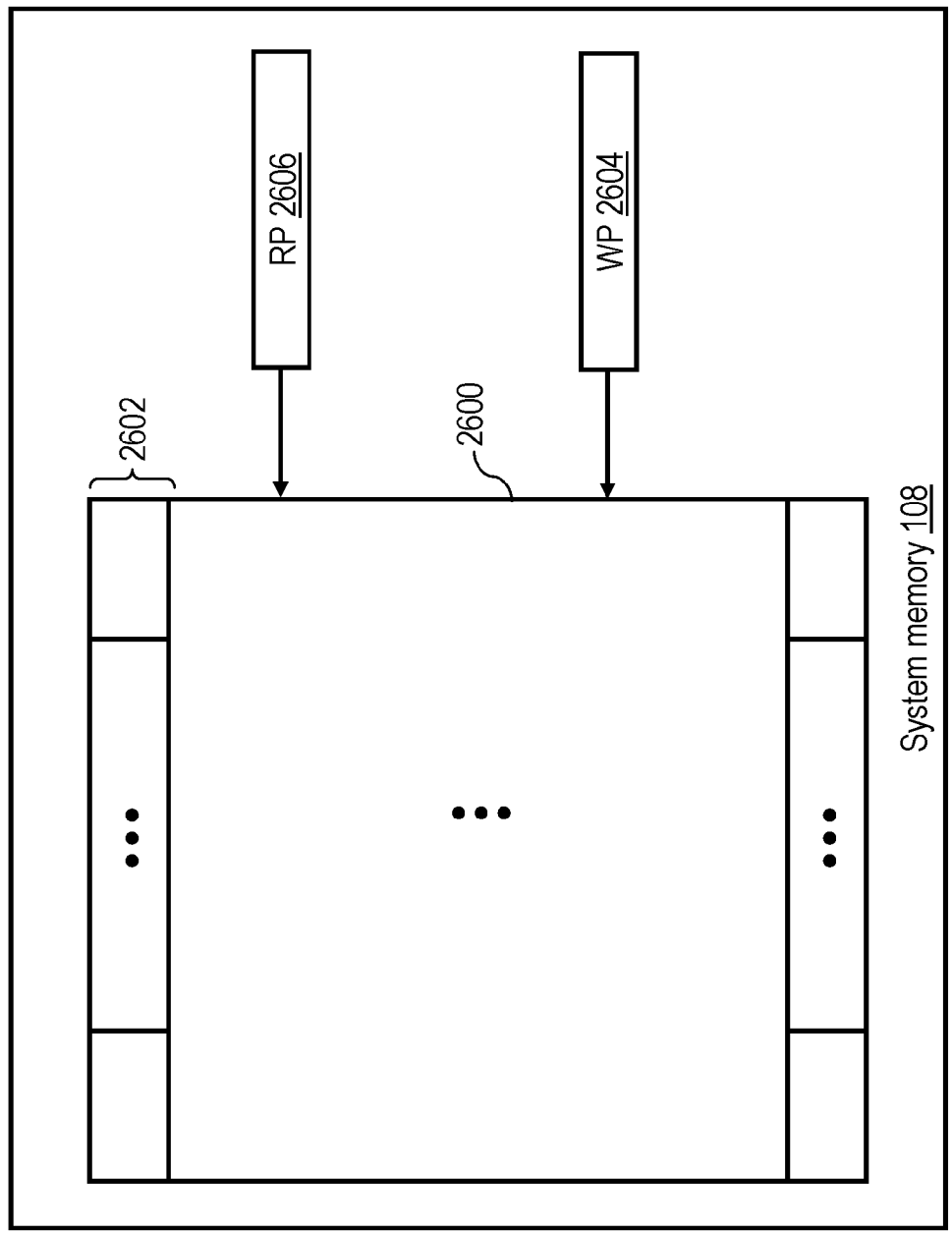
FIG. 26 depicts an exemplary queue in system memory in accordance with one embodiment.

FIG. 26 depicts an exemplary write queue 2600 in system memory 108 in accordance with one embodiment. In this example, write queue 2600 includes one or more queue entries 2602. In one preferred embodiment, each queue entry 2602 has a length equal to that of a buffer 2302. In other embodiments, each queue entry 2602 has a length equal to that of N buffers 2302, where N is a positive integer that is 2 or greater. A write pointer 2604 identifies the next address at which data is to be written into queue 2600, and a read pointer 2606 identifies the next address from which data is to be read from queue 2600.

Returning to FIG. 25, in conjunction with the write to the queue 2600 at block 2502, processing engine 2320 also updates write pointer 2604 to indicate a next available location in queue 2600 (block 2504). In some embodiments, the process of FIG. 25 thereafter ends at block 2510. In other embodiments in which AS 218 is configurable to notify a target device of the availability of new data within queue 2600, the process instead passes to block 2506, which illustrates processing engine 2320 implicitly or explicitly determining whether it is presently configured to provide notification to a target device of the availability of new data in queue 2600. If so, processing engine 2320 transmits an AS_notify message to the target device (e.g., one of devices 220), for example, via the interconnect fabric 110, 114 (block 2508). Following block 2508 or following a negative determination at block 2506, the process of FIG. 25 ends at block 2510.

With reference now to FIG. 27, there is illustrated a high level logical flowchart of an exemplary method by which a device ingests data queued by an AS in accordance with one embodiment. The process of FIG. 27 begins at block 2700 and then proceeds to block 2702, which illustrates a device 220 monitoring to detect receipt of an AS_notify message from an AS 218. If no AS_notify message is received at block 2702, the device 220 may optionally further poll to determine whether or not a new data has been written into its queue 2600 in memory (e.g., by determining if write pointer 2604 has been updated). In response to negative determinations at block 2702 and, if implemented, block 2704, the process continues to iterate at block 2702.

In response to a determination at either block 2702 or block 2704 that new data has been written into the queue 2600 of the device 220, device 220 may optionally further determine at block 2706 whether the data is of sufficient length to constitute a complete data message. For example, in one embodiment, the device 220 may make the determination illustrated at block 2706 based on either or both of the values of read pointer 2606 and write pointer 2604. Thus, in some embodiments, AS 218 is configured to write into queue 2600 a complete entry 2602 at a time, and the target device 220 is configured to read from queue 2600 a complete entry 2602 at a time. In other embodiments, AS 218 may instead be configured to write into queue 2600 only a partial entry 2602 at a time, while the target device 220 is configured to read from queue 2600 an entire entry 2602 at once. In response to a negative determination at block 2706, the process returns to block 2702, which has been described. In response to an affirmative determination at block 2706, the device 220 removes the data message from its queue 2600 using the target real address indicated by read pointer 2606 (block 2708) and advances read pointer 2606 (block 2710). The device 220 may then perform any of a variety of processing on, utilizing and/or in response to the data message. Thereafter, the process of FIG. 27 returns to block 2702, which has been described.

In some embodiments, data processing system 100 implements a weak memory model, meaning that instructions may be re-ordered for execution in any order as long as data dependencies are observed and the instructions are not explicitly restricted from being executed out-of-order with respect to the program sequence. One technique for restricting execution of certain instructions out-of-order is to include in the program sequence a barrier instruction (also referred to as a synchronization or "sync" instruction) to prevent the performance of memory accesses specified by certain memory access instructions following the barrier instruction until memory accesses specified by certain memory access instructions prior to the barrier instructions are performed. In general, there are four types of ordering that can be enforced by barrier instructions: (1) store-to-store ordering in which a store-type access to memory before a barrier is ordered relative to a store-type access following the barrier, (2) store-to-load ordering in which a store-type access before a barrier is ordered relative to a load-type access following the barrier, (3) load-to-load ordering in which a load-type access before the barrier is ordered relative to a load-type access following the barrier; and (4) load-to-store ordering in which a load-type access before a barrier is ordered relative to a store-type access following the barrier.

The POWER ISA developed by International Business Machines Corporation of Armonk, N.Y. includes two barrier instructions, including a heavyweight sync (HWSYNC) instruction that enforces all four of the orderings noted above, and a lightweight sync (LWSYNC), which enforces all of the orderings noted above except for store-to-load ordering. These barrier instructions, when executed, cause corresponding barrier requests to be issued to the L2 STQ 304 of the associated L2 cache 230, which enforces the indicated ordering of memory access requests (i.e., copy-type requests, paste-type requests and store requests) within L2 STQ 304. In some implementations, it is possible for L2 STQ 304 to enforce ordering on each copy-type and paste-type request within L2 STQ 304 as if it were a conventional store-type request. However, in a preferred embodiment, L2 STQ 304 enforces ordering relative to barrier requests on copy_first and paste_last requests that initiate and terminate memory move instruction sequences, but does not enforce any ordering relative the barrier requests on copy requests and paste requests within memory move instruction sequences. Although copy requests and paste requests are not ordered with respect to barriers requests in this embodiment, copy-type and paste-type requests are naturally ordered relative to one another by L2 STQ 304 in this embodiment, meaning that in such embodiments these requests are delivered in program sequence to CPD 300 and RC/CO machines 310, 312 or cp_RC/cp_CO machines 1100, 1102. As will be appreciated, this ordering behavior simplifies the appropriate (i.e., programmer-intended) pairing of copy and paste operations. As an additional consequence of this ordering behavior, paste_last requests terminating a memory move sequence are not dispatched from L2 STQ 304 until all preceding requests within the same memory move sequence have been dispatched from L2 STQ 304.

Figure 28:
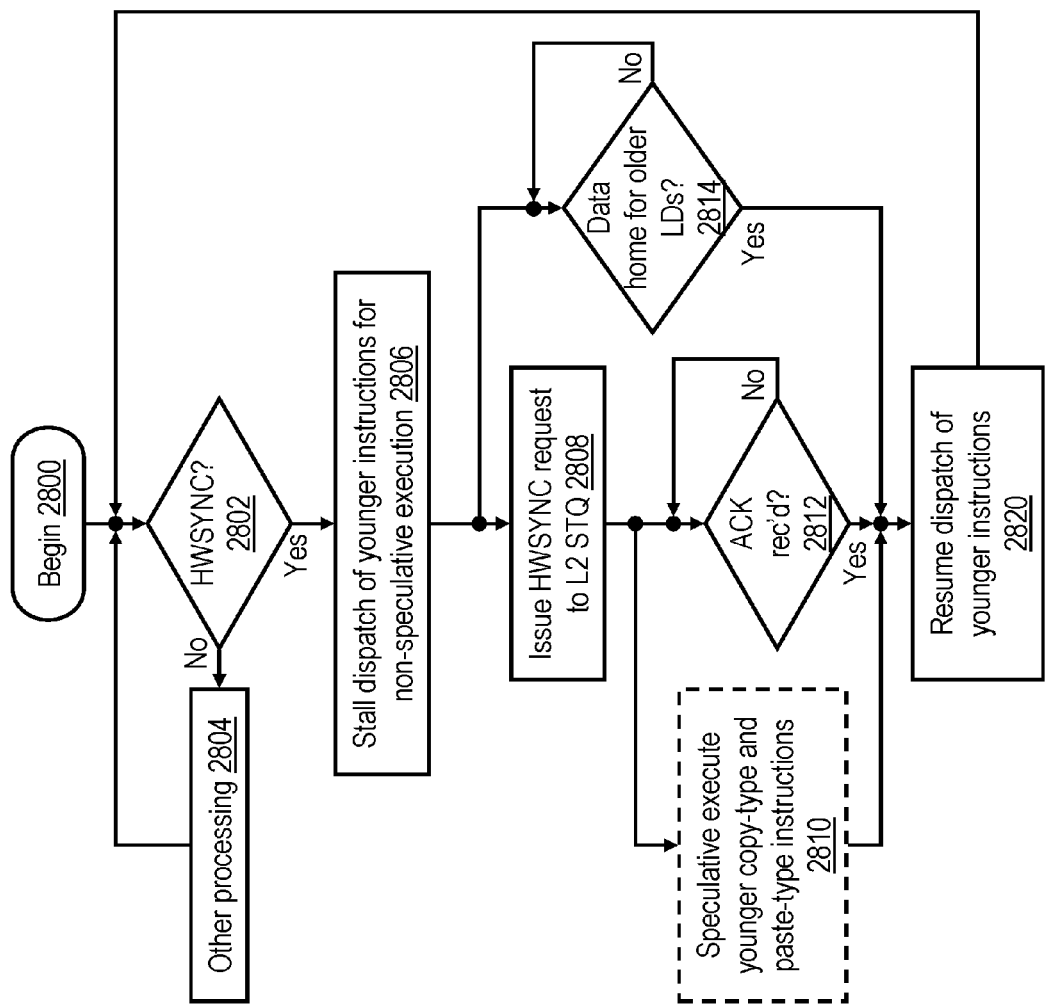
FIG. 28 is a high level logical flowchart of an exemplary method by which a barrier instruction, such as a heavyweight sync (HWSYNC), is processed in a processor core in accordance with one embodiment.

Referring now to FIG. 28, there is depicted a high level logical flowchart of an exemplary method by which a barrier instruction, such as a heavyweight sync (HWSYNC), is processed in a processor core 200 in accordance with one embodiment. The process of FIG. 28 begins at block 2800 and then proceeds to block 2802, which illustrates a determination by an execution unit 206 of a processor core 200 (e.g., hereafter assumed to be an LSU 206a) whether or not an HWSYNC instruction has been received for processing. If not, other processing is performed, as illustrated at block 2804, and the process returns to block 2802. If, however, a determination is made at block 2802 that an HWSYNC instruction has been received, the process proceeds to block 2806, which depicts ISU 202 stalling the dispatch of younger instructions to execution units 206 for non-speculative execution, for example, in response to a signal generated by LSU 206a in response to receipt of the HWSYNC instruction. The process then proceeds in parallel from block 2806 to a first path including blocks 2808-2012 and to a second path including block 2814.

In the first path, block 2808 illustrates LSU 206a issuing an HWSYNC request corresponding to the HWSYNC instruction to L2 STQ 304. Completion of the enforcement of store-to-store and store-to-load ordering by L2 STQ 304 with reference to the HWSYNC request is indicated by receipt of an ACK response from L2 STQ 304 (block 2812). In the second path, block 2814 depicts ISU 202 monitoring to determine whether or not all data requested by load-type instructions preceding the HWSYNC instruction in program order is "home," for example, received within register files 208. The test shown at block 2814 ensures enforcement of the load-to-load and load-to-store ordering mandated by the HWYSNC instruction.

The process does not proceed to block 2820 until affirmative determinations are made at both of blocks 2812 and 2814. As indicated at block 2810, following block 2808 and until affirmative determinations are made at both of blocks 2812 and 2814, LSU 206a may optionally nevertheless speculatively execute copy-type and paste-type instructions that follow the HWSYNC instruction in program order, as described in greater detail below with reference to FIGS. 32-36. Once affirmative determinations are made at both of blocks 2812 and 2814, speculative execution of copy-type and paste-type instructions at block 2810, if any, ceases, and the process passes to block 2820, which illustrates ISU 202 resuming dispatch to execution units 206 of instructions following the HWSYNC instruction in program order. Thereafter, the process of FIG. 28 returns to block 2802, which has been described.

Figure 29:
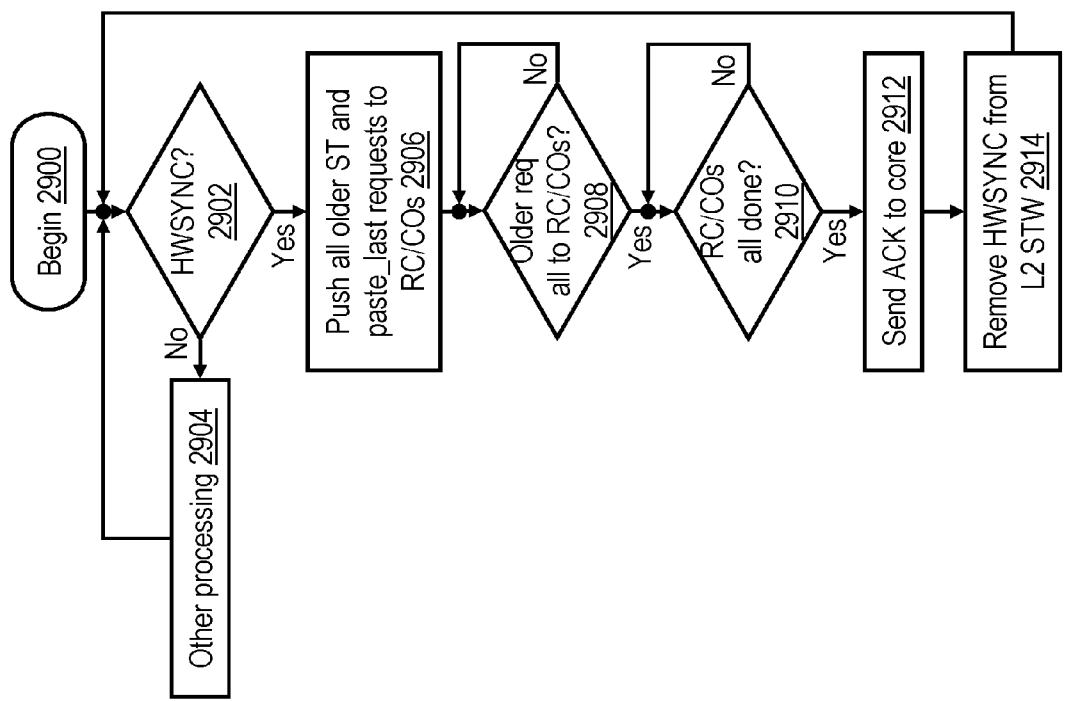
FIG. 29 is a high level logical flowchart of an exemplary method by which a barrier request, such as a heavyweight sync (HWSYNC), is processed in a store queue of a lower level cache memory in accordance with one embodiment.

With reference now to FIG. 29, there is illustrated a high level logical flowchart of an exemplary method by which a barrier request, such as a heavyweight sync (HWSYNC) request, is processed in a store queue (e.g., L2 STQ 304) of a lower level cache memory in accordance with one embodiment. The process of FIG. 29 begins at block 2900 and then proceeds to block 2902, which illustrates L2 STQ 304 determining if a request received within L2 STQ 304 from its associated processor core 200 is an HWSYNC request. If not, other processing is performed, as shown at block 2904, and the process returns to block 2902. If, however, L2 STQ 304 determines at block 2902 that the received request is an HWSYNC request, L2 STQ 304 pushes all store-type requests and all paste_last requests preceding the HWSYNC request to CPD 300 for dispatch to RC/CO machines 310, 312 or cp_RC and cp_CO machines 1100, 1102 (block 2906). It should be noted that because all non-speculative instructions following the HWSYNC instruction are stalled at block 2806 of FIG. 28, no younger non-speculative requests are loaded into L2 STQ 304 while the HWSYNC request is enqueued within L2 STQ 304.

The process of FIG. 29 proceeds from block 2906 to blocks 2908-2910, which respectively illustrate L2 STQ 304 determining whether all older requests within L2 STQ 304 have been dispatched for servicing to RC and CO machines 310, 312 or cp_RC and cp_CO machines 1100, 1102 and whether the servicing of such older requests has completed. Once affirmative determinations are made at both of blocks 2908 and 2910, which signify that any other cached copies of the target cache lines have been invalidated and the target cache lines have been moved to their destinations, L2 STQ 304 sends an ACK response to processor core 200 to enable release of the dispatch stall (block 2912). L2 STQ 304 thereafter removes the HWSYNC request from L2 STQ 304 (block 2914). Following block 2914, the process of FIG. 29 returns to block 2902.

Figure 30:
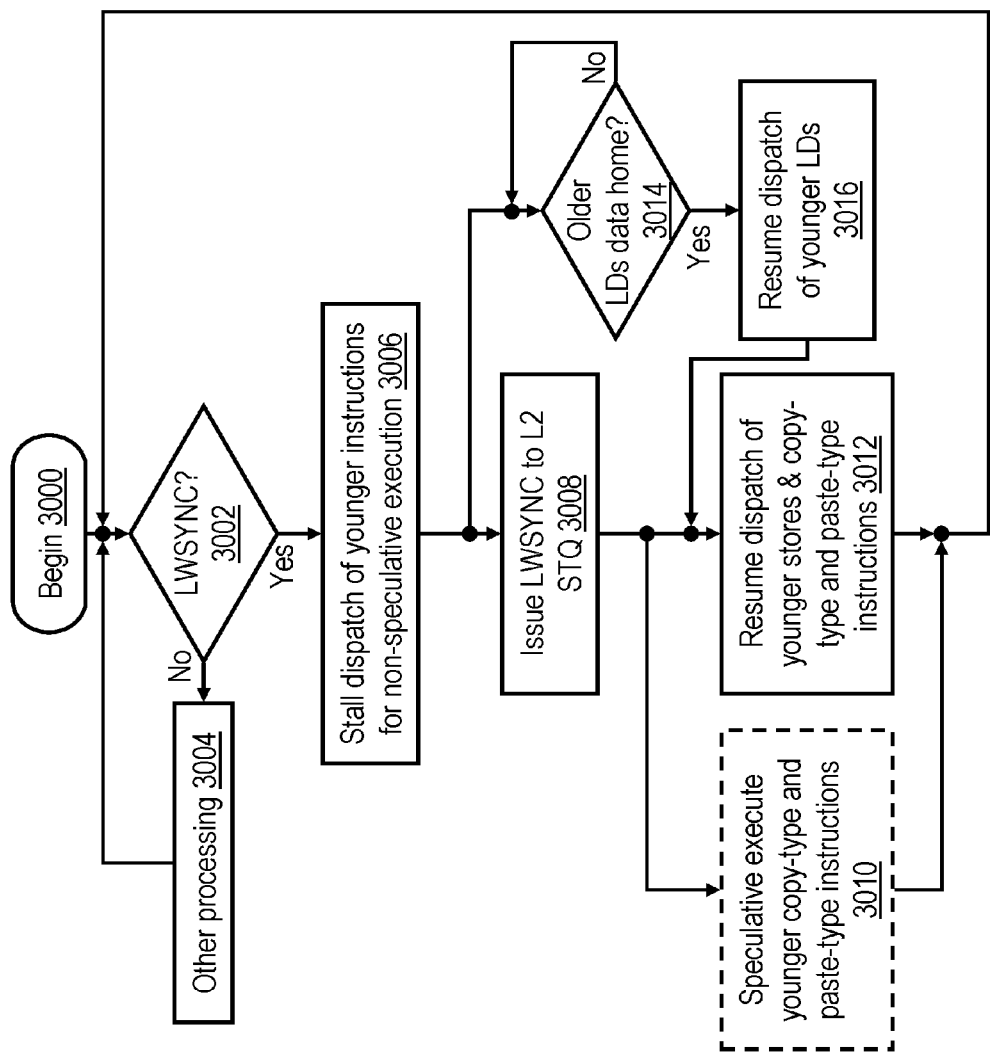
FIG. 30 is a high level logical flowchart of an exemplary method by which a barrier instruction, such as a lightweight sync (LWSYNC), is processed in a processor core in accordance with one embodiment.

Referring now to FIG. 30, there is a high level logical flowchart of an exemplary method by which a barrier instruction, such as a lightweight sync (LWSYNC), is processed in a processor core in accordance with one embodiment. The process of FIG. 30 begins at block 3000 and then proceeds to block 3002, which illustrates a determination by an execution unit 206 of a processor core 200 (e.g., hereafter assumed to be an LSU 206a) whether or not an LWSYNC instruction has been received for processing. If not, other processing is performed, as illustrated at block 3004, and the process returns to block 3002. If, however, a determination is made at block 3002 that an LWSYNC instruction has been received, the process proceeds to block 3006, which depicts ISU 202 stalling the dispatch of younger instructions to execution units 206 for non-speculative execution, for example, in response to a signal generated by LSU 206a in response to receipt of the LWSYNC instruction. The process then proceeds in parallel from block 3006 to a first path including block 3008 and to a second path including blocks 3014-3016.

In the first path, block 3008 illustrates LSU 206a issuing an LWSYNC request corresponding to the LWSYNC instruction to L2 STQ 304. Stalling dispatch of younger instructions to execution units 206 at block 3006 until the LWSYNC request is issued to L2 STQ 304 at block 3008 ensures observance of the store-to-store ordering mandated by the LWSYNC instruction. In the second path, block 3014 depicts ISU 202 monitoring to determine whether or not all data requested by load-type instructions preceding the LWSYNC instruction in program order is "home," for example, received within register files 208. Once the data requested by older load-type instructions is home, ISU 202 can resume dispatch of younger loads that follow the LWSYNC instruction in program order (block 3016). The sequence of blocks 3014-2016 ensures enforcement of the load-to-load and load-to-store ordering mandated by the LWYSNC instruction.

The process does not proceed to block 3012 until the LWSYNC request is issued at block 3008 and an affirmative determination is made at block 3014. Once the LWSYNC request is issued at block 3008 and an affirmative determination is made at block 3014, the process passes to block 3012, which illustrates ISU 202 resuming dispatch to execution units 206 of store-type, copy-type and paste-type instructions following the LWSYNC instruction in program order. As indicated at block 3010, following block 3008 and until the processing at block 3012 is complete, LSU 206a may optionally speculatively execute copy-type and paste-type instructions that follow the HWSYNC instruction in program order, as described in greater detail below with reference to FIGS. 32-36. Following block 3012, the process of FIG. 30 returns to block 3002, which has been described.

Figure 31:
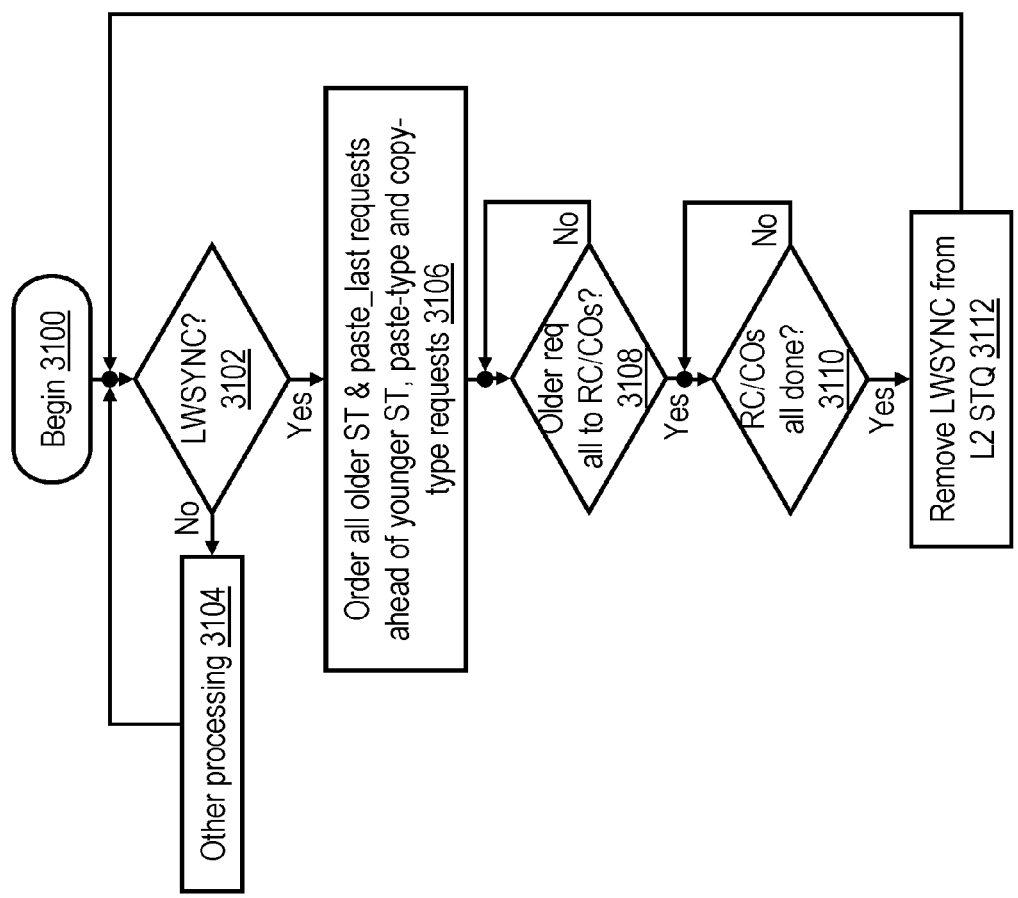
FIG. 31 is a high level logical flowchart of an exemplary method by which a barrier request, such as a lightweight sync (LWSYNC), is processed in a store queue of a lower level cache memory in accordance with one embodiment.

With reference now to FIG. 31, there is illustrated a high level logical flowchart of an exemplary method by which a barrier request, such as a lightweight sync (LWSYNC), is processed in a store queue (e.g., L2 STQ 304) of a lower level cache memory in accordance with one embodiment. The process of FIG. 31 begins at block 3100 and then proceeds to block 3102, which illustrates L2 STQ 304 determining if a request received within L2 STQ 304 from its associated processor core 200 is an LWSYNC request. If not, other processing is performed, as shown at block 3104, and the process returns to block 3102. If, however, L2 STQ 304 determines at block 3102 that the received request is an LWSYNC request, L2 STQ 304 enforces the barrier indicated by the LWSYNC request by ordering all store-type requests and all paste_last requests preceding the LWSYNC request ahead of any younger store-type, copy-type and paste-type requests following the LWSYNC request in terms of their issuance to CPD 300 for dispatch to RC/CO machines 310, 312 or cp_RC and cp_CO machines 1100, 1102 (block 3106).

The process of FIG. 31 proceeds from block 3106 to blocks 3108-3110, which respectively illustrate L2 STQ 304 determining whether all older requests within L2 STQ 304 ordered by block 3106 have been dispatched for servicing to RC and CO machines 310, 312 or cp_RC and cp_CO machines 1100, 1102 and whether the servicing of such older requests has been completed. Once affirmative determinations are made at both of blocks 3108 and 3110, which signify that any other cached copies of the target caches lines of such older requests have been invalidated and the target cache lines have been moved to their destinations, L2 STQ 304 removes the LWSYNC request from L2 STQ 304 (block 3112). Following block 3112, the process of FIG. 31 returns to block 3102. It should be noted that unlike FIG. 29, FIG. 31 does not provide an ACK response to the processor core 200 because LWSYNC instructions do not enforce any store-to-load ordering.

Figure 32:
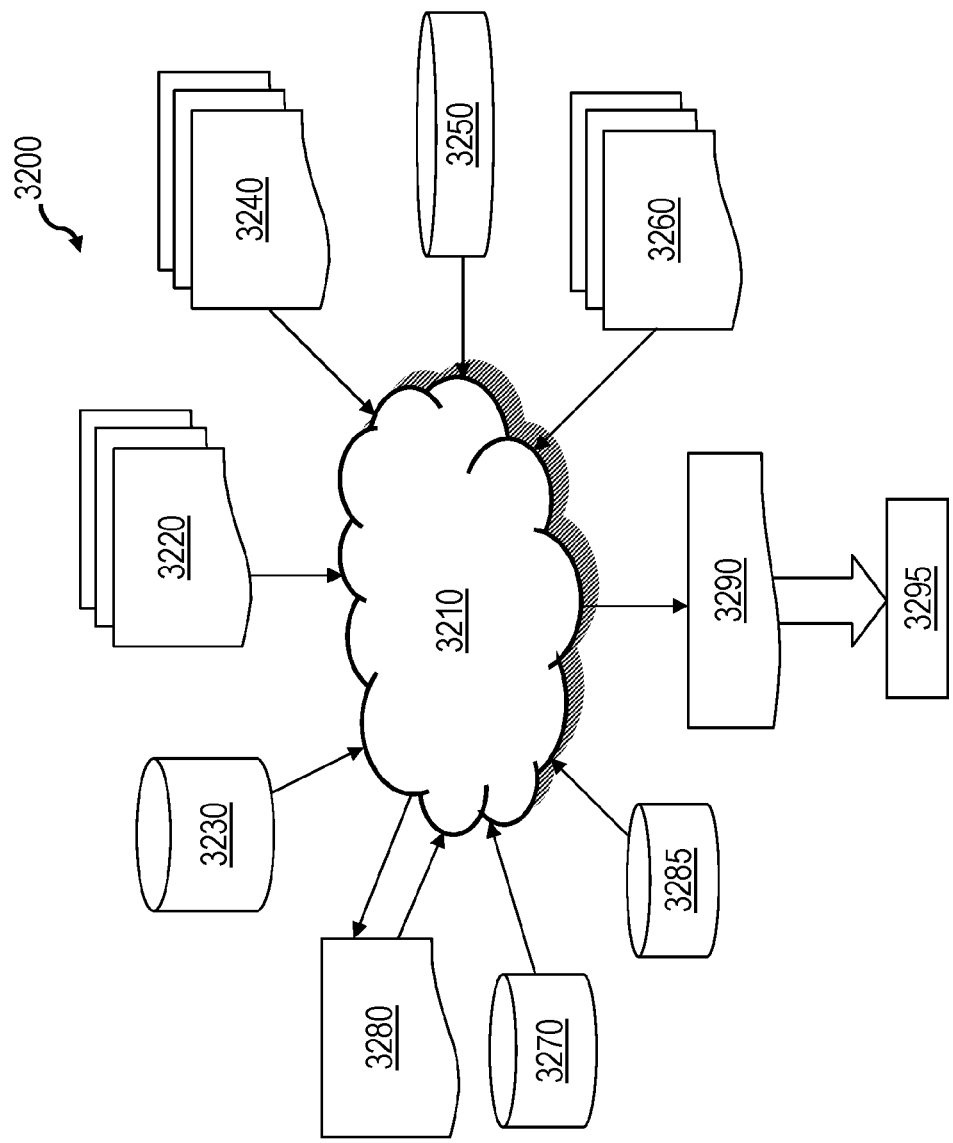
FIG. 32 is a data flow diagram illustrating a design process.

Referring now to FIG. 32, there is depicted a block diagram of an exemplary design flow 3200 used for example, in semiconductor IC logic design, simulation, test, layout, and manufacture. Design flow 3200 includes processes, machines and/or mechanisms for processing design structures or devices to generate logically or otherwise functionally equivalent representations of the design structures and/or devices described above and shown, for example, in FIGS. 1-3. The design structures processed and/or generated by design flow 3200 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 3200 may vary depending on the type of representation being designed. For example, a design flow 3200 for building an application specific IC (ASIC) may differ from a design flow 3200 for designing a standard component or from a design flow 3200 for instantiating the design into a programmable array, for example a programmable gate array (PGA) or a field programmable gate array (FPGA) offered by Altera® Inc. or Xilinx® Inc.

FIG. 32 illustrates multiple such design structures including an input design structure 3220 that is preferably processed by a design process 3210. Design structure 3220 may be a logical simulation design structure generated and processed by design process 3210 to produce a logically equivalent functional representation of a hardware device. Design structure 3220 may also or alternatively comprise data and/or program instructions that when processed by design process 3210, generate a functional representation of the physical structure of a hardware device. Whether representing functional and/or structural design features, design structure 3220 may be generated using electronic computer-aided design (ECAD) such as implemented by a core developer/designer. When encoded on a machine-readable data transmission, gate array, or storage medium, design structure 3220 may be accessed and processed by one or more hardware and/or software modules within design process 3210 to simulate or otherwise functionally represent an electronic component, circuit, electronic or logic module, apparatus, device, or system such as those shown, for example, in FIGS. 1-3. As such, design structure 3220 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 3210 preferably employs and incorporates hardware and/or software modules for synthesizing, translating, or otherwise processing a design/simulation functional equivalent of the components, circuits, devices, or logic structures shown above, for example, in FIGS. 1-3 to generate a netlist 3280 which may contain design structures such as design structure 3220. Netlist 3280 may comprise, for example, compiled or otherwise processed data structures representing a list of wires, discrete components, logic gates, control circuits, I/O devices, models, etc. that describes the connections to other elements and circuits in an integrated circuit design. Netlist 3280 may be synthesized using an iterative process in which netlist 3280 is resynthesized one or more times depending on design specifications and parameters for the device. As with other design structure types described herein, netlist 3280 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 3210 may include hardware and software modules for processing a variety of input data structure types including netlist 3280. Such data structure types may reside, for example, within library elements 3230 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 3240, characterization data 3250, verification data 3260, design rules 3270, and test data files 3285 which may include input test patterns, output test results, and other testing information. Design process 3210 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 3210 without deviating from the scope and spirit of the invention. Design process 3210 may also include modules for performing standard circuit design processes such as timing analysis, verification, design rule checking, place and route operations, etc.

Design process 3210 employs and incorporates logic and physical design tools such as HDL compilers and simulation model build tools to process design structure 3220 together with some or all of the depicted supporting data structures along with any additional mechanical design or data (if applicable), to generate a second design structure 3290. Design structure 3290 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 3220, design structure 3290 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1-3. In one embodiment, design structure 3290 may comprise a compiled, executable HDL simulation model that functionally simulates the devices shown in FIGS. 1-3.

Design structure 3290 may also employ a data format used for the exchange of layout data of integrated circuits and/or symbolic data format (e.g., information stored in a GDSII (GDS2), GL1, OASIS, map files, or any other suitable format for storing such design data structures). Design structure 3290 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1-3. Design structure 3290 may then proceed to a stage 3295 where, for example, design structure 3290: proceeds to tape-out, is released to manufacturing, is released to a mask house, is sent to another design house, is sent back to the customer, etc.

As has been described, a processor core of a data processing system, in response to a first instruction, generates a copy-type request specifying a source real address and transmits it to a lower level cache. In response to a second instruction, the processor core generates a paste-type request specifying a destination real address associated with a memory-mapped device and transmits it to the lower level cache. In response to receipt of the copy-type request, the lower level cache copies a data granule from a storage location specified by the source real address into a non-architected buffer. In response to receipt of the paste-type request, the lower level cache issues a command to write the data granule from the non-architected buffer to the memory-mapped device. In response to receipt from the memory-mapped device of a busy response, the processor core abandons the memory move instruction sequence and performs alternative processing.

While various embodiments have been particularly shown and described, it will be understood by those skilled in the art that various changes in form and detail may be made therein without departing from the spirit and scope of the appended claims and these alternate implementations all fall within the scope of the appended claims. For example, although aspects have been described with respect to a computer system executing program code that directs the functions of the present invention, it should be understood that present invention may alternatively be implemented as a program product including a computer-readable storage device storing program code that can be processed by a processor of a data processing system to cause the data processing system to perform the described functions. The computer-readable storage device can include volatile or non-volatile memory, an optical or magnetic disk, or the like, but excludes non-statutory subject matter, such as propagating signals per se, transmission media per se, and forms of energy per se.

As an example, the program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A method of data processing in a data processing system including a processor core having a store-through upper level cache and a store-in lower level cache, a memory controller, and a memory-mapped device, the method comprising:
the processor core executing a memory move instruction sequence, wherein the executing includes:
in response to a first instruction, the processor core generating a copy-type request specifying a source real address and transmitting the copy-type request to the lower level cache;
in response to a second instruction, the processor core generating a paste-type request specifying a destination real address associated with the memory-mapped device and transmitting the paste-type request to the lower level cache;
in response to the copy-type request, the lower level cache copying a data granule from a storage location specified by the source real address into a non-architected buffer; and
in response to the paste-type request, the lower level cache issuing a command to write the data granule from the non-architected buffer to the memory-mapped device associated with the destination real address; and
in response to receipt from the memory-mapped device of a busy response to the command, the processor core abandoning execution of the memory move instruction sequence and performing alternative processing.

2. The method of claim 1, wherein performing alternative processing includes performing in software an operation performed by the memory-mapped device in hardware.

3. The method of claim 1, wherein:
the method further comprises the processor core determining whether or not to abandon execution of the memory move instruction sequence based on at least one of a set, including a number of times the memory-mapped device has provided a busy response, a time interval for which the memory-mapped device has provided a busy response, and a duration of the alternative processing; and
the processor core abandons execution of the memory move instruction sequence in response to determining to abandon execution of the memory move instruction sequence and otherwise refrains from abandoning execution of the memory move instruction sequence.

4. The method of claim 3, and further comprising:
the processor core, in response to determining not to abandon execution of the memory move instruction sequence, repeating execution of the memory move instruction sequence.

5. The method of claim 1, and further comprising:
the processor core determining a source effective address by executing the copy-type request and determining a destination effective address by executing the paste-type instruction; and
the processor core determining the source real address by translating the source effective address and determining the destination real address by translating the destination effective address.

6. The method of claim 1, and further comprising the memory-mapped device initiating a computation on a data set in response to the command.

7. A processing unit for a data processing system including a memory controller and a memory-mapped device, the processing unit comprising:
a processor core having a store-through upper level cache and a store-in lower level cache, wherein the processor core is configured to execute a memory move instruction sequence by:
in response to a first instruction, generating a copy-type request specifying a source real address and transmitting the copy-type request to the lower level cache;
in response to a second instruction, generating a paste-type request specifying a destination real address associated with the memory-mapped device and transmitting the paste-type request to the lower level cache;
wherein the lower level cache is configured to:
in response to the copy-type request, copy a data granule from a storage location specified by the source real address into a non-architected buffer; and
in response to the paste-type request, issue a command to write the data granule from the non-architected buffer to the memory-mapped device associated with the destination real address; and
wherein the processor core is further configure to:
in response to receipt from the memory-mapped device of a busy response to the command, abandon execution of the memory move instruction sequence and perform alternative processing.

8. The processing unit of claim 7, wherein the processor core performs the alternative processing by performing in software an operation performed by the memory-mapped device in hardware.

9. The processing unit of claim 7, wherein the processor core is further configured to:
determine whether or not to abandon execution of the memory move instruction sequence based on at least one of a set, including a number of times the memory-mapped device has provided a busy response, a time interval for which the memory-mapped device has provided a busy response, and a duration of the alternative processing; and
abandon execution of the memory move instruction sequence in response to determining to abandon execution of the memory move instruction sequence and otherwise refrain from abandoning execution of the memory move instruction sequence.

10. The processing unit of claim 9, wherein the processor core is further configured to, in response to determining not to abandon execution of the memory move instruction sequence, repeat execution of the memory move instruction sequence.

11. The processing unit of claim 7, wherein the processor core is further configured to:
determine a source effective address by executing the copy-type request and determine a destination effective address by executing the paste-type instruction; and
determine the source real address by translating the source effective address and determine the destination real address by translating the destination effective address.

12. A data processing system, comprising:
the processing unit of claim 7; and
the memory-mapped device, wherein the memory-mapped device is configured to initiate a computation on the data granule in response to the command.

13. A design structure tangibly embodied in a computer-readable storage device for designing, manufacturing, or testing an integrated circuit, the design structure comprising:

a processor core having a store-through upper level cache and a store-in lower level cache, wherein the processor core is configured to execute a memory move instruction sequence by:
  in response to a first instruction, generating a copy-type request specifying a source real address and transmitting the copy-type request to the lower level cache;
  in response to a second instruction, generating a paste-type request specifying a destination real address associated with a memory-mapped device and transmitting the paste-type request to the lower level cache;
wherein the lower level cache is configured to:
  in response to the copy-type request, copy a data granule from a storage location specified by the source real address into a non-architected buffer; and
  in response to the paste-type request, issue a command to write the data granule from the non-architected buffer to the memory-mapped device associated with the destination real address; and
wherein the processor core is further configure to:
  in response to receipt from the memory-mapped device of a busy response to the command, abandon execution of the memory move instruction sequence and perform alternative processing.

14. The design structure of claim 13, wherein the processor core performs the alternative processing by performing in software an operation performed by the memory-mapped device in hardware.

15. The design structure of claim 13, wherein the processor core is further configured to:
  determine whether or not to abandon execution of the memory move instruction sequence based on at least one of a set, including a number of times the memory-mapped device has provided a busy response, a time interval for which the memory-mapped device has provided a busy response, and a duration of the alternative processing; and
  abandon execution of the memory move instruction sequence in response to determining to abandon execution of the memory move instruction sequence and otherwise refrain from abandoning execution of the memory move instruction sequence.

16. The design structure of claim 15, wherein the processor core is further configured to, in response to determining not to abandon execution of the memory move instruction sequence, repeat execution of the memory move instruction sequence.

17. The design structure of claim 13, wherein the processor core is further configured to:
  determine a source effective address by executing the copy-type request and determine a destination effective address by executing the paste-type instruction; and
  determine the source real address by translating the source effective address and determine the destination real address by translating the destination effective address.

* * * * *